US012590007B2

(12) United States Patent
Nair et al.

(10) Patent No.: US 12,590,007 B2
(45) Date of Patent: Mar. 31, 2026

(54) ZEOLITE NANOTUBES AND METHODS OF MAKING AND USE THEREOF

(71) Applicants: Georgia Tech Research Corporation, Atlanta, GA (US); Sankar Nair, Atlanta, GA (US); Christopher W. Jones, Atlanta, GA (US); Akshay Korde, Atlanta, GA (US); Johannes Leisen, Atlanta, GA (US); Byunghyun Min, Atlanta, GA (US); Ziyuan Wang, Atlanta, GA (US)

(72) Inventors: Sankar Nair, Atlanta, GA (US); Christopher W. Jones, Atlanta, GA (US); Akshay Korde, Atlanta, GA (US); Johannes Leisen, Atlanta, GA (US); Byunghyun Min, Atlanta, GA (US); Ziyuan Wang, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 534 days.

(21) Appl. No.: 18/019,315

(22) PCT Filed: Aug. 5, 2021

(86) PCT No.: PCT/US2021/044710
§ 371 (c)(1),
(2) Date: Feb. 2, 2023

(87) PCT Pub. No.: WO2022/031951
PCT Pub. Date: Feb. 10, 2022

(65) Prior Publication Data

US 2023/0271842 A1 Aug. 31, 2023

Related U.S. Application Data

(60) Provisional application No. 63/061,449, filed on Aug. 5, 2020.

(51) Int. Cl.
*C01B 39/00* (2006.01)
*B01J 20/18* (2006.01)
(Continued)

(52) U.S. Cl.
CPC ............... *C01B 39/48* (2013.01); *B01J 20/18* (2013.01); *B01J 20/28007* (2013.01);
(Continued)

(58) Field of Classification Search
CPC ......... C01B 39/48; B01J 35/618; B01J 35/45; B01J 35/643; B01J 35/647; B01J 35/393;
(Continued)

(56) References Cited

U.S. PATENT DOCUMENTS

2009/0243103 A1 10/2009 Jacobs et al.
2011/0123409 A1 5/2011 Phamhuu et al.

FOREIGN PATENT DOCUMENTS

WO 2015126236 A1 8/2015

OTHER PUBLICATIONS

Li et al., "A Bioscaffolding Strategy for Hierarchical Zeolites with a Nanotube-Trimodal Network", Cherm. Sci., 2016, 7, 1582 (Year: 2016).*
(Continued)

*Primary Examiner* — James E McDonough
(74) *Attorney, Agent, or Firm* — Meunier Carlin & Curfman LLC

(57) ABSTRACT

Disclosed herein are nanostructured hierarchical zeolitic materials comprising: a plurality of zeolite nanotubes, each zeolite nanotube comprising a zeolitic wall perforated by a plurality of pores, the zeolitic wall defining a single longitudinal lumen. Also disclosed herein are bolaform structure directing agents comprising: a first hydrophilic end and a second hydrophilic end with a hydrophobic core therebetween; the hydrophobic core comprising one or more aro-
(Continued)

matic rings and one or more hydrophobic alkyl groups; the one or more aromatic rings comprising a biphenyl group; the one or more hydrophobic alkyl groups each independently comprising a $C_{10}$ alkyl group; and the first hydrophilic end and the second hydrophilic end each independently comprising a quinuclidinium group. Also disclosed herein are methods of making and use of the plurality of zeolite nanotubes and the bolaform structure directing agents.

19 Claims, 28 Drawing Sheets

(51) Int. Cl.

| | |
|---|---|
| ***B01J 20/28*** | (2006.01) |
| ***B01J 20/30*** | (2006.01) |
| ***B01J 29/70*** | (2006.01) |
| ***B01J 35/30*** | (2024.01) |
| ***B01J 35/45*** | (2024.01) |
| ***B01J 35/61*** | (2024.01) |
| ***B01J 35/64*** | (2024.01) |
| ***B01J 37/00*** | (2006.01) |
| ***C01B 39/48*** | (2006.01) |

(52) U.S. Cl.

CPC ... *B01J 20/28023* (2013.01); *B01J 20/28061* (2013.01); *B01J 20/28064* (2013.01); *B01J 20/28066* (2013.01); *B01J 20/2808* (2013.01); *B01J 20/28083* (2013.01); *B01J 20/3057* (2013.01); *B01J 29/7007* (2013.01); *B01J 35/393* (2024.01); *B01J 35/45* (2024.01); *B01J 35/615* (2024.01); *B01J 35/617* (2024.01); *B01J 35/618* (2024.01); *B01J 35/643* (2024.01); *B01J 35/647* (2024.01); *B01J 37/0018* (2013.01); *B01J 2235/00* (2024.01); *B01J 2235/05* (2024.01); *B01J 2235/10* (2024.01); *B01J 2235/15* (2024.01); *B01J 2235/30* (2024.01); *C01P 2002/72* (2013.01); *C01P 2002/82* (2013.01); *C01P 2002/84* (2013.01); *C01P 2002/86* (2013.01); *C01P 2002/88* (2013.01); *C01P 2004/04* (2013.01); *C01P 2004/13* (2013.01); *C01P 2004/54* (2013.01); *C01P 2004/64* (2013.01); *C01P 2006/12* (2013.01); *C01P 2006/16* (2013.01)

(58) Field of Classification Search

CPC ........ B01J 35/615; B01J 35/617; B01J 20/18; B01J 20/28007; B01J 20/28023; B01J 20/28061; B01J 20/28064; B01J 20/28066; B01J 20/2808; B01J 20/28083; B01J 20/3057; B01J 29/7007; B01J 37/0018

USPC .......................................................... 502/87

See application file for complete search history.

(56) References Cited

OTHER PUBLICATIONS

Li et al. (A Bioscaffolding Strategy for Hierarchical Zeolites with a Nanotube-Trimodal Network, Cherm. Sci., 2016, 7, 1582, as supplied by applicants). (Year: 2016).*
International Preliminary Report on Patentability issued for Application No. PCT/US2021/044710, dated Feb. 16, 2023.
Tao Y et al. Mesopore-modified zeolites: preparation, characterization, and applications Chem. Rev. 2006, 106, 896-910.
Čejka J et al. Perspectives of Micro/Mesoporous Composites in Catalysis, Catal. Rev.—Sci. Eng. 2007, 49, 457-509.
Möller et al. Mesoporosity—a new dimension for zeolitesChem. Soc. Rev. 2013, 42, 3689-707.
Verboekend D et al. Design of hierarchical zeolite catalysts by desilication Catal. Sci. Technol. 2011, 1, 879-890.
Beyerlein RA et al. Effect of steaming on the defect structure and acid catalysis of protonated zeolites, Top. Catal. 1997, 4, 27-42.
Feliczak-Guzik A. Hierarchical zeolites: Synthesis and catalytic properties Microporous Mesoporous Mater. 2018, 259, 33-45.
Fan W et al. Hierarchical nanofabrication of microporous crystals with ordered mesoporosity, Nat. Mater. 2008, 7, 984-991.
Choi M et al. Stable single-unit-cell nanosheets of zeolite MFI as active and long-lived catalysts, Nature 2009, 461, 246-249.
Xu D et al. π-π interaction of aromatic groups in amphiphilic molecules directing for single-crystalline mesostructured zeolite nanosheets, Nat. Commun. 2014, 5, 4262.
Xu D et al. Surfactants with Aromatic-Group Tail and Single Quaternary Ammonium Head for Directing Single-Crystalline Mesostructured Zeolite Nanosheets, Chem. Mater. 2014, 26, 4612-4619.
Zhang X et al. Synthesis of self-pillared zeolite nanosheets by repetitive branching, Science 2012, 336, 1684-1687.
Na K et al. Directing zeolite structures into hierarchically nanoporous architectures, Science (80-. ). 2011, 333, 328-332.
Margarit VJ et al. Direct Dual-Template Synthesis of MWW Zeolite Monolayers Angew. Chemie—Int. Ed. 2015, 54, 13724-13728.
Serrano DP et al. Synthesis strategies in the search for hierarchical zeolites, Chem. Soc. Rev. 2013, 42, 4004-4035.
Luo HY et al. One-pot synthesis of MWW zeolite nanosheets using a rationally designed organic structure-directing agent, Chem. Sci. 2015, 6, 6320-6324.
Singh BK et al. Synthesis of Single-Crystalline Mesoporous ZSM-5 with Three-Dimensional Pores via the Self-Assembly of a Designed Triply Branched Cationic Surfactant, Chem. Mater. 2014, 26(24), 7183-7188.
Shen X et al. A hierarchical MFI zeolite with a two-dimensional square mesostructured, Angew. Chemie—Int. Ed. 2018, 57, 724-728.
Zhang Y et al. Single-Crystalline MFI Zeolite with Sheet-Like Mesopores Layered along the a Axis, Chem.—A Eur. J. 2019, 25, 738-742.
Zhang Y et al. Synthesis of lamellar mesostructured ZSM-48 nanosheets, Chem. Mater. 2018, 30, 1839-1843.
Zhang Y et al. π-π interactions between aromatic groups in amphiphilic molecules: directing hierarchical growth of porous zeolites, Angew. Chemie—Int. Ed. 2020, 59, 50-60.
Seo Y et al. Microporous aluminophosphate nanosheets and their nanomorphic zeolite analogues tailored by hierarchical structure-directing amines, J. Am. Chem. Soc. 2013, 135, 8806-8809.
Pophale R et al. A database of new zeolite-like materials, Phys. Chem. Chem. Phys. 2011, 13, 12407-12412.
Zhang H et al. Open-pore two-dimensional MFI zeolite nanosheets for the fabrication of hydrocarbon-isomer-selective membranes on porous polymer supports, Angew. Chem. Int. Ed. 2016, 55(25), 7184-7187.
Schmidt JE et al. Synthesis of the RTH-type layer: the first small-pore, two dimensional layered zeolite precursor, Chem. Sci. 2015, 6, 5955-5963.
Na K et al. Pillared MFI zeolite nanosheets of a single-unit-cell thickness, J. Am. Chem. Soc. 2010, 132, 4169-4177.
Wang C et al. Amphiphilic Building Blocks for Self-Assembly: From Amphiphiles to Supra-amphiphiles, Acc. Chem. Res. 2012, 45, 608-618.
Grünewald-Lüke A et al. Quinuclidine derivatives as structure directing agents for the synthesis of boron containing zeolites, J. Mater. Chem. 1999, 9, 2529-2536.
International Search Report and Written Opinion received in PCT/US2021/044710 mailed Feb. 7, 2022, 9 pages.

(56) References Cited

OTHER PUBLICATIONS

Li et al. “A bioscaffolding strategy for hierarchical zeolites with a nanotube-trimodal network,” Chemical Science, Nov. 23, 2015 (Nov. 23, 2015), vol. 7, pp. 1582-1587.

* cited by examiner

ZEOLITE NANOTUBES AND METHODS OF MAKING AND USE THEREOF

CROSS-REFERENCE TO RELATED APPLICATIONS

This application is a U.S. National Stage application filed under 35 U.S.C. § 371 of PCT/US2021/044710 filed Aug. 5, 2021, which claims the benefit of priority to U.S. Provisional Application No. 63/061,449 filed Aug. 5, 2020, each of which is hereby incorporated herein by reference in its entirety.

STATEMENT OF GOVERNMENT SUPPORT

This invention was made with government support under Grant No. 1534179 awarded by The National Science Foundation. The government has certain rights in the invention.

BACKGROUND

Zeolites have been widely used as size- and shape-selective catalysts and adsorbents, because of their ordered microporous structure. In recent years, there has been large interest in the synthesis of hierarchical zeolites. However, the synthesis of such hierarchical zeolites has proved challenging. The compositions and methods discussed herein addresses this and other needs.

SUMMARY

In accordance with the purposes of the disclosed compositions and methods as embodied and broadly described herein, the disclosed subject matter relates to zeolite nanotubes and methods of making and use thereof.

For example, disclosed herein are nanostructured hierarchical zeolitic materials comprising: a plurality of zeolite nanotubes, wherein each zeolite nanotube comprises a zeolitic wall perforated by a plurality of pores, the zeolitic wall defining a single longitudinal lumen. In some examples, the zeolitic wall comprises a zeolitic material, the zeolitic material comprising an aluminosilicate material. The aluminosilicate material can, for example, comprise Si and Al in a ratio of from 14:1 to 18:1 (w/w). In some examples, the zeolitic wall comprises some structural elements of a beta zeolite structure, an MFI zeolite structure, or a combination thereof.

In some examples, the plurality of zeolite nanotubes have an average length of from 20 nanometers (nm) to 10 micrometers (μm, microns). In some examples, the plurality of zeolite nanotubes have an average length of from 500 nm to 1 micron.

In some examples, the plurality of zeolite nanotubes have an average outer diameter of from 1 nanometer to 10 nanometers. In some examples, the plurality of zeolite nanotubes have an average outer diameter of from 4 nm to 6 nm.

In some examples, the plurality of zeolite nanotubes have an average aspect ratio of from 2 to 10,000. In some examples, the plurality of zeolite nanotubes have an average aspect ratio of from 100 to 200.

In some examples, the plurality of zeolite nanotubes have an average inner diameter of 0.5 nm to 9 nm. In some examples, the plurality of zeolite nanotubes have an average inner diameter of from 2 nm to 4 nm.

In some examples, the plurality of zeolite nanotubes have an average wall thickness of from 0.5 nm to 5 nm. In some examples, the plurality of zeolite nanotubes have an average wall thickness of from 0.5 nm to 2 nm.

In some examples, the plurality of pores have an average diameter of from 0.2 to 2 nm. In some examples, the plurality of pores have an average diameter of from 0.4 to 0.6 nm.

In some examples, the plurality of zeolite nanotubes are substantially crystalline.

In some examples, the plurality of zeolite nanotubes have an average surface area of from 500 to 5000 meters squared per gram of the plurality of zeolite nanotubes ($m^2/g$). In some examples, the plurality of zeolite nanotubes have an average surface area of from 950 to 1000 $m^2/g$.

In some examples, the plurality of zeolite nanotubes further comprise a structure directing agent. In some examples, the structure directing agent comprises a bolaform structure directing agent.

In some examples, the bolaform structure directing agent comprises a first hydrophilic end and a second hydrophilic end with a hydrophobic core therebetween. In some examples, the hydrophobic core comprises one or more aromatic rings, one or more hydrophobic alkyl groups, or a combination thereof. In some examples, the hydrophobic core comprises one or more aromatic rings, and the one or more aromatic rings comprises a substituted or unsubstituted biphenyl group, a substituted or unsubstituted naphthalene group, a substituted or unsubstituted anthracene group, a substituted or unsubstituted pyrene group, or a combination thereof. In some examples, the hydrophobic core comprises one or more aromatic rings, and the one or more aromatic rings comprises a substituted or unsubstituted biphenyl group. In some examples, the hydrophobic core comprise one or more hydrophobic alkyl groups, and the one or more hydrophobic alkyl groups each independently comprises a substituted or unsubstituted $C_1$-$C_{20}$ alkyl group. In some examples, the hydrophobic core comprise one or more hydrophobic alkyl groups, and the one or more hydrophobic alkyl groups each independently comprises a substituted or unsubstituted $C_{10}$ alkyl group. In some examples, the first hydrophilic end and the second hydrophilic end each independently comprises a hydrophilic group. In some examples, the first hydrophilic end and the second hydrophilic end each independently comprises a quinuclidinium group. In some examples, the structure directing agent comprises a molecule with the following structure.

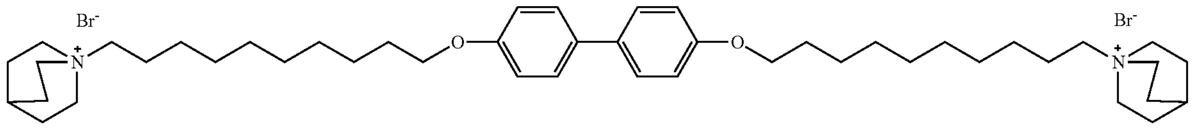 [SMILES: c1cc(-c2ccc(OCCCCCCCCCC[N+]34CCC(CC3)CC4)cc2)ccc1OCCCCCCCCCC[N+]12CCC(CC1)CC2 ; [Br-] ; [Br-]]

Also disclosed herein are methods of making the materials disclosed herein. In some examples, the method comprises hydrothermal zeolite growth using a structure directing agent. In some examples, the structure directing agent comprises a bolaform structure directing agent. In some examples, the bolaform structure directing agent comprises a first hydrophilic end and a second hydrophilic end with a hydrophobic core therebetween. In some examples, the hydrophobic core comprises one or more aromatic rings, one or more hydrophobic alkyl groups, or a combination thereof. In some examples, the hydrophobic core comprises one or more aromatic rings, and the one or more aromatic rings comprises a substituted or unsubstituted biphenyl group, a substituted or unsubstituted naphthalene group, a substituted or unsubstituted anthracene group, a substituted or unsubstituted pyrene group, or a combination thereof. In some examples, the hydrophobic core comprises one or more aromatic rings, and the one or more aromatic rings comprises a substituted or unsubstituted biphenyl group. In some examples, the hydrophobic core comprise one or more hydrophobic alkyl groups, and the one or more hydrophobic alkyl groups each independently comprises a substituted or unsubstituted $C_1$-$C_{20}$ alkyl group. In some examples, the hydrophobic core comprise one or more hydrophobic alkyl groups, and the one or more hydrophobic alkyl groups each independently comprises a substituted or unsubstituted $C_{10}$ alkyl group. In some examples, the first hydrophilic end and the second hydrophilic end each independently comprises a hydrophilic group. In some examples, the first hydrophilic end and the second hydrophilic end each independently comprises a quinuclidinium group. In some examples, the structure directing agent comprises a molecule with the following structure.

Also disclosed herein are methods of use of the materials disclosed herein. For example, the methods can comprise using the material as a catalyst, as a catalyst support, as an adsorbent, in a chemical separation, or a combination thereof.

Also disclosed herein are catalysts and/or catalyst supports comprising the materials disclosed herein.

Additional advantages of the disclosed compositions and methods will be set forth in part in the description which follows, and in part will be obvious from the description. The advantages of the disclosed compositions and methods will be realized and attained by means of the elements and combinations particularly pointed out in the appended claims. It is to be understood that both the foregoing general description and the following detailed description are exemplary and explanatory only and are not restrictive of the disclosed systems and methods, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

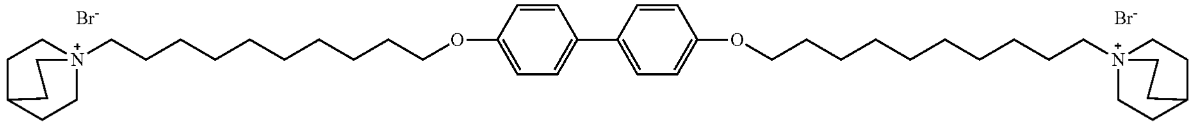 [SMILES: c1cc(-c2ccc(OCCCCCCCCCC[N+]34CCC(CC3)CC4)cc2)ccc1OCCCCCCCCCC[N+]12CCC(CC1)CC2 ; [Br-] ; [Br-]]

In some examples, the method further comprises making the structure directing agent.

In some examples, the method further comprises calcination.

Also disclosed herein are bolaform structure directing agents comprising: a first hydrophilic end and a second hydrophilic end with a hydrophobic core therebetween; wherein the hydrophobic core comprises one or more aromatic rings and one or more hydrophobic alkyl groups; wherein the one or more aromatic rings comprises a biphenyl group; wherein the one or more hydrophobic alkyl groups each independently comprises a $C_{10}$ alkyl group; wherein the first hydrophilic end and the second hydrophilic end each independently comprises a quinuclidinium group. In some examples, the bolaform structure directing agent comprises a molecule with the following structure.

Figure 3:
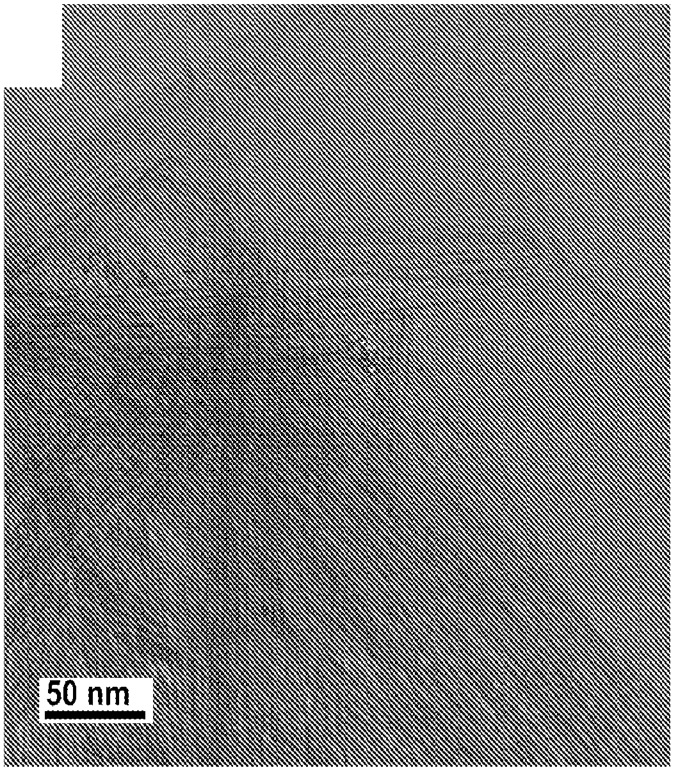

FIG. 3. TEM image of the calcined nanotube bundle cross-sections.

Figure 4:
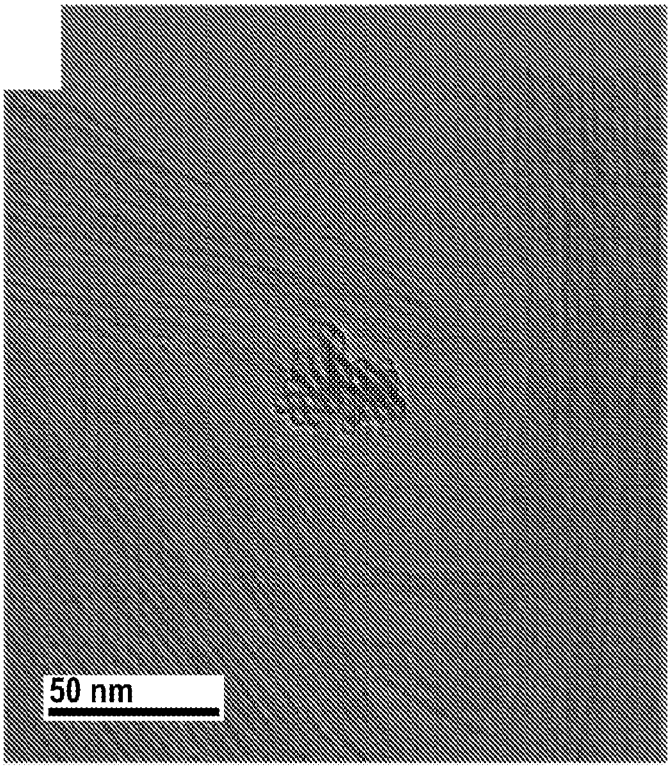

FIG. 4. TEM image of the calcined nanotube bundle cross-sections.

Figure 5:
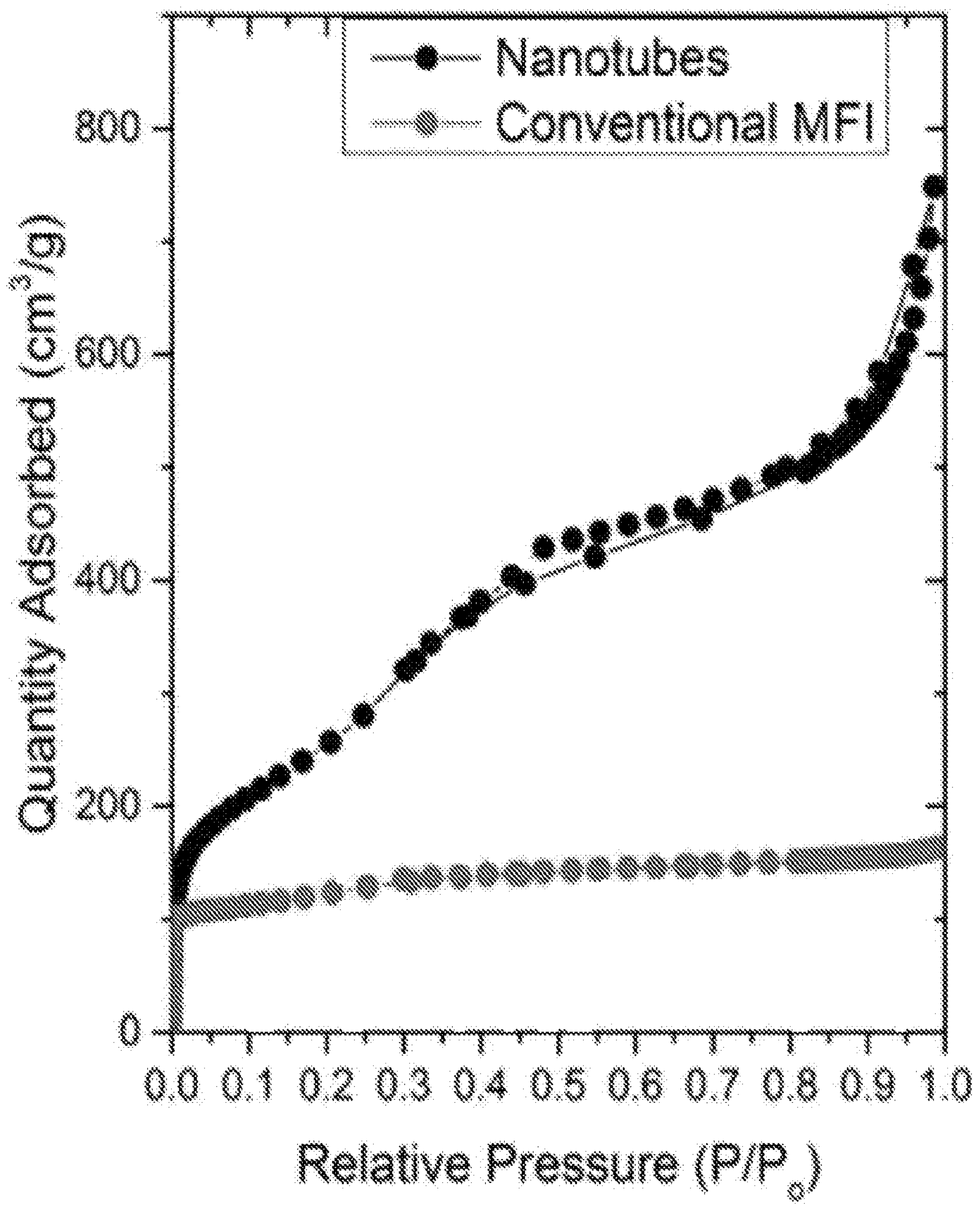

FIG. 5. Nitrogen physisorption isotherm of nanotubes and conventional MFI zeolite.

Figure 6:
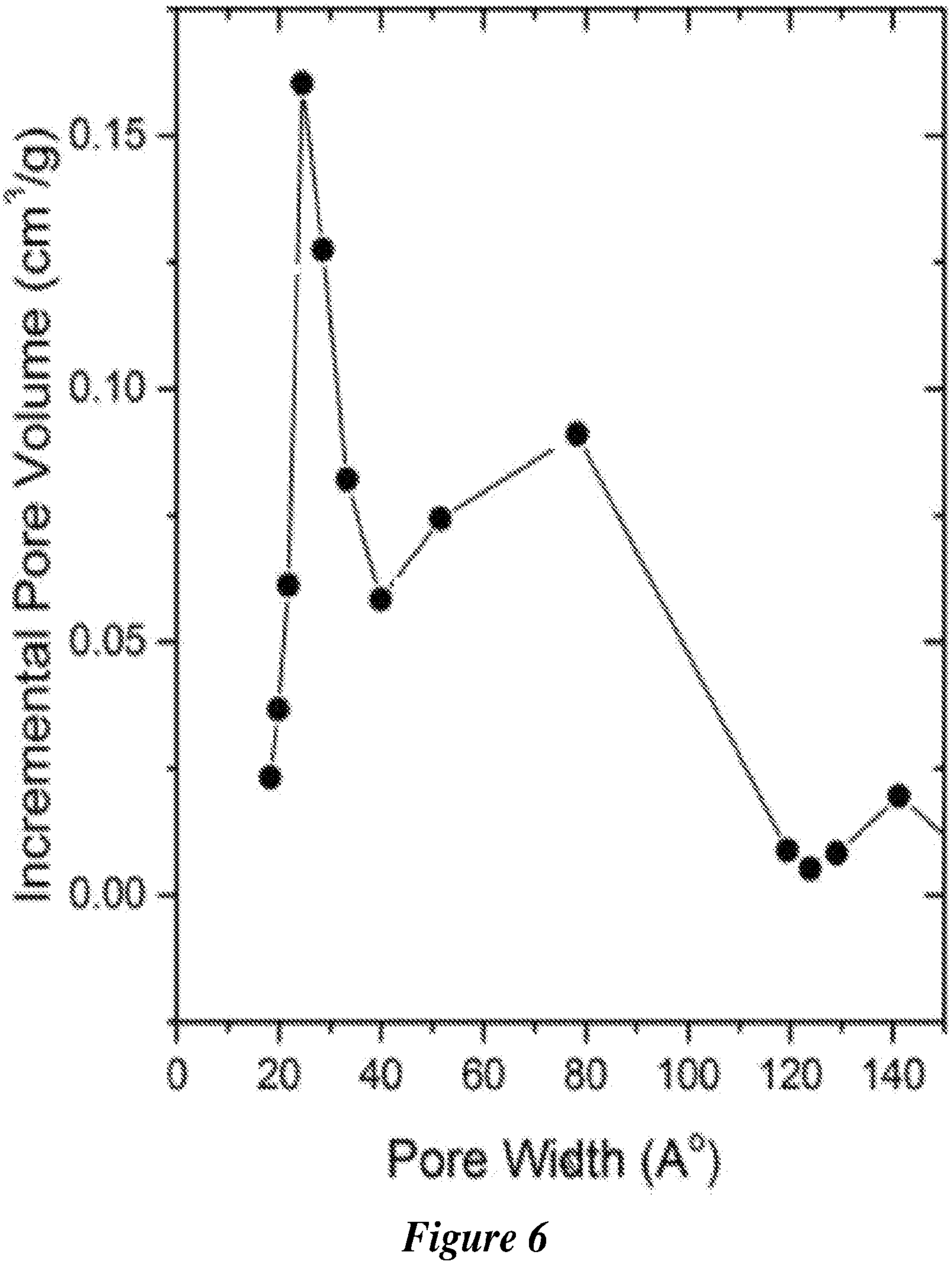

FIG. 6. Mesopore size distribution of nanotubes.

Figure 7:
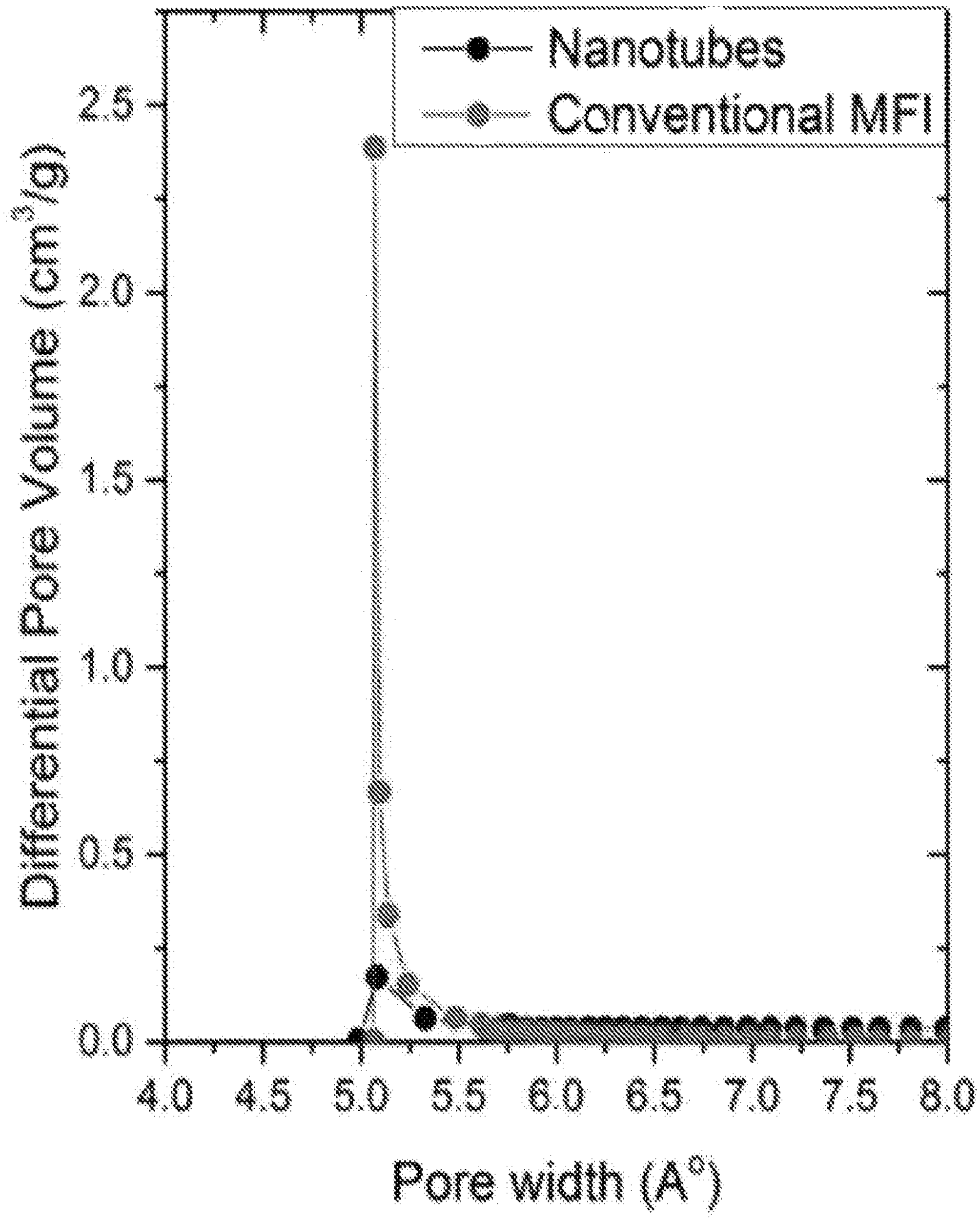

FIG. 7. Micropore size distribution of nanotubes compared with conventional MFI.

Figure 8:
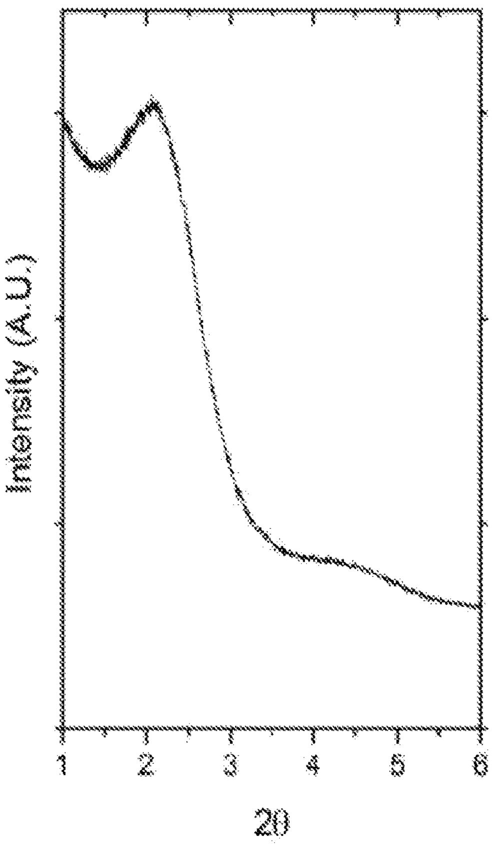

FIG. 8. Low-angle XRD pattern for the calcined nanotubes.

Figure 9:
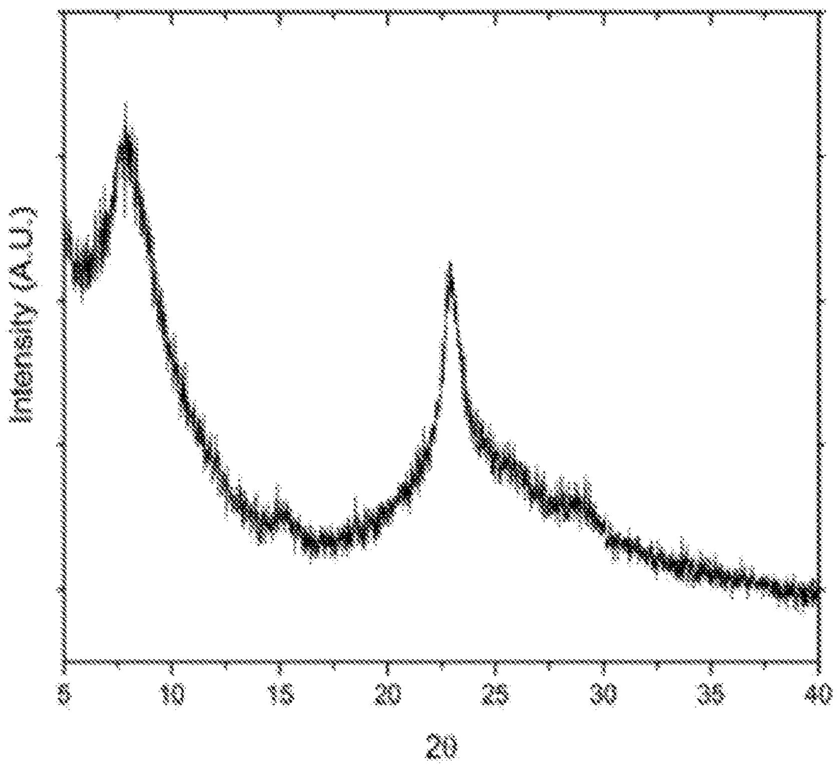

FIG. 9. Wide-angle XRD pattern for the calcined nanotubes.

Figure 10:
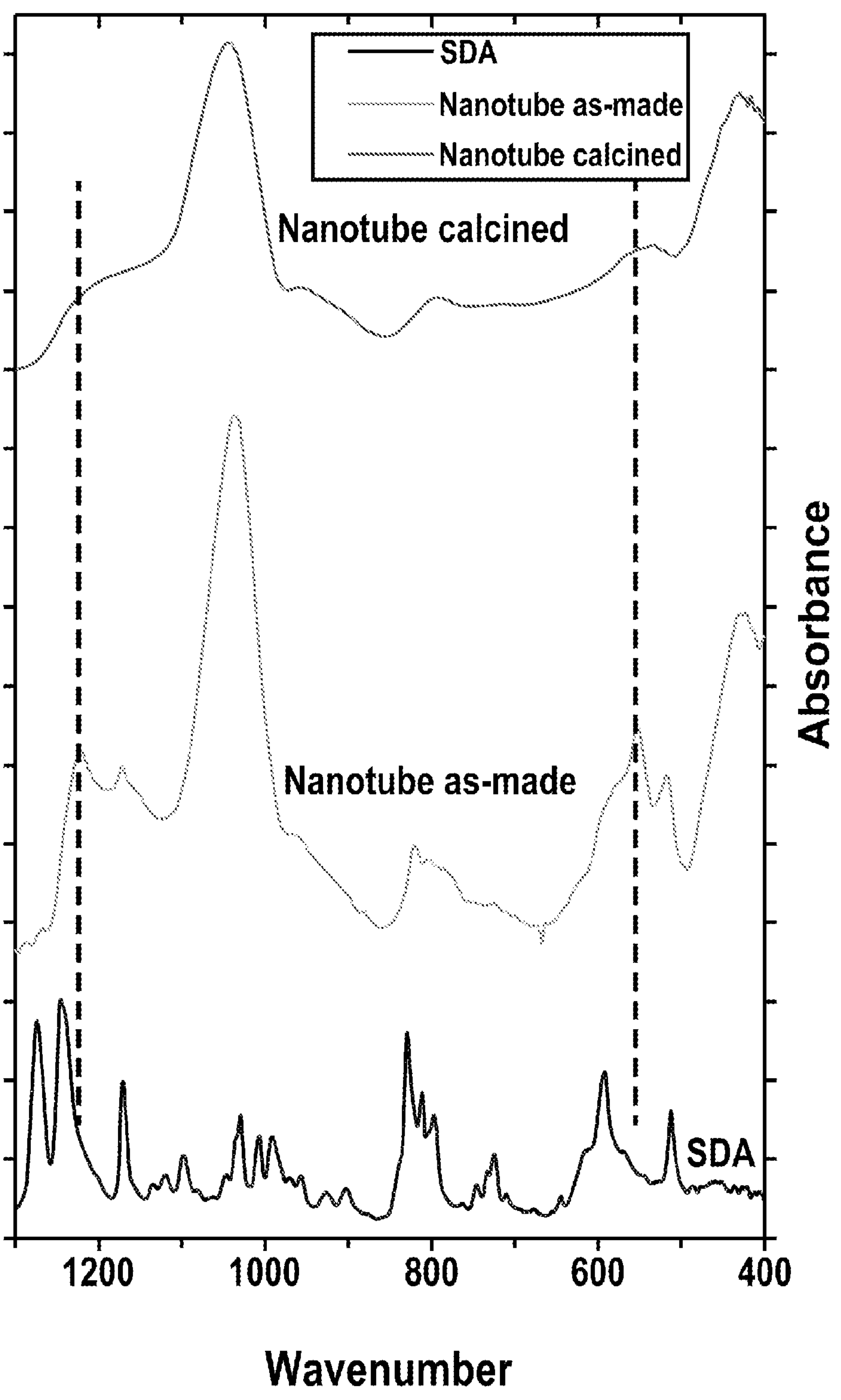

FIG. 10. FT-IR spectra of the solid structure-directing agent (SDA) (bottom trace), the as-made nanotubes (middle trace) and calcined nanotubes (upper trace).

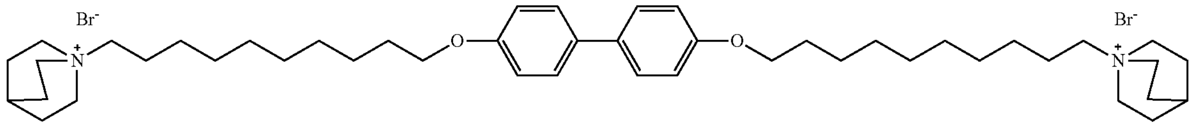 [SMILES: c1cc(-c2ccc(OCCCCCCCCCC[N+]34CCC(CC3)CC4)cc2)ccc1OCCCCCCCCCC[N+]12CCC(CC1)CC2 ; [Br-] ; [Br-]]

Figure 11:
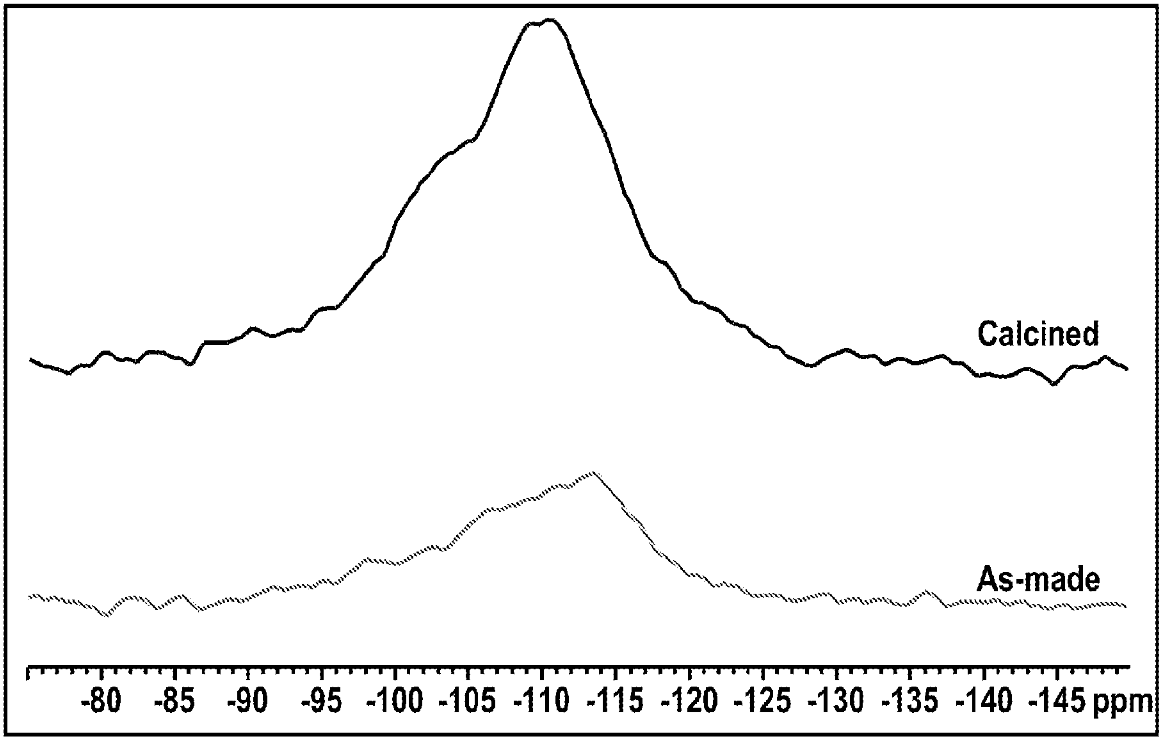

FIG. 11. $^{29}Si$ NMR of the as-made and calcined nanotubes.

Figure 12:
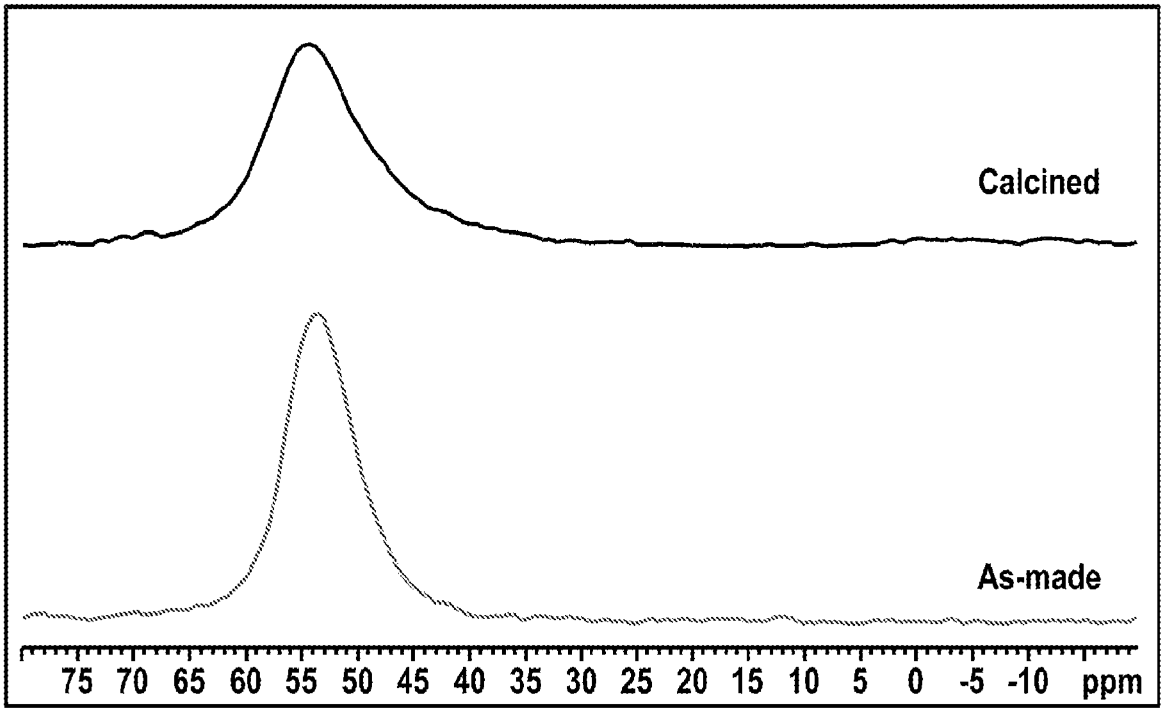

FIG. 12. $^{27}Al$ NMR of the as-made and calcined nanotubes.

Figure 13:
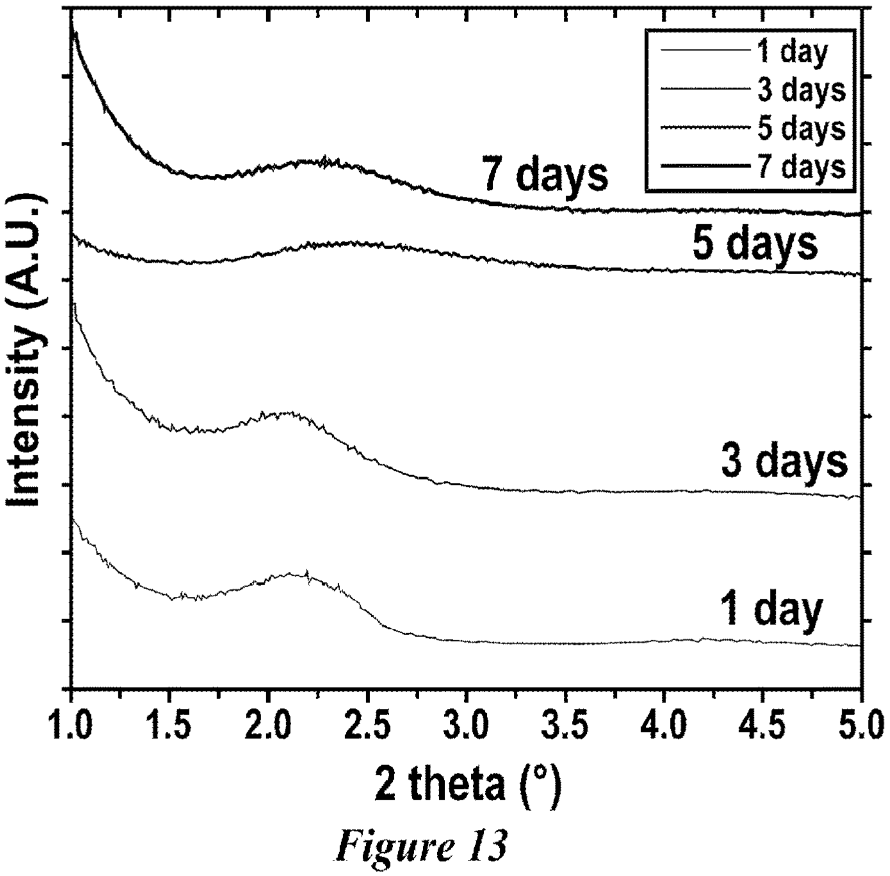

FIG. 13. Low-angle XRD pattern of as-made material with varying duration of hydrothermal treatment.

Figure 14:
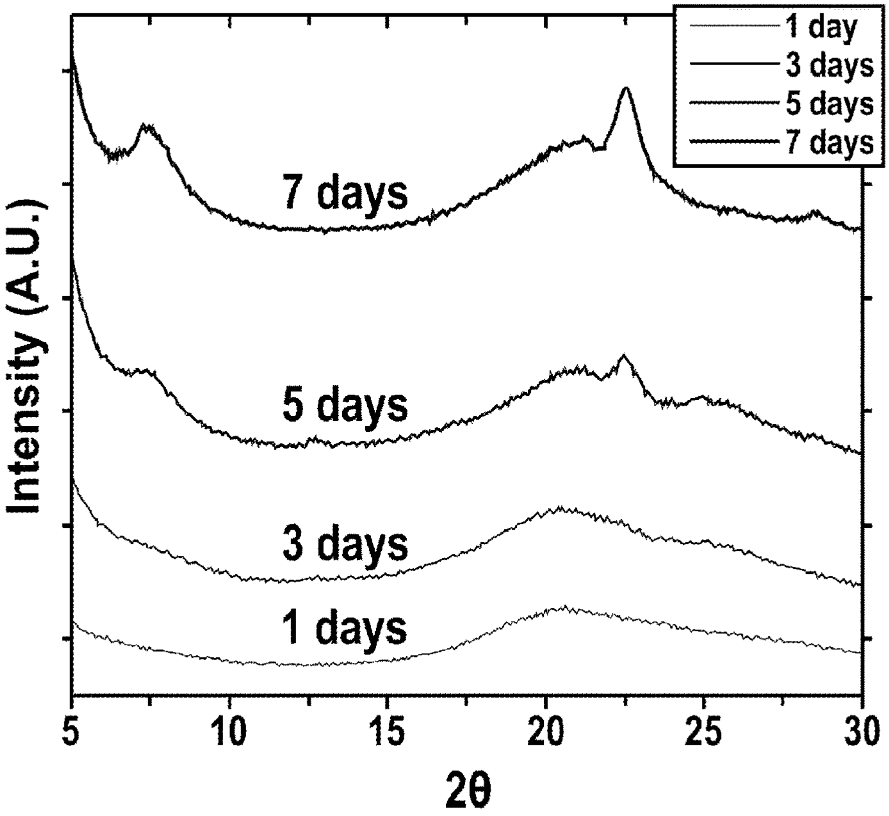

FIG. 14. Wide-angle XRD pattern of as-made material with varying duration of hydrothermal treatment.

Figure 15:
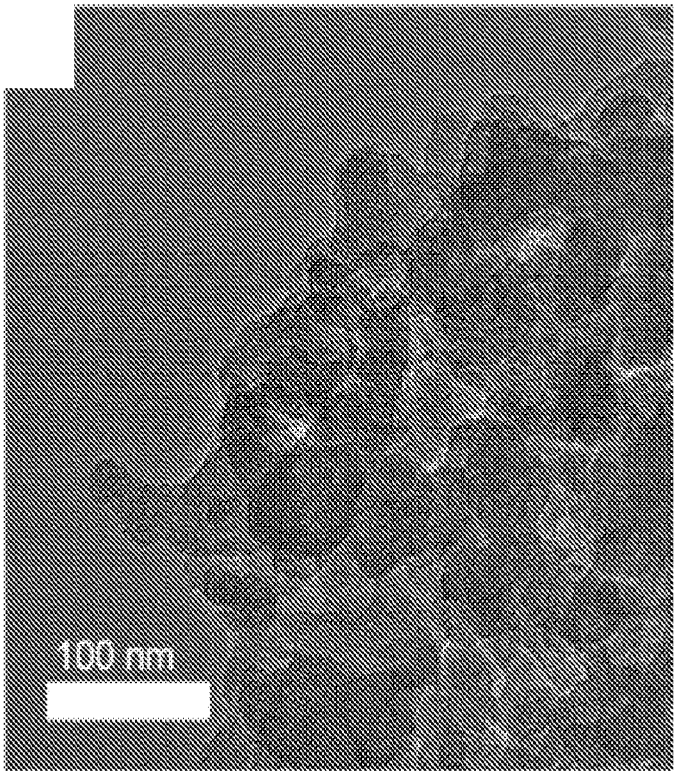

FIG. 15. TEM image of as-made material obtained after 1 day of hydrothermal growth.

Figure 16:
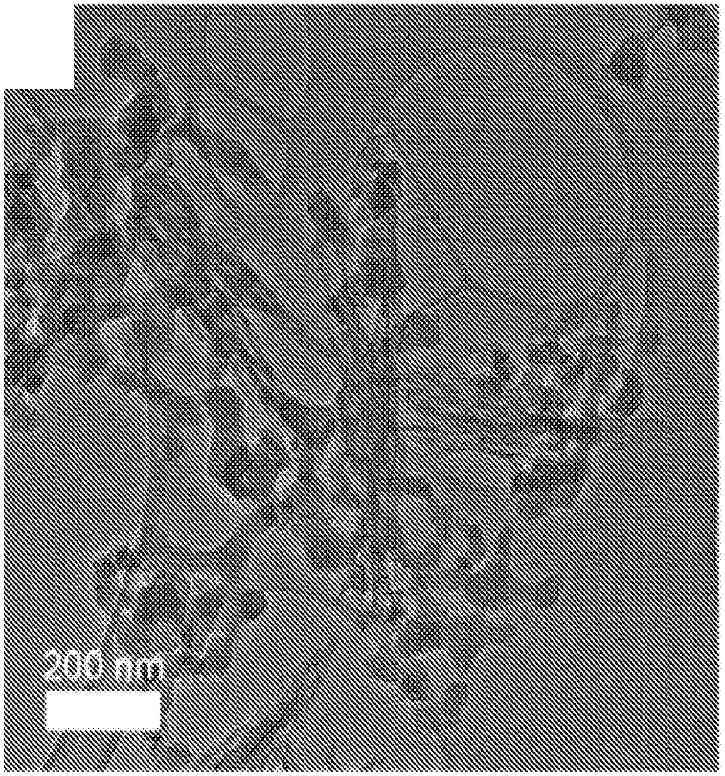

FIG. 16. TEM image of as-made material obtained after 3 days of hydrothermal growth.

Figure 17:
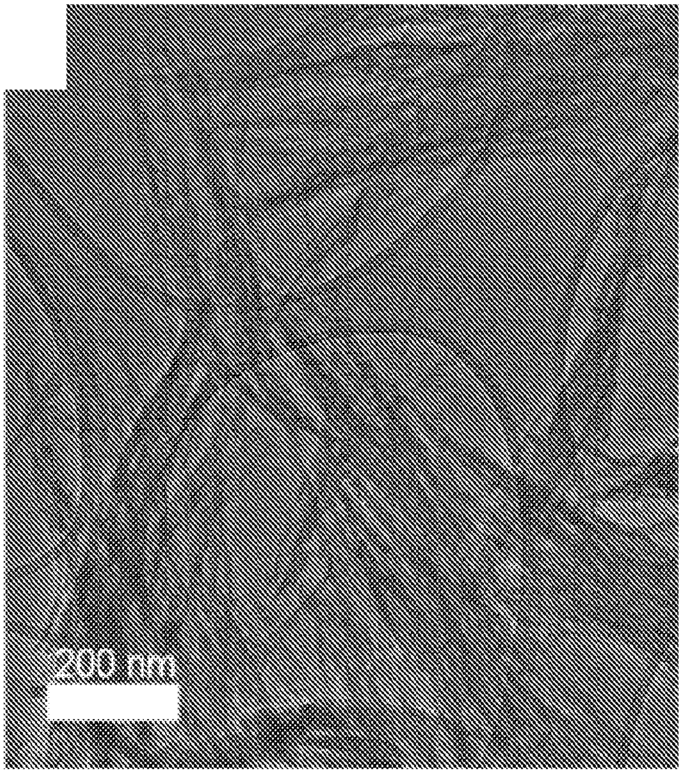

FIG. 17. TEM image of as-made material obtained after 5 days of hydrothermal growth.

Figure 18:
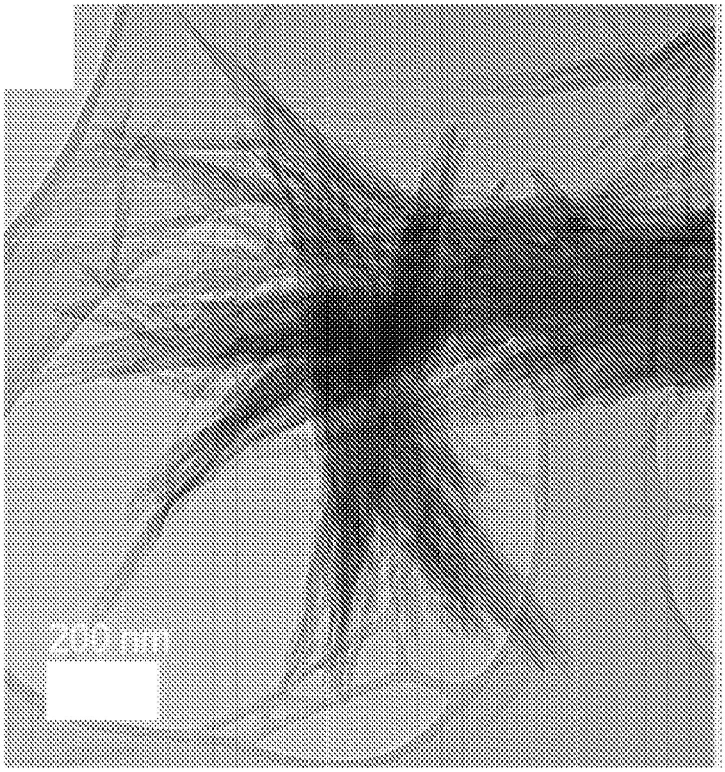

FIG. 18. TEM image of as-made material obtained after 7 days of hydrothermal growth.

Figure 19:
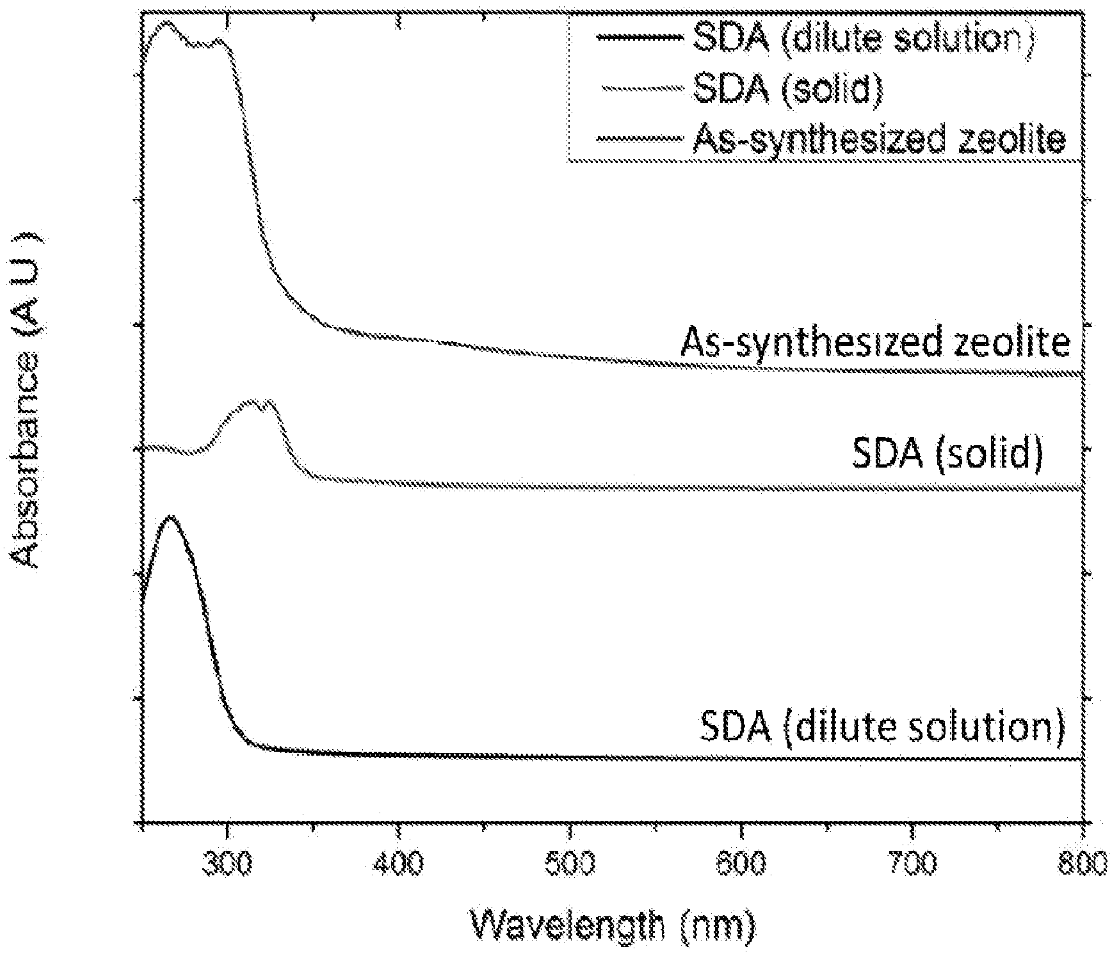

FIG. 19. UV/Vis spectra of the dilute structure-directing agent (SDA) solution (bottom trace), solid structure-directing agent (SDA) (middle trace), and as-synthesized nanotubes (upper trace).

Figure 20:
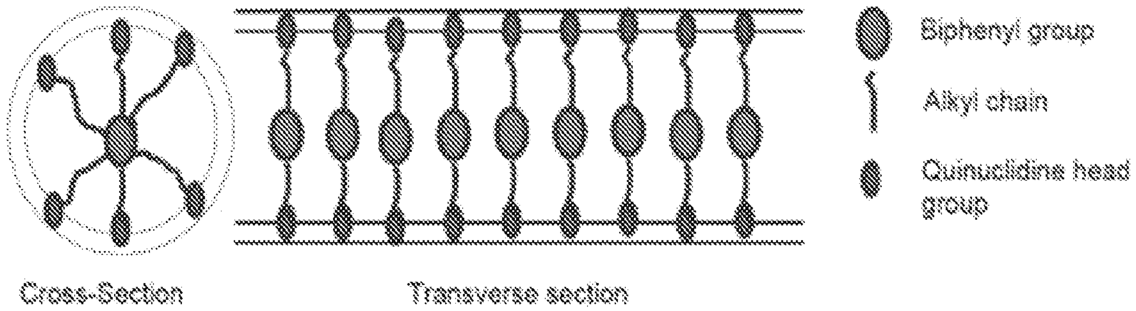

FIG. 20. Schematic of the templating action by the structure-directing agent (SDA) to crystallize the nanotubes.

Figure 21:
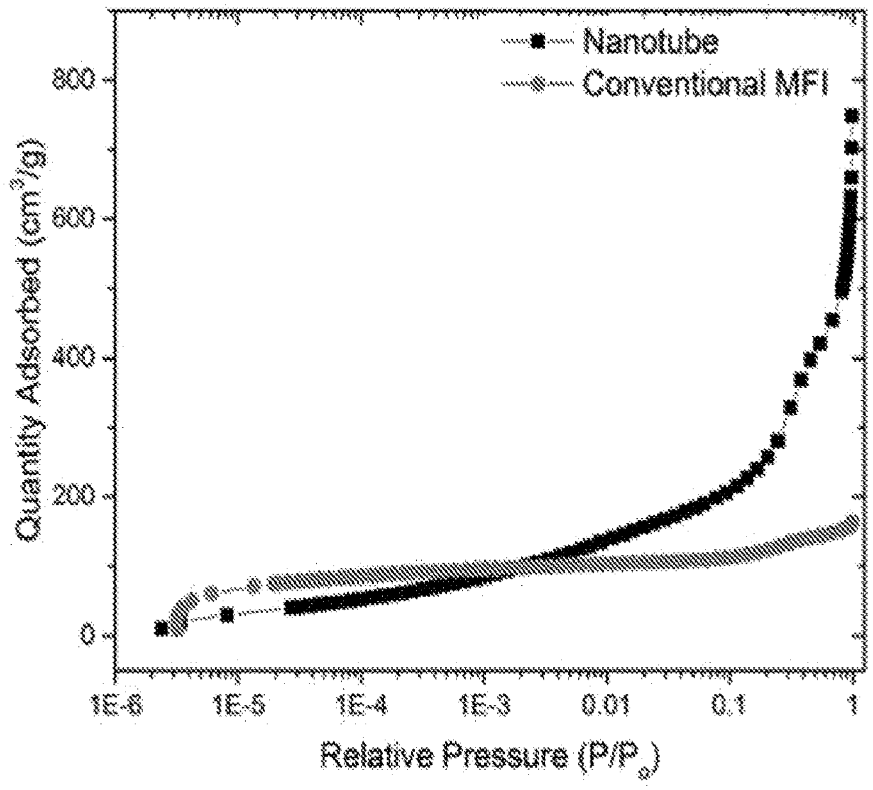

FIG. 21. Nitrogen physisorption isotherms of nanotubes and conventional MFI zeolite (for comparison).

Figure 22:
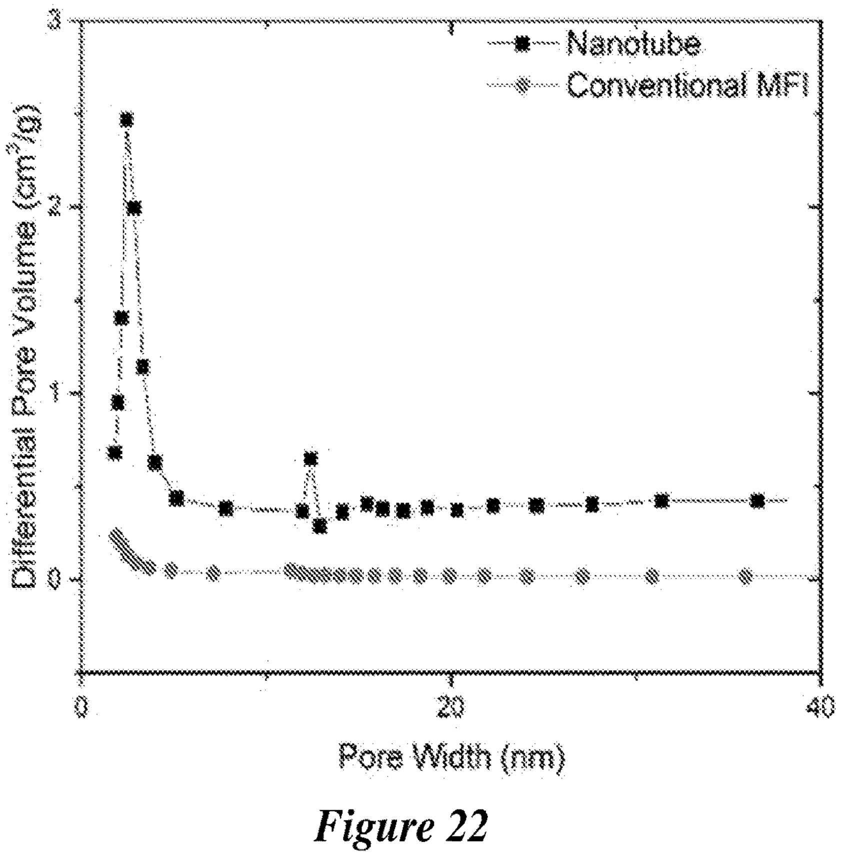

FIG. 22. Mesopore size distributions of nanotubes and conventional MFI zeolite (for comparison).

Figure 23:
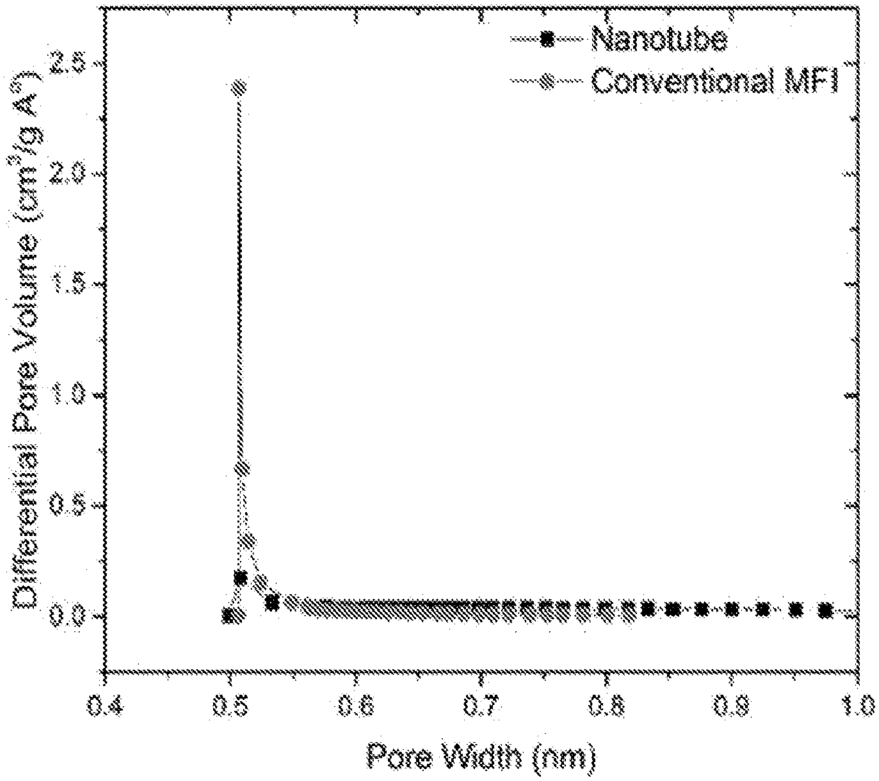

FIG. 23. Micropore size distributions of nanotubes and conventional MFI zeolite (for comparison).

Figure 24:
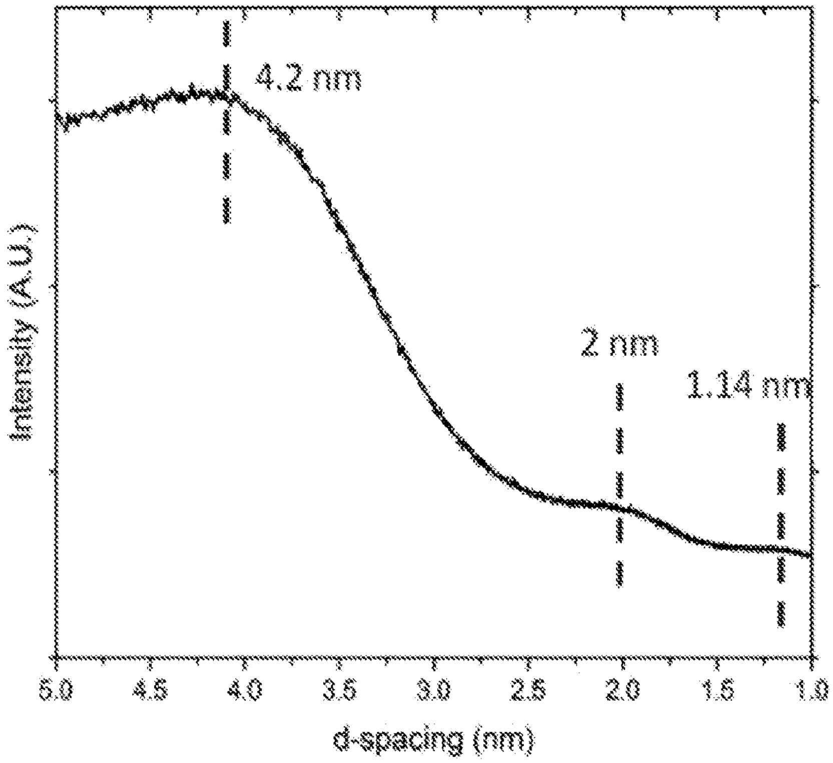

FIG. 24. Low-angle XRD pattern for the calcined nanotubes.

Figure 25:
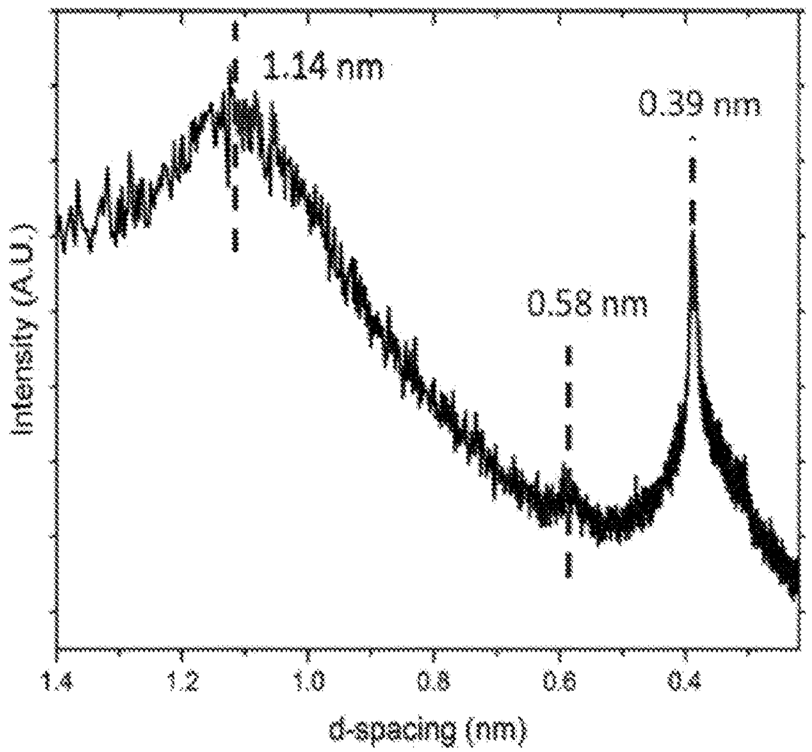

FIG. 25. Wide-angle XRD pattern for the calcined nanotubes.

Figure 26:
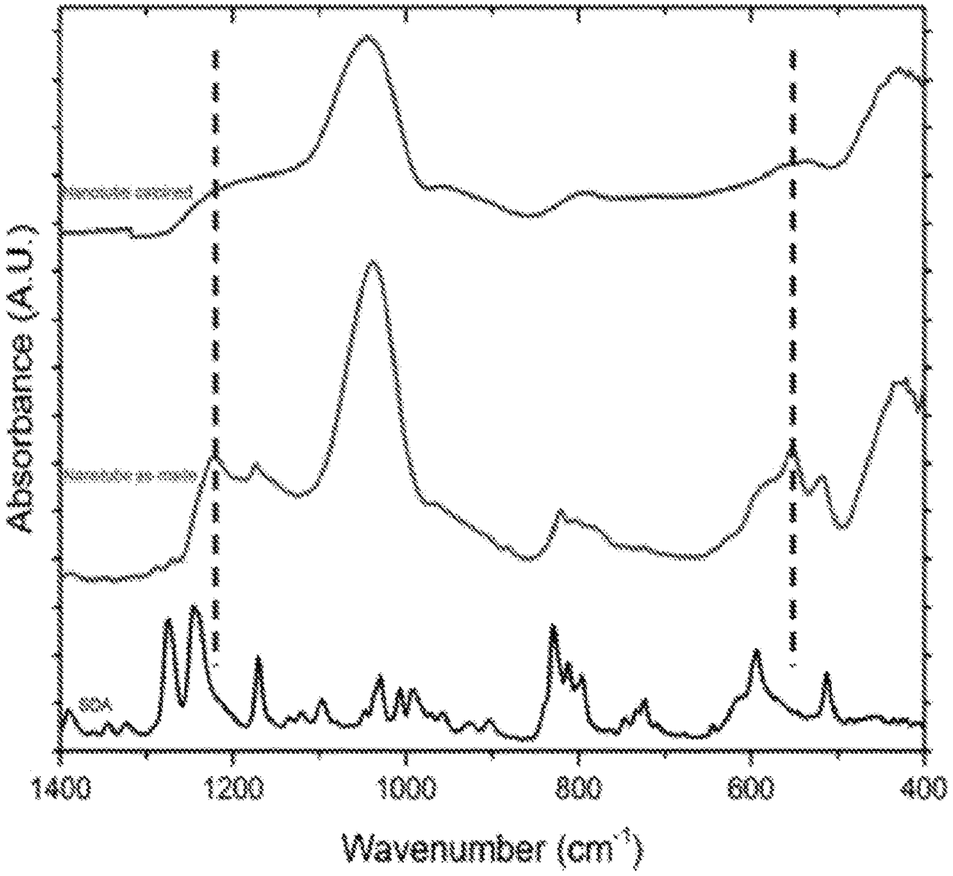

FIG. 26. FT-IR spectra of the solid structure directing agent (bottom trace), the as-made nanotubes (middle trace), and calcined nanotubes (upper trace).

Figure 27:
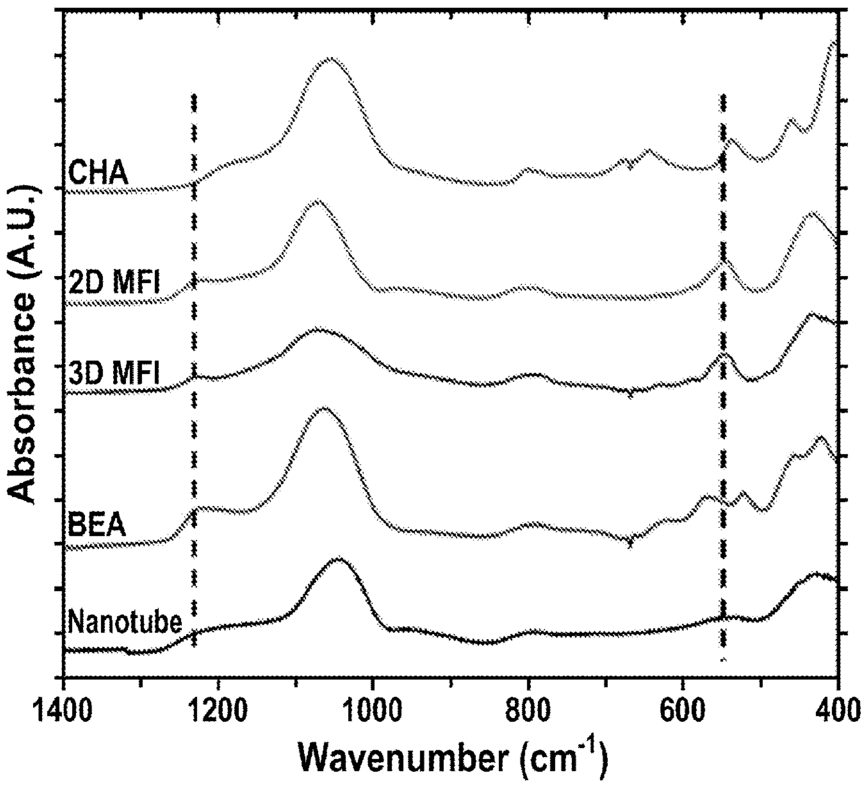

FIG. 27. Comparison of FT-IR spectra of several zeolite materials.

Figure 28:
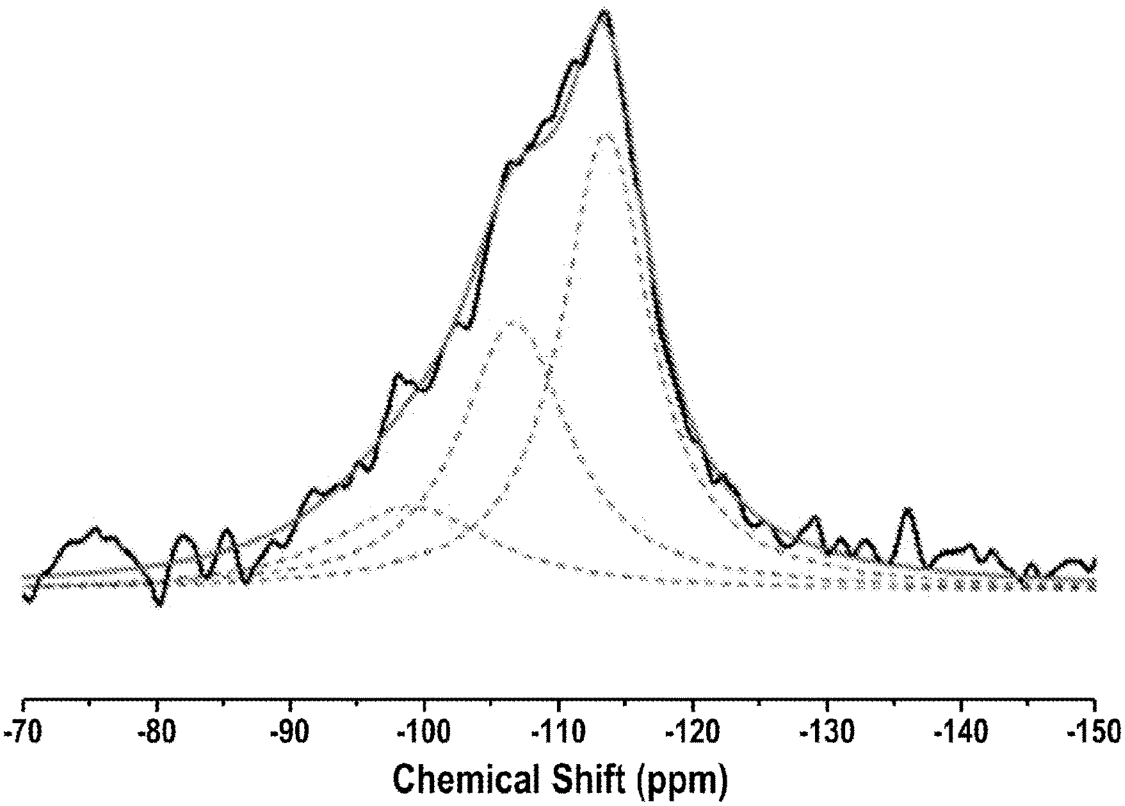

FIG. 28. $^{29}Si$ MAS NMR spectra of the as-made nanotubes. Black curve is the acquired signal. Dotted curves are the fitted deconvoluted peaks (Lorentzians) and the solid grey curve is the overall fit based on the deconvolution.

Figure 29:
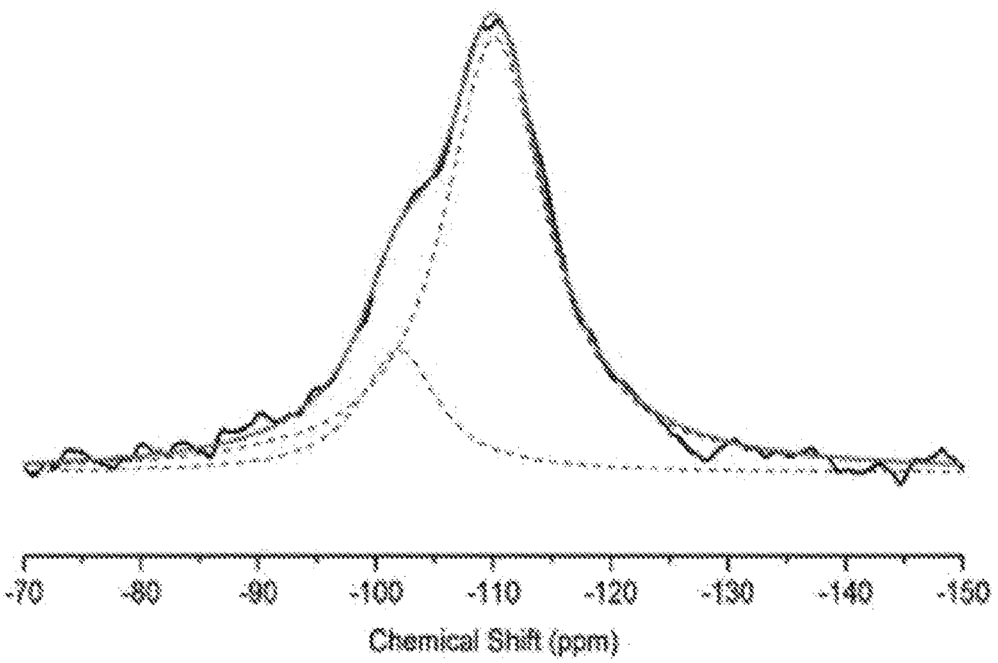

FIG. 29. $^{29}Si$ MAS NMR spectra of the calcined nanotubes. Black curve is the acquired signal. Dotted curves are the fitted deconvoluted peaks (Lorentzians) and the solid grey curve is the overall fit based on the deconvolution.

Figure 30:
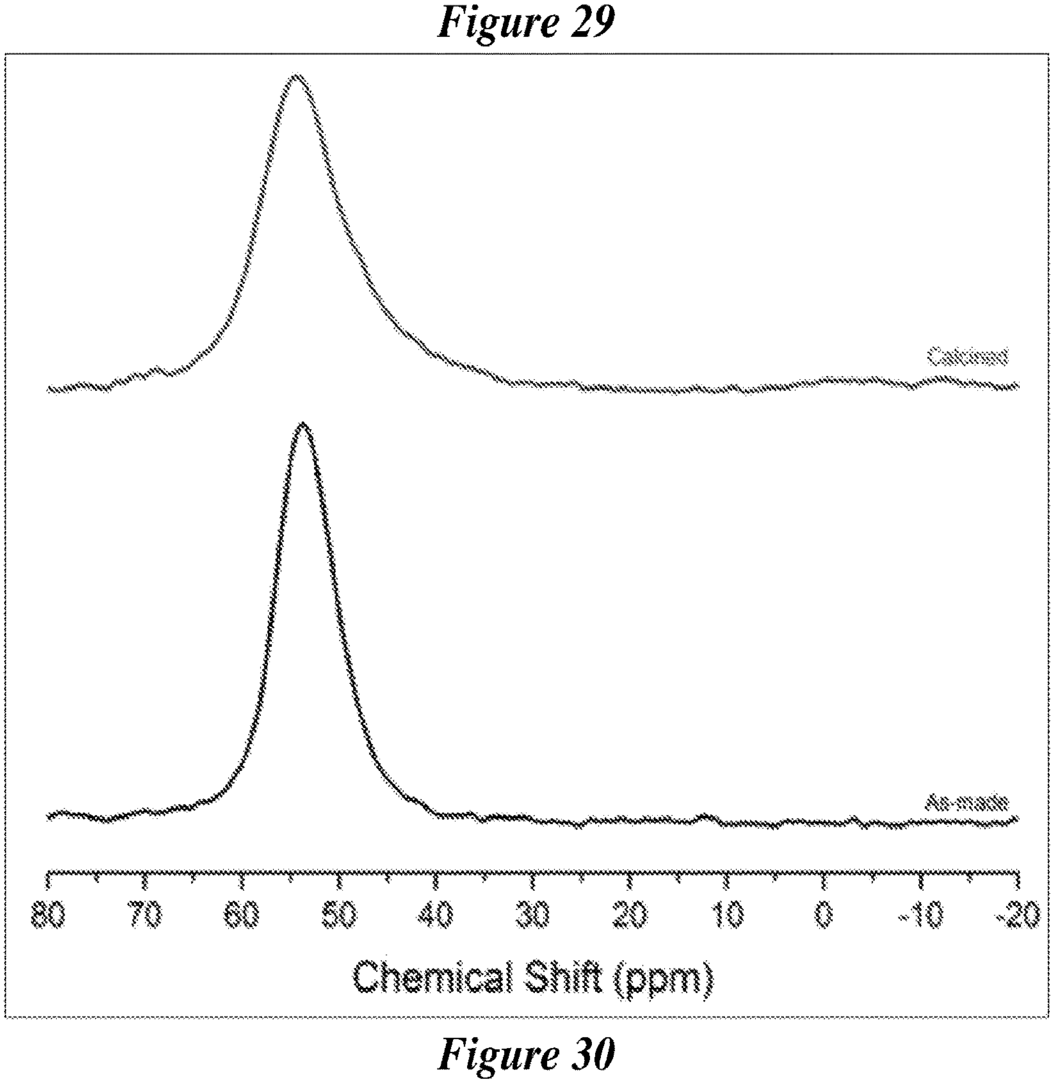

FIG. 30. $^{27}Al$ MAS NMR spectra of the as-made (lower trace) and calcined (upper trace) nanotubes.

Figure 31:
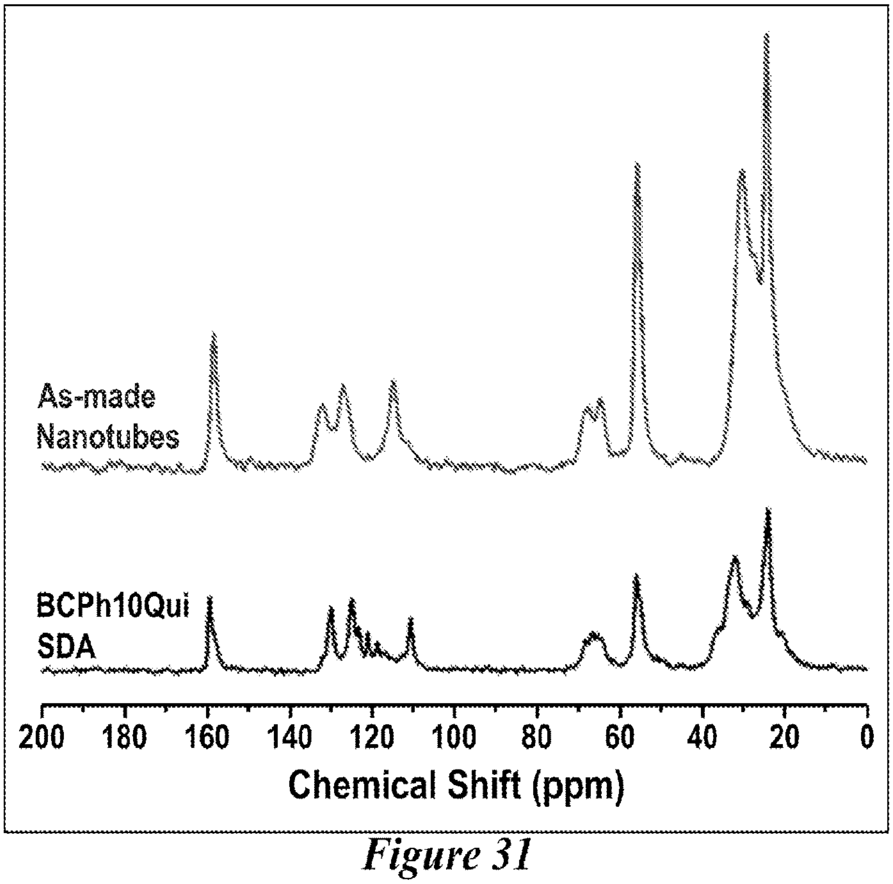

FIG. 31. $^{13}C$ CP MAS NMR of the BCPh10Qui structure directing agent (lower trace) and as-made nanotubes (upper trace).

Figure 32:
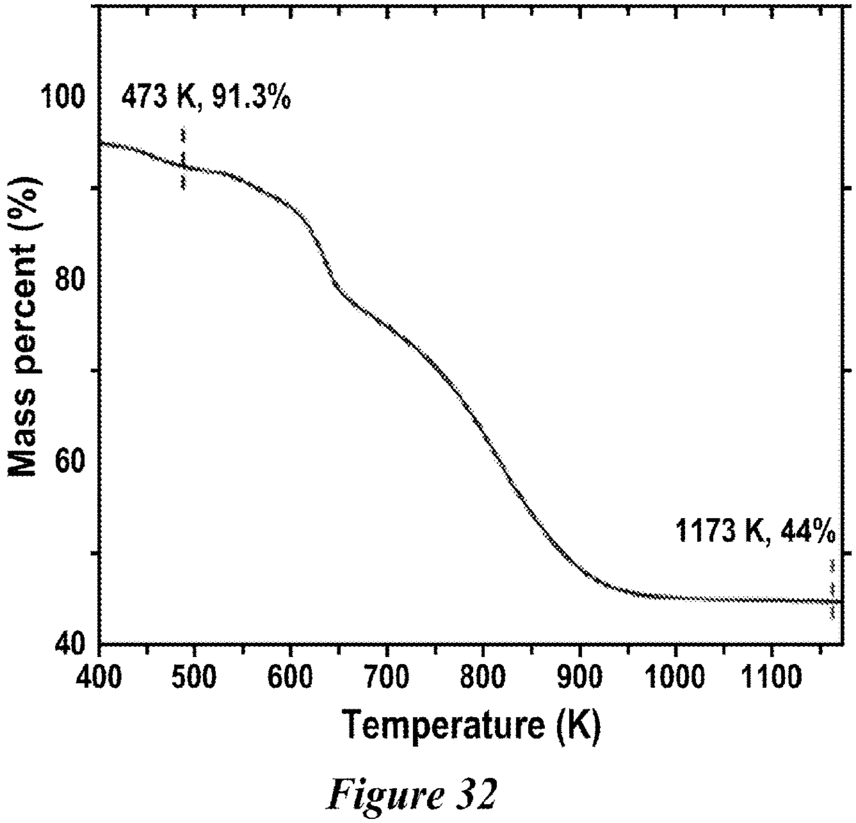

FIG. 32. TGA mass loss profile with temperature of the as-made nanotubes.

Figure 33:
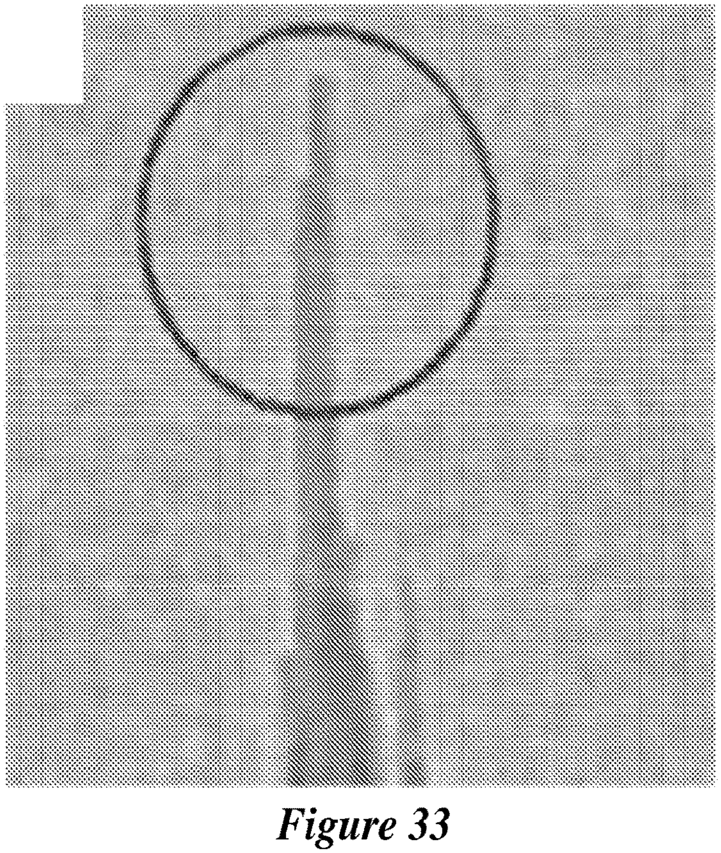

FIG. 33. Image of zeolitic nanotubes. Circle indicates where selected area electron diffraction pattern shown in FIG. 34 was collected from the zeolitic nanotubes.

Figure 34:
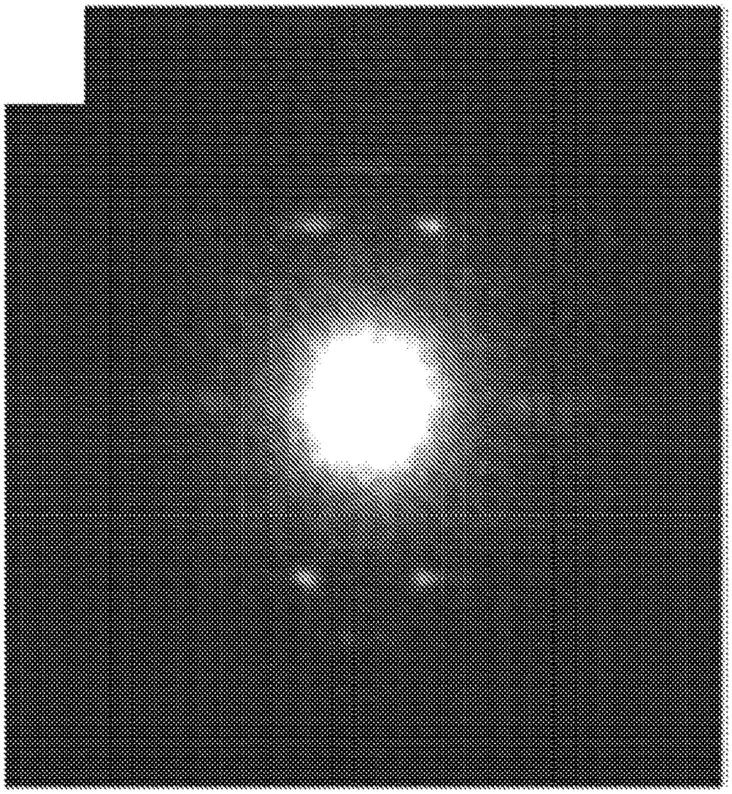

FIG. 34. Selected area electron diffraction pattern from zeolitic nanotubes show typical tubular features with a periodicity of 12.4 Å along the extended direction if the tube and rather diffuse features perpendicular to the tube.

Figure 35:
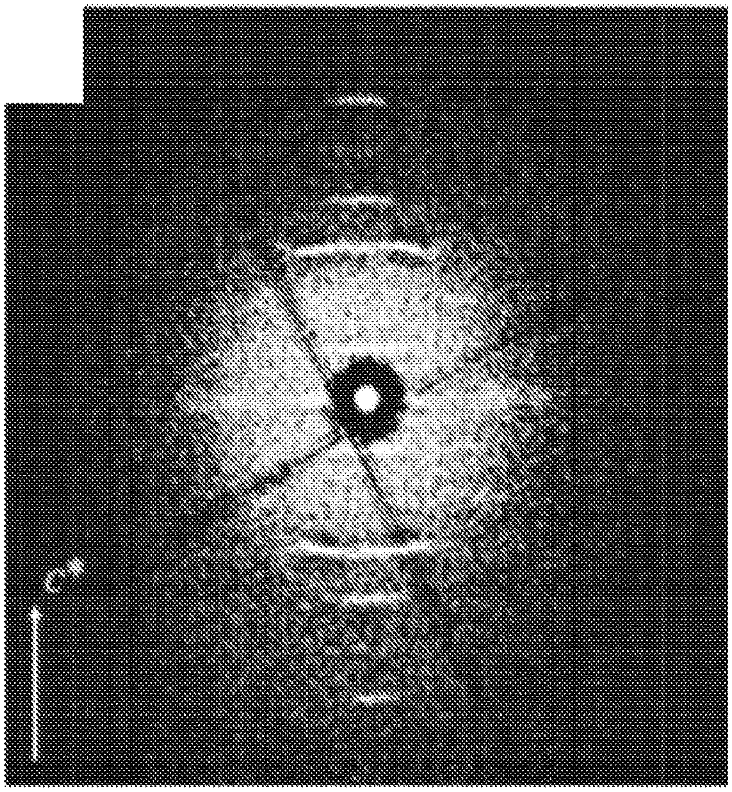

FIG. 35. Reconstructed 3D electron diffraction data collected from a bundle of zeolitic nanotubes shows a periodicity of 12.7 Å along the extended direction (denoted c*) and more extended intensities in the planes perpendicular to the c*-direction.

Figure 36:
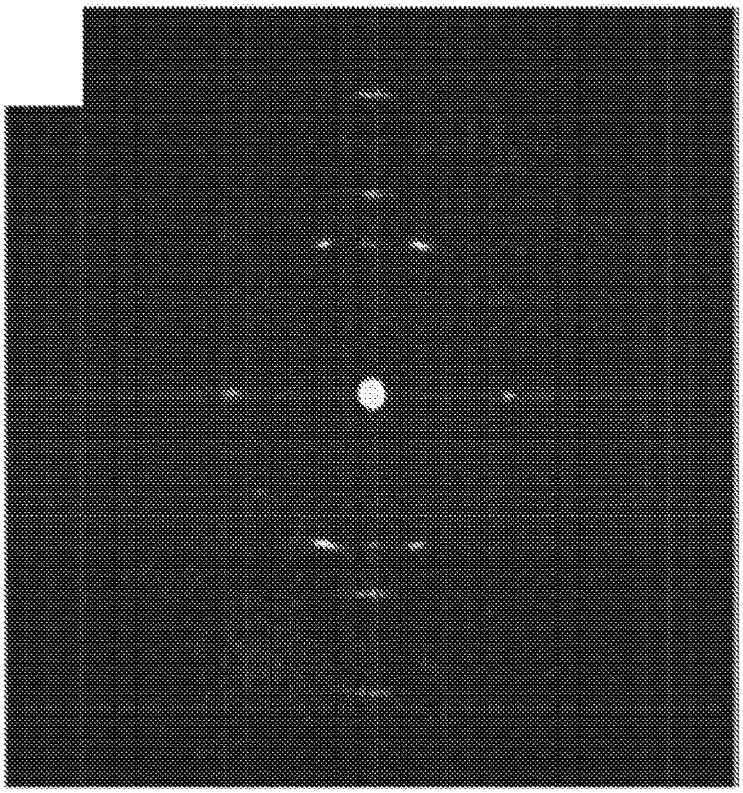

FIG. 36. Reconstructed 3D electron diffraction data collected from a bundle of zeolitic nanotubes shows a periodicity of 12.7 Å along the extended direction (denoted c*) and more extended intensities in the planes perpendicular to the c*-direction.

Figure 37:
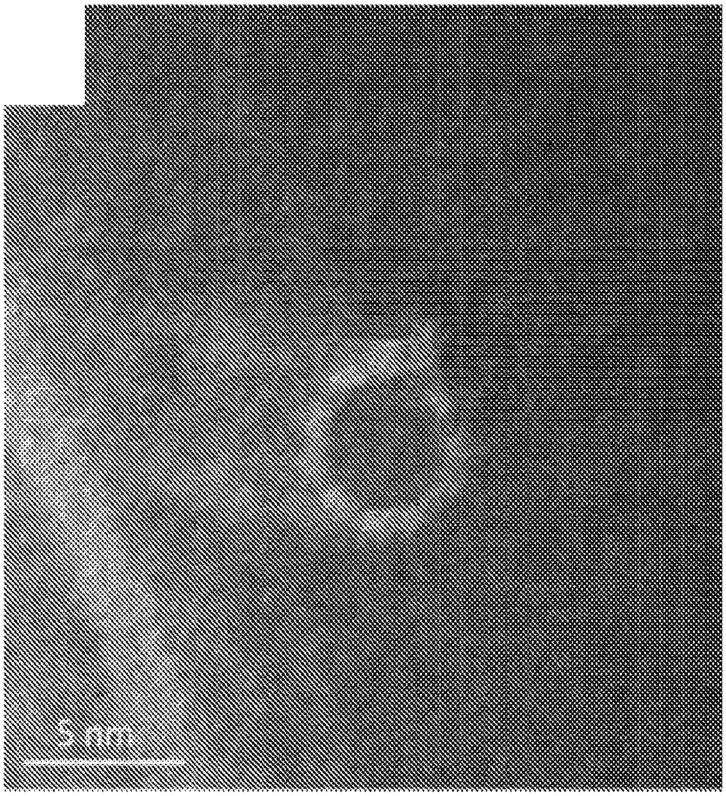

FIG. 37. Annular dark-field scanning transmission electron microscopy (ADF STEM) image of a single wall zeolitic nanotubes viewed along its tube direction.

Figure 38:
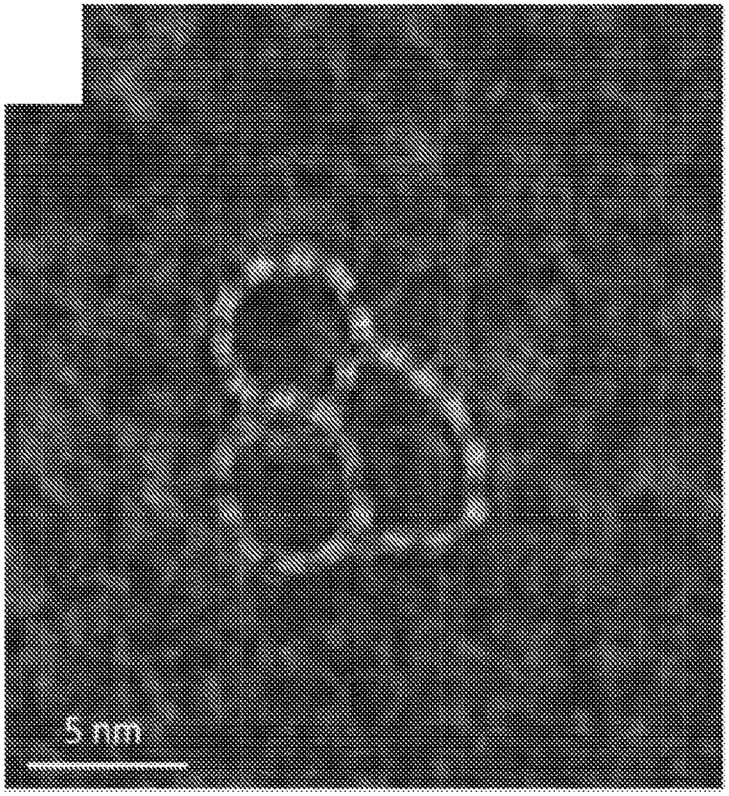

FIG. 38. Integrated Differential Phase contrast (iDPC) image of three fused nanotubes. The two circular tubes are built from 10 identical building units around its circumference, while the third tube contains 11 such building units and is no longer circular.

Figure 39:
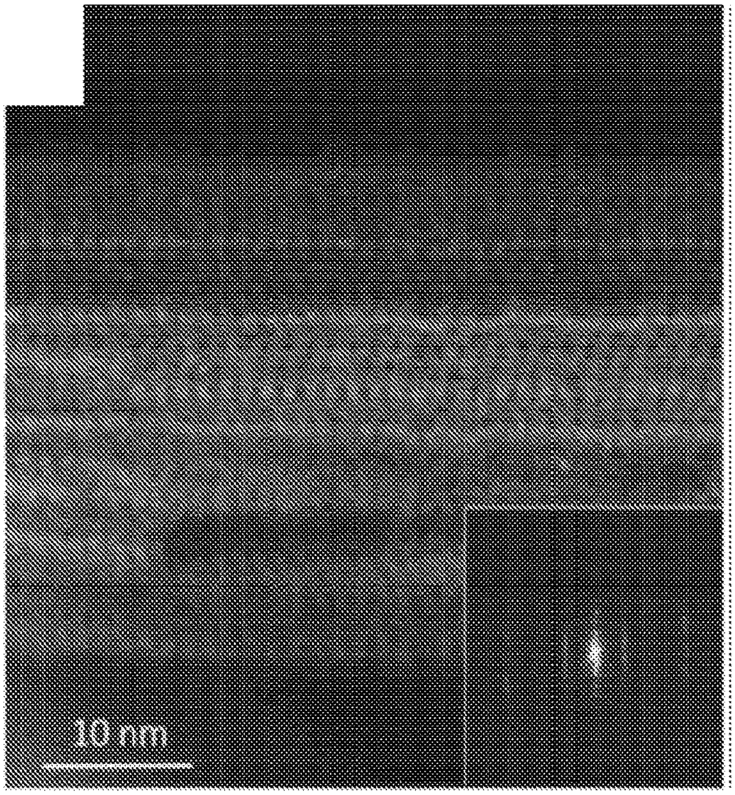

FIG. 39. ADF STEM image viewed perpendicular to the nanotube. The inset in is the Fourier transform, showing a periodicity of 12.5 Å along the tube direction.

Figure 40:
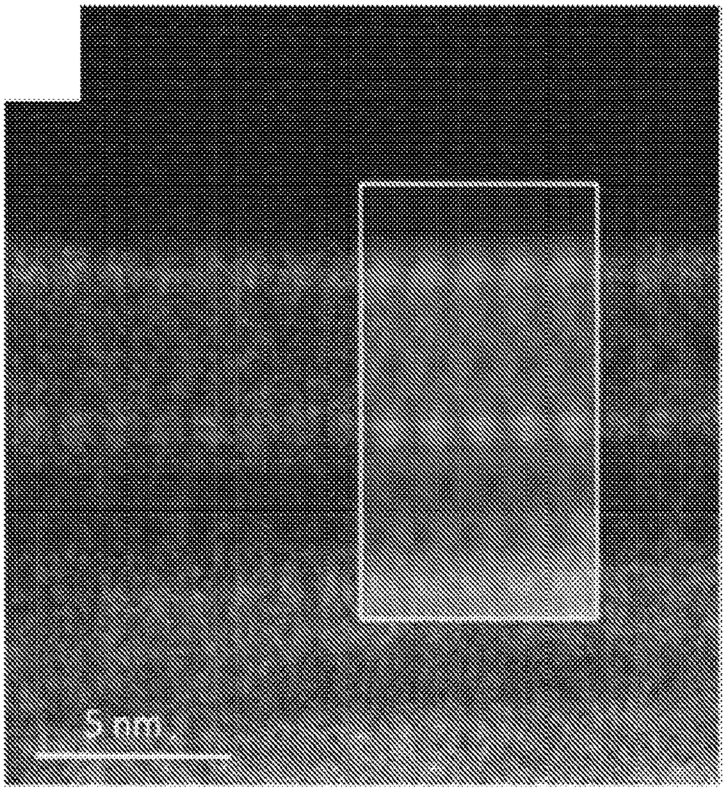

FIG. 40. An enlarged ADF STEM image viewed perpendicular to the nanotube shows the fine structure of the nanotube wall with a Fourier filtered image as inset, where micropores as well as small rings surrounding the pores are observed.

Figure 41:
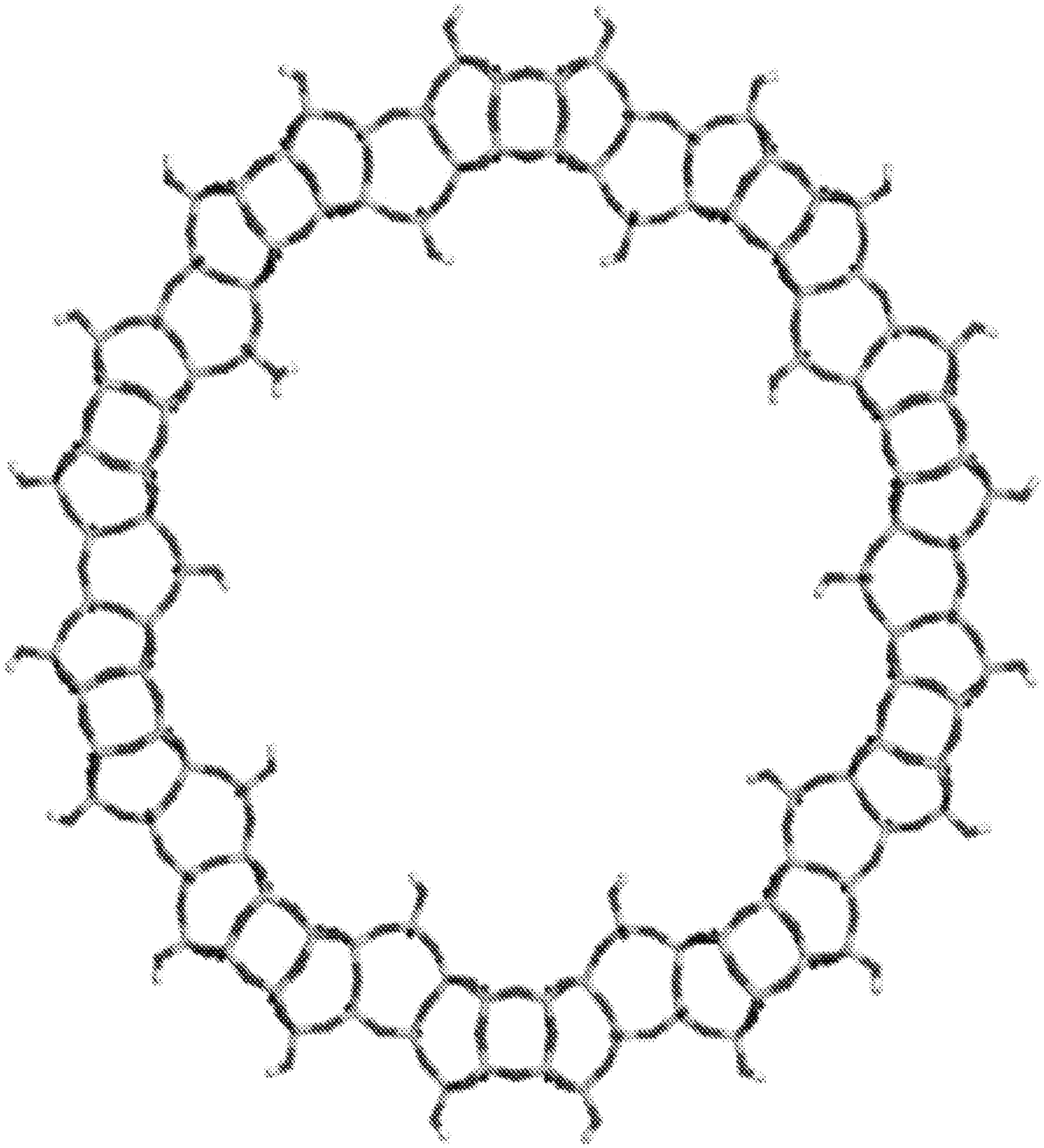

FIG. 41. Atomic structure model of the zeolitic 10-unit nanotube viewed along the tube direction (defined as c-axis). The building unit is extracted from the structure of zeolite beta, here polymorph A. 10-ring channels are present on the wall. The T (T=Si/Al) atoms are shown in yellow, oxygen in red and hydrogen in white.

Figure 42:
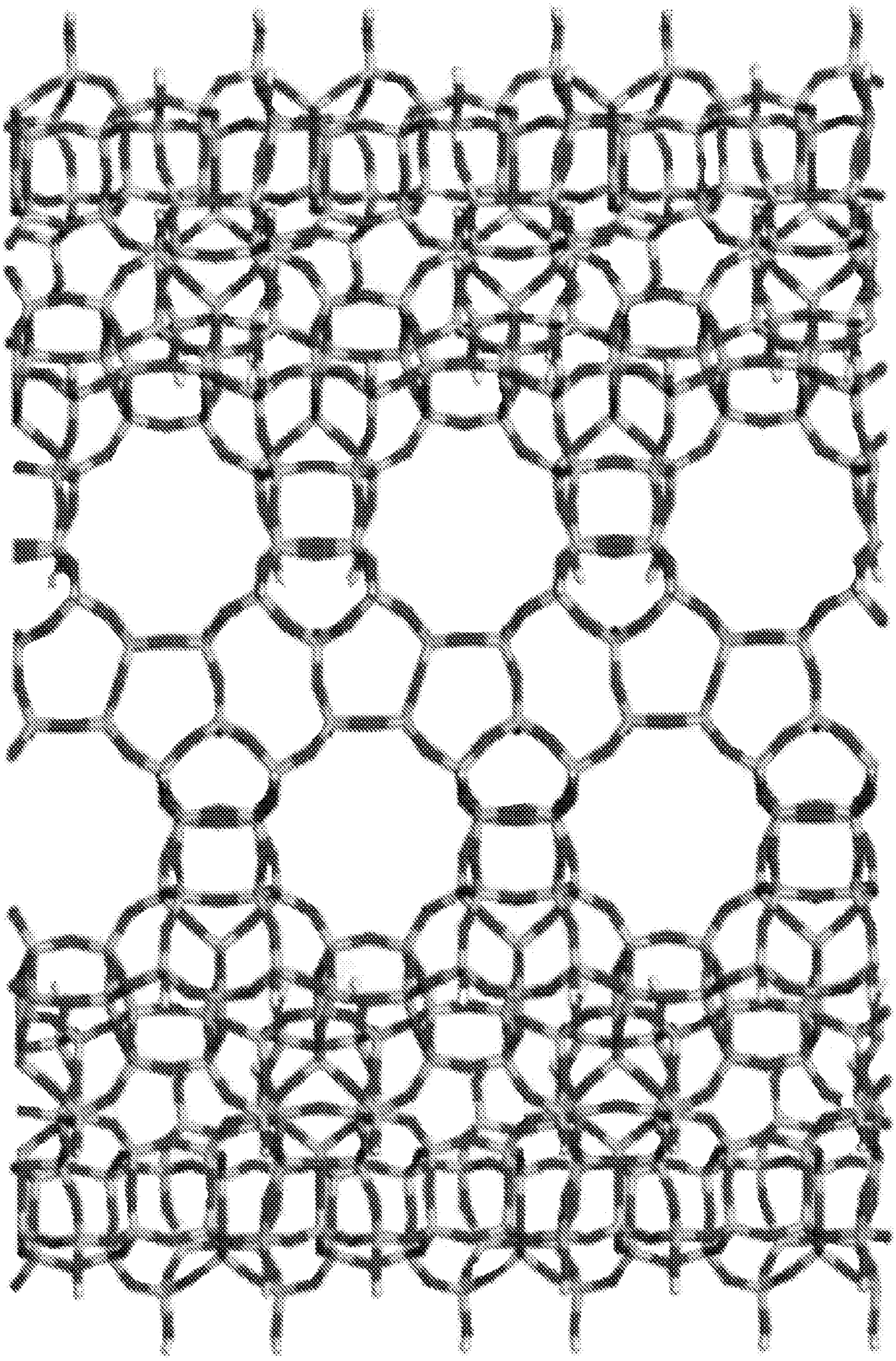

FIG. 42. Atomic structure model of the zeolitic 10-unit nanotube viewed perpendicular to the tube direction (defined as c-axis). The building unit is extracted from the structure of zeolite beta, here polymorph A. 10-ring channels are present on the wall. The T (T=Si/Al) atoms are shown in yellow, oxygen in red and hydrogen in white.

Figure 43:
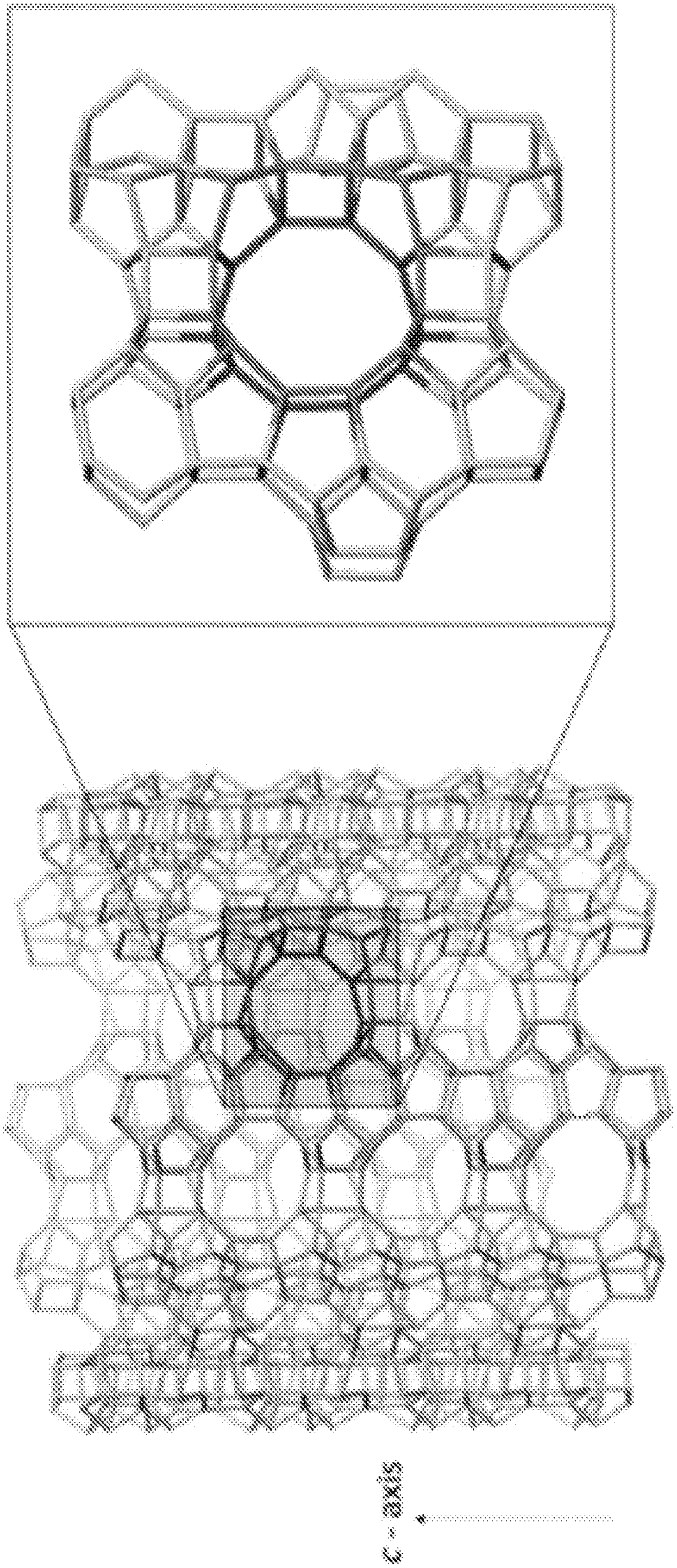

FIG. 43. Construction of the nanotube. The wall of the tube is penetrated by micropores limited by a ring of 10 (Si/Al) tetrahedra at the inner rim and a ring of 12 (Si/Al) tetrahedra at the outer one (purple and green respectively). The limiting micropore window will be that of 10 tetrahedral atoms.

Figure 44:
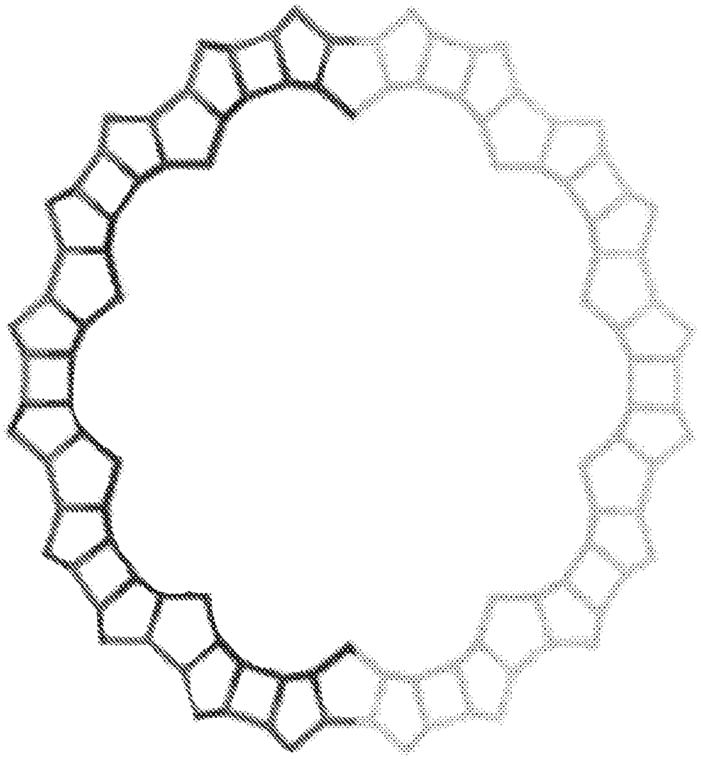

FIG. 44. The tube can be considered as a built from an outer and an inner layer, shown in green and purple. The outer layer is topologically identical to that of zeolite beta and the inner one a layer of the zeolite MFI. Only tetrahedral (Si/Al) atoms are shown for clarity.

Figure 45:
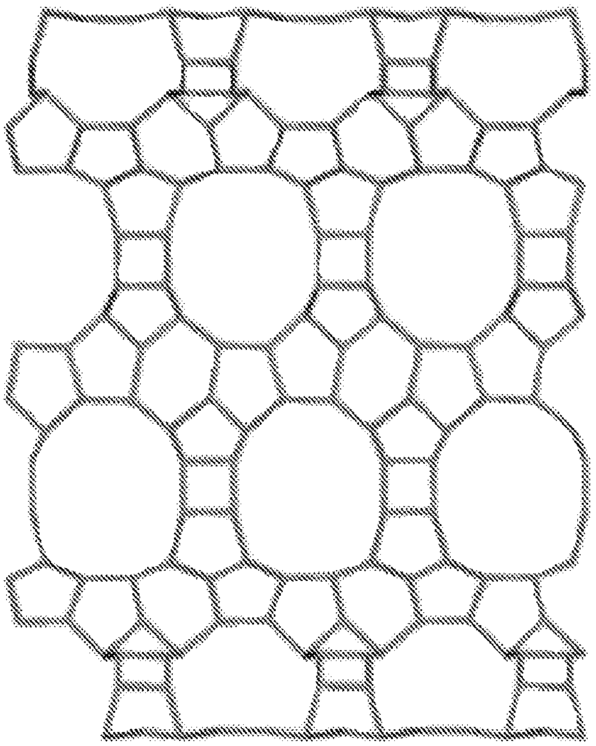

FIG. 45. Construction of the outer layer of the nanotube. The outer layer is built from small rings of 4, 5, and 6 T-atoms which forms a microporous structure of pores limited by 12 T-atoms. The outer layer is topologically identical to that of zeolite beta. Only tetrahedral (Si/Al) atoms are shown for clarity.

Figure 46:
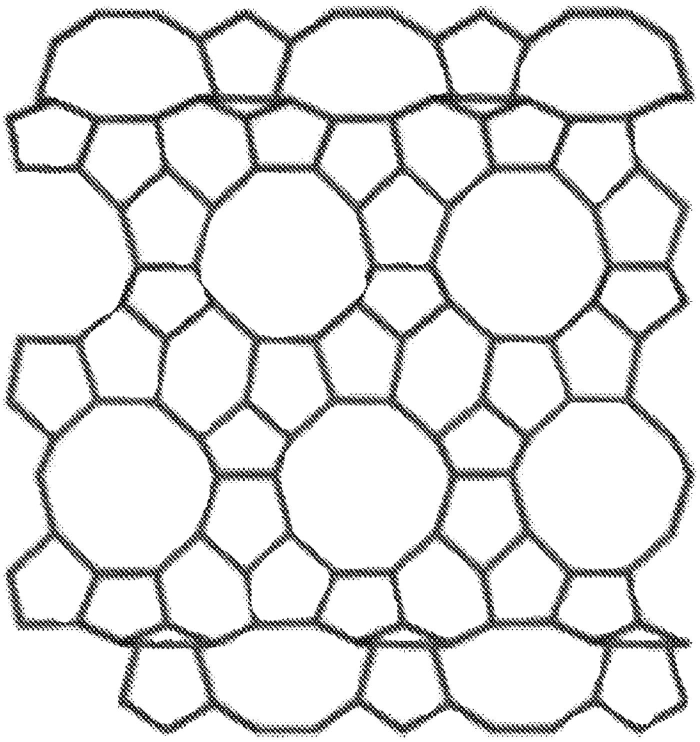

FIG. 46. Construction of the inner layer of the nanotube. The inner layer is built from rings of 5 and 6 T-atoms constructing 10 ring micropores. The inner layer is similar to that of the zeolite MFI. Only tetrahedral (Si/Al) atoms are shown for clarity.

Figure 47:
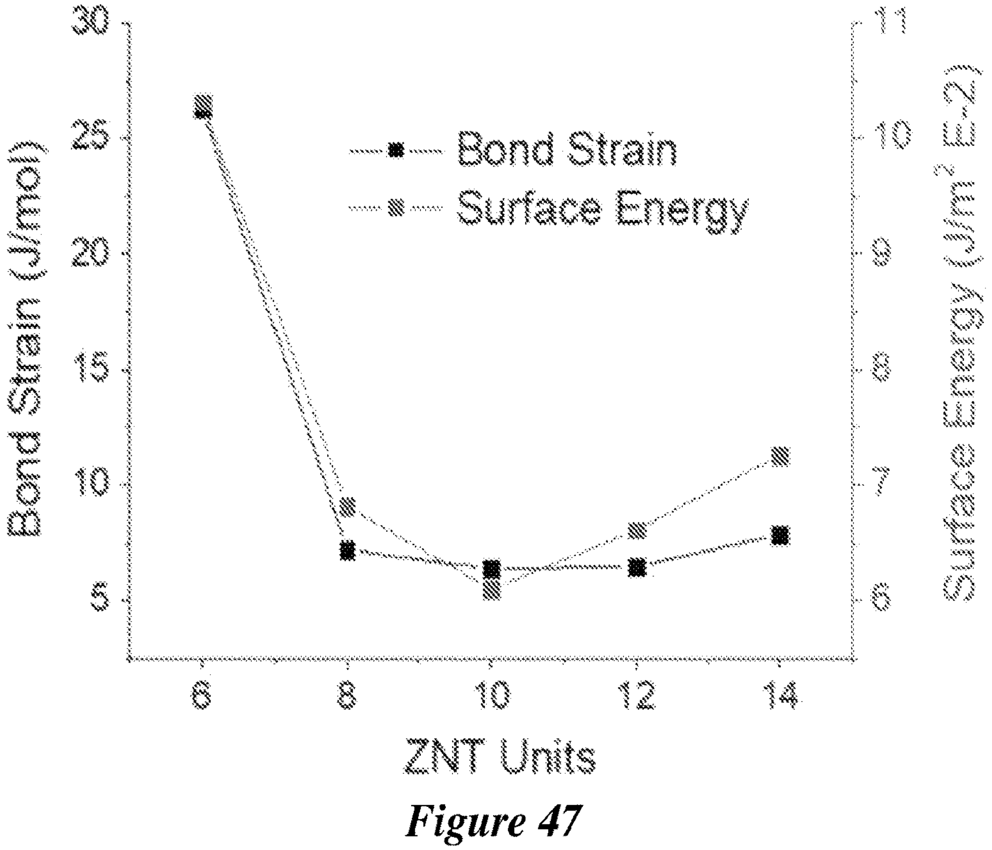

FIG. 47. The bond strain (left axis) and surface energies (right axis) for ZNT nanotubes of various sizes.

Figure 48:
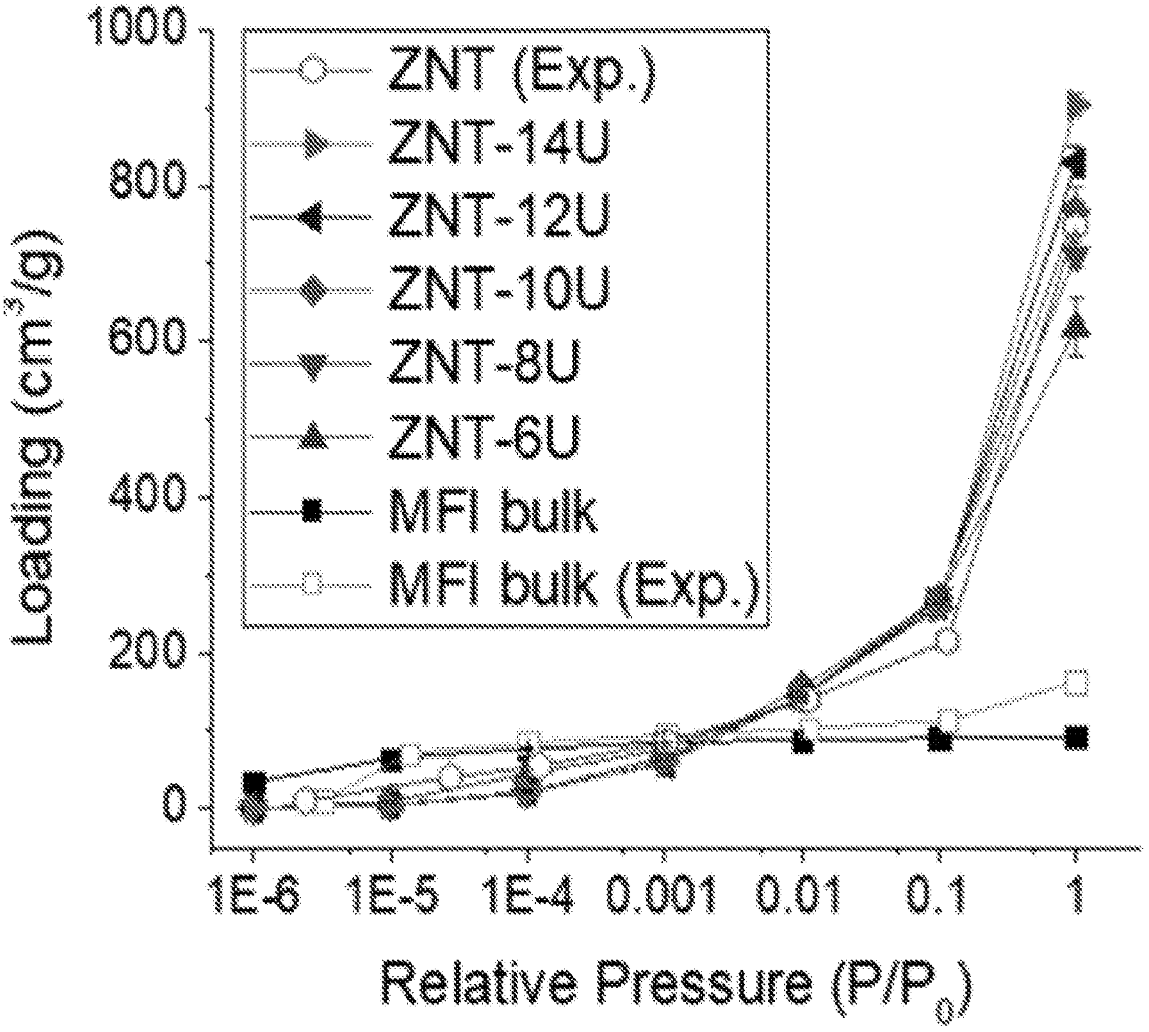

FIG. 48. $N_2$ adsorption isotherms for bulk MFI and ZNT at 77 K. The experimentally obtained isotherms have outline symbols while the simulated isotherms have filled in symbols.

DETAILED DESCRIPTION

The compositions, methods, and systems described herein may be understood more readily by reference to the following detailed description of specific aspects of the disclosed subject matter and the Examples included therein.

Before the present compositions, methods, and systems are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings.

Throughout the description and claims of this specification, the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Values can be expressed herein as an "average" value. "Average" generally refers to the statistical mean value.

By "substantially" is meant within 5%, e.g., within 4%, 3%, 2%, or 1%.

"Exemplary" means "an example of" and is not intended to convey an indication of a preferred or ideal embodiment. "Such as" is not used in a restrictive sense, but for explanatory purposes.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

Chemical Definitions

Unless otherwise defined, all technical and scientific terms used herein have the same meaning as commonly understood by one of ordinary skill in the art to which this invention belongs.

The organic moieties mentioned when defining variable positions within the general formulae described herein (e.g., the term "halogen") are collective terms for the individual substituents encompassed by the organic moiety. The prefix $C_n$-$C_m$ preceding a group or moiety indicates, in each case, the possible number of carbon atoms in the group or moiety that follows.

The term "ion," as used herein, refers to any molecule, portion of a molecule, cluster of molecules, molecular complex, moiety, or atom that contains a charge (positive, negative, or both at the same time within one molecule, cluster of molecules, molecular complex, or moiety (e.g., zwitterions)) or that can be made to contain a charge. Methods for producing a charge in a molecule, portion of a molecule, cluster of molecules, molecular complex, moiety, or atom are disclosed herein and can be accomplished by methods known in the art, e.g., protonation, deprotonation, oxidation, reduction, alkylation, acetylation, esterification, de-esterification, hydrolysis, etc.

The term "anion" is a type of ion and is included within the meaning of the term "ion." An "anion" is any molecule, portion of a molecule (e.g., zwitterion), cluster of molecules, molecular complex, moiety, or atom that contains a net negative charge or that can be made to contain a net negative charge. The term "anion precursor" is used herein to specifically refer to a molecule that can be converted to an anion via a chemical reaction (e.g., deprotonation).

The term "cation" is a type of ion and is included within the meaning of the term "ion." A "cation" is any molecule, portion of a molecule (e.g., zwitterion), cluster of molecules, molecular complex, moiety, or atom, that contains a net positive charge or that can be made to contain a net positive charge. The term "cation precursor" is used herein to specifically refer to a molecule that can be converted to a cation via a chemical reaction (e.g., protonation or alkylation).

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

"$Z^1$," "$Z^2$," "$Z^3$," and "$Z^4$" are used herein as generic symbols to represent various specific substituents. These symbols can be any substituent, not limited to those disclosed herein, and when they are defined to be certain substituents in one instance, they can, in another instance, be defined as some other substituents.

The term "aliphatic" as used herein refers to a non-aromatic hydrocarbon group and includes branched and unbranched, alkyl, alkenyl, or alkynyl groups.

As used herein, the term "alkyl" refers to saturated, straight-chained or branched saturated hydrocarbon moieties. Unless otherwise specified, $C_1$-$C_{24}$ (e.g., $C_1$-$C_{22}$, $C_1$-$C_{20}$, $C_1$-$C_{18}$, $C_1$-$C_{16}$, $C_1$-$C_{12}$, $C_1$-$C_{10}$, $C_1$-$C_8$, $C_1$-$C_6$, or $C_1$-$C_4$) alkyl groups are intended. Examples of alkyl groups include methyl, ethyl, propyl, 1-methyl-ethyl, butyl, 1-methyl-propyl, 2-methyl-propyl, 1,1-dimethyl-ethyl, pentyl, 1-methyl-butyl, 2-methyl-butyl, 3-methyl-butyl, 2,2-dimethyl-propyl, 1-ethyl-propyl, hexyl, 1,1-dimethyl-propyl, 1,2-dimethyl-propyl, 1-methyl-pentyl, 2-methyl-pentyl, 3-methyl-pentyl, 4-methyl-pentyl, 1,1-dimethyl-butyl, 1,2-dimethyl-butyl, 1,3-dimethyl-butyl, 2,2-dimethyl-butyl, 2,3-dimethyl-butyl, 3,3-dimethyl-butyl, 1-ethyl-butyl, 2-ethyl-butyl, 1,1,2-trimethyl-propyl, 1,2,2-trimethyl-propyl, 1-ethyl-1-methyl-propyl, 1-ethyl-2-methyl-propyl, heptyl, octyl, nonyl, decyl, dodecyl, tetradecyl, hexadecyl, eicosyl, tetracosyl, and the like. Alkyl substituents may be unsubstituted or substituted with one or more chemical moieties. The alkyl group can be substituted with one or more groups including, but not limited to, hydroxyl, halogen, acyl, alkyl, alkoxy, alkenyl, alkynyl, aryl, heteroaryl, aldehyde, amino, cyano, carboxylic acid, ester, ether, ketone, nitro, phosphonyl, silyl, sulfo-oxo, sulfonyl, sulfone, sulfoxide, or thiol, as described below, provided that the substituents are sterically compatible and the rules of chemical bonding and strain energy are satisfied.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halides (halogens; e.g., fluorine, chlorine, bromine, or iodine). The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

As used herein, the term "alkenyl" refers to unsaturated, straight-chained, or branched hydrocarbon moieties containing a double bond. Unless otherwise specified, $C_2$-$C_{24}$ (e.g., $C_2$-$C_{22}$, $C_2$-$C_{20}$, $C_2$-$C_{18}$, $C_2$-$C_{16}$, $C_2$-$C_{14}$, $C_2$-$C_{12}$, $C_2$-$C_{10}$, $C_2$-$C_8$, $C_2$-$C_6$, or $C_2$-$C_4$) alkenyl groups are intended. Alkenyl groups may contain more than one unsaturated bond. Examples include ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl, and 1-ethyl-2-methyl-2-propenyl. The term "vinyl" refers to a group having the structure $-CH{=}CH_2$; 1-propenyl refers to a group with the structure $-CH{=}CH-CH_3$; and 2-propenyl refers to a group with the structure $-CH_2-CH{=}CH_2$. Asymmetric structures such as $(Z^1Z^2)C{=}C(Z^3Z^4)$ are intended to include both the E and Z isomers. This can be presumed in structural formulae herein wherein an asymmetric alkene is present, or it can be explicitly indicated by the bond symbol $C{=}C$. Alkenyl substituents may be unsubstituted or substituted with one or more chemical moieties. Examples of suitable substituents include, for example, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol, as described below, provided that the substituents are sterically compatible and the rules of chemical bonding and strain energy are satisfied.

As used herein, the term "alkynyl" represents straight-chained or branched hydrocarbon moieties containing a triple bond. Unless otherwise specified, $C_2$-$C_{24}$ (e.g., $C_2$-$C_{24}$, $C_2$-$C_{20}$, $C_2$-$C_{18}$, $C_2$-$C_{16}$, $C_2$-$C_{14}$, $C_2$-$C_{12}$, $C_2$-$C_{10}$, $C_2$-$C_8$, $C_2$-$C_6$, or $C_2$-$C_4$) alkynyl groups are intended. Alkynyl groups may contain more than one unsaturated bond. Examples include $C_2$-$C_6$-alkynyl, such as ethynyl, 1-propynyl, 2-propynyl (or propargyl), 1-butynyl, 2-butynyl, 3-butynyl, 1-methyl-2-propynyl, 1-pentynyl, 2-pentynyl, 3-pentynyl, 4-pentynyl, 3-methyl-1-butynyl, 1-methyl-2-butynyl, 1-methyl-3-butynyl, 2-methyl-3-butynyl, 1,1-dimethyl-2-propynyl, 1-ethyl-2-propynyl, 1-hexynyl, 2-hexynyl, 3-hexynyl, 4-hexynyl, 5-hexynyl, 3-methyl-1-pentynyl, 4-methyl-1-pentynyl, 1-methyl-2-pentynyl, 4-methyl-2-pentynyl, 1-methyl-3-pentynyl, 2-methyl-3-pentynyl, 1-methyl-4-pentynyl, 2-methyl-4-pentynyl, 3-methyl-4-pentynyl, 1,1-dimethyl-2-butynyl, 1,1-dimethyl-3-butynyl, 1,2-dimethyl-3-butynyl, 2,2-dimethyl-3-butynyl, 3,3-dimethyl-1-butynyl, 1-ethyl-2-butynyl, 1-ethyl-3-butynyl, 2-ethyl-3-butynyl, and 1-ethyl-1-methyl-2-propynyl. Alkynyl substituents may be unsubstituted or substituted with one or more chemical moieties. Examples of suitable substituents include, for example, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol, as described below.

As used herein, the term "aryl," as well as derivative terms such as aryloxy, refers to groups that include a monovalent aromatic carbocyclic group of from 3 to 50 carbon atoms. Aryl groups can include a single ring or multiple condensed rings. In some embodiments, aryl groups include $C_6$-$C_{10}$ aryl groups. Examples of aryl groups include, but are not limited to, benzene, phenyl, biphenyl, naphthyl, tetrahydronaphthyl, phenylcyclopropyl, phenoxybenzene, and indanyl. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. The term "non-heteroaryl," which is also included in the term "aryl," defines a group that contains an aromatic group that does not contain a heteroatom. The aryl substituents may be unsubstituted or substituted with one or more chemical moieties. Examples of suitable substituents include, for example, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol as described herein.

The term "cycloalkenyl" as used herein is a non-aromatic carbon-based ring composed of at least three carbon atoms and containing at least one double bound, i.e., C═C. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group as defined above and is included within the meaning of the term "cycloalkenyl," where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems (e.g., monocyclic, bicyclic, tricyclic, polycyclic, etc.) that can be substituted or unsubstituted. A cyclic group can contain one or more aryl groups, one or more non-aryl groups, or one or more aryl groups and one or more non-aryl groups.

The term "acyl" as used herein is represented by the formula —C(O)$Z^1$ where $Z^1$ can be a hydrogen, hydroxyl, alkoxy, alkyl, alkenyl, alkynyl, aryl, heteroaryl, cycloalkyl, cycloalkenyl, heterocycloalkyl, or heterocycloalkenyl group described above. As used herein, the term "acyl" can be used interchangeably with "carbonyl." Throughout this specification "C(O)" or "CO" is a shorthand notation for C═O.

The term "acetal" as used herein is represented by the formula $(Z^1Z^2)C({=}OZ^3)({=}OZ^4)$, where $Z^1$, $Z^2$, $Z^3$, and $Z^4$ can be, independently, a hydrogen, halogen, hydroxyl, alkyl, alkenyl, alkynyl, aryl, heteroaryl, cycloalkyl, cycloalkenyl, heterocycloalkyl, or heterocycloalkenyl group described above.

The term "alkanol" as used herein is represented by the formula $Z^1OH$, where $Z^1$ can be an alkyl, alkenyl, alkynyl, aryl, heteroaryl, cycloalkyl, cycloalkenyl, heterocycloalkyl, or heterocycloalkenyl group described above.

As used herein, the term "alkoxy" as used herein is an alkyl group bound through a single, terminal ether linkage; that is, an "alkoxy" group can be defined as to a group of the formula $Z^1$—O—, where $Z^1$ is unsubstituted or substituted alkyl as defined above. Unless otherwise specified, alkoxy groups wherein $Z^1$ is a $C_1$-$C_{24}$ (e.g., $C_1$-$C_{22}$, $C_1$-$C_{20}$, $C_1$-$C_{18}$, $C_1$-$C_{16}$, $C_1$-$C_{14}$, $C_1$-$C_{12}$, $C_1$-$C_{10}$, $C_1$-$C_8$, $C_1$-$C_6$, or $C_1$-$C_4$) alkyl group are intended. Examples include methoxy, ethoxy, propoxy, 1-methyl-ethoxy, butoxy, 1-methyl-propoxy, 2-methyl-propoxy, 1,1-dimethyl-ethoxy, pentoxy, 1-methyl-butyloxy, 2-methyl-butoxy, 3-methyl-butoxy, 2,2-di-methyl-propoxy, 1-ethyl-propoxy, hexoxy, 1,1-dimethyl-propoxy, 1,2-dimethyl-propoxy, 1-methyl-pentoxy, 2-methyl-pentoxy, 3-methyl-pentoxy, 4-methyl-penoxy, 1,1-dimethyl-butoxy, 1,2-dimethyl-butoxy, 1,3-dimethyl-butoxy, 2,2-dimethyl-butoxy, 2,3-dimethyl-butoxy, 3,3-dimethyl-butoxy, 1-ethyl-butoxy, 2-ethylbutoxy, 1,1,2-trimethyl-propoxy, 1,2,2-trimethyl-propoxy, 1-ethyl-1-methyl-propoxy, and 1-ethyl-2-methyl-propoxy.

The term "aldehyde" as used herein is represented by the formula —C(O)H. Throughout this specification "C(O)" is a shorthand notation for C═O.

The terms "amine" or "amino" as used herein are represented by the formula —$NZ^1Z^2Z^3$, where $Z^1$, $Z^2$, and $Z^3$ can each be substitution group as described herein, such as hydrogen, an alkyl, alkenyl, alkynyl, aryl, heteroaryl, cycloalkyl, cycloalkenyl, heterocycloalkyl, or heterocycloalkenyl group described above.

The terms "amide" or "amido" as used herein are represented by the formula —$C(O)NZ^1Z^2$, where $Z^1$ and $Z^2$ can each be substitution group as described herein, such as hydrogen, an alkyl, alkenyl, alkynyl, aryl, heteroaryl, cycloalkyl, cycloalkenyl, heterocycloalkyl, or heterocycloalkenyl group described above.

The term "anhydride" as used herein is represented by the formula $Z^1C(O)OC(O)Z^2$ where $Z^1$ and $Z^2$, independently, can be an alkyl, alkenyl, alkynyl, aryl, heteroaryl, cycloalkyl, cycloalkenyl, heterocycloalkyl, or heterocycloalkenyl group described above.

The term "cyclic anhydride" as used herein is represented by the formula:

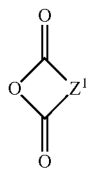

where $Z^1$ can be an alkyl, alkenyl, alkynyl, aryl, heteroaryl, cycloalkyl, cycloalkenyl, heterocycloalkyl, or heterocycloalkenyl group described above.

The term "azide" as used herein is represented by the formula —N═N═N.

The term "carboxylic acid" as used herein is represented by the formula —C(O)OH.

A "carboxylate" or "carboxyl" group as used herein is represented by the formula —$C(O)O^-$.

The term "cyano" as used herein is represented by the formula —CN.

The term "ester" as used herein is represented by the formula —$OC(O)Z^1$ or —$C(O)OZ^1$, where $Z^1$ can be an alkyl, alkenyl, alkynyl, aryl, heteroaryl, cycloalkyl, cycloalkenyl, heterocycloalkyl, or heterocycloalkenyl group described above.

The term "ether" as used herein is represented by the formula $Z^1OZ^2$, where $Z^1$ and $Z^2$ can be, independently, an alkyl, alkenyl, alkynyl, aryl, heteroaryl, cycloalkyl, cycloalkenyl, heterocycloalkyl, or heterocycloalkenyl group described above.

The term "epoxy" or "epoxide" as used herein refers to a cyclic ether with a three atom ring and can represented by the formula:

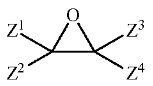

where $Z^1$, $Z^2$, $Z^3$, and $Z^4$ can be, independently, an alkyl, alkenyl, alkynyl, aryl, heteroaryl, cycloalkyl, cycloalkenyl, heterocycloalkyl, or heterocycloalkenyl group described above The term "ketone" as used herein is represented by the formula $Z^1C(O)Z^2$, where $Z^1$ and $Z^2$ can be, independently, an alkyl, alkenyl, alkynyl, aryl, heteroaryl, cycloalkyl, cycloalkenyl, heterocycloalkyl, or heterocycloalkenyl group described above.

The term "halide" or "halogen" or "halo" as used herein refers to fluorine, chlorine, bromine, and iodine.

The term "hydroxyl" as used herein is represented by the formula —OH.

The term "nitro" as used herein is represented by the formula —$NO_2$.

The term "phosphonyl" is used herein to refer to the phospho-oxo group represented by the formula —$P(O)(OZ^1)_2$, where $Z^1$ can be hydrogen, an alkyl, alkenyl, alkynyl, aryl, heteroaryl, cycloalkyl, cycloalkenyl, heterocycloalkyl, or heterocycloalkenyl group described above.

The term "silyl" as used herein is represented by the formula —$SiZ^1Z^2Z^3$, where $Z^1$, $Z^2$, and $Z^3$ can be, independently, hydrogen, alkyl, alkoxy, alkenyl, alkynyl, aryl, heteroaryl, cycloalkyl, cycloalkenyl, heterocycloalkyl, or heterocycloalkenyl group described above.

The term "sulfonyl" or "sulfone" is used herein to refer to the sulfo-oxo group represented by the formula —$S(O)_2Z^1$, where $Z^1$ can be hydrogen, an alkyl, alkenyl, alkynyl, aryl, heteroaryl, cycloalkyl, cycloalkenyl, heterocycloalkyl, or heterocycloalkenyl group described above.

The term "sulfide" as used herein is comprises the formula —S—.

The term "thiol" as used herein is represented by the formula —SH.

"$R^1$," "$R^2$," "$R^3$," "Re," etc., where n is some integer, as used herein can, independently, possess one or more of the groups listed above. For example, if $R^1$ is a straight chain alkyl group, one of the hydrogen atoms of the alkyl group can optionally be substituted with a hydroxyl group, an alkoxy group, an amine group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

Unless stated to the contrary, a formula with chemical bonds shown only as solid lines and not as wedges or dashed lines contemplates each possible stereoisomer or mixture of stereoisomer (e.g., each enantiomer, each diastereomer, each meso compound, a racemic mixture, or scalemic mixture).

Nanostructured Zeolitic Materials

Disclosed herein are nanostructured zeolitic materials. As used herein, "nanostructured" means any structure with one or more nanoscale features. A nanoscale feature can be any feature with at least one dimension less than 1 micrometer (μm) in size (e.g., from 1 nm to less than 1 micrometer). For example, a nanoscale feature can comprise a nanowire, nanotube, nanoparticle, nanopore, and the like, or combinations thereof. As such, the nanostructured zeolitic materials can comprise, for example, a nanowire, nanotube, nanoparticle, nanopore, or a combination thereof comprising a zeolite. In some examples, the nanostructured zeolitic materials can comprise a zeolite that is not nanoscale but has been modified with a nanowire, nanotube, nanoparticle, nanopore, or a combination thereof.

In some examples, the nanostructured zeolitic materials comprise a plurality of zeolite nanotubes (e.g., a plurality of nanotubes comprising a zeolite material), wherein each nanotube comprises a zeolitic wall perforated by a plurality of pores, the zeolitic wall defining a single longitudinal lumen, such that the plurality of zeolite nanotubes are hollow. The zeolitic wall is circumferentially disposed about a central longitudinal axis and encloses a single central elongated void which is the lumen. The zeolitic wall can have an outer surface and an inner surface, wherein the inner surface defined the lumen.

In some examples, wherein the zeolitic wall comprises a zeolitic material, such as an aluminosilicate material, SAPO, ALPO, etc.

In some examples, the zeolitic wall can comprise an aluminosilicate material. In some examples, the aluminosilicate material can further comprise Ga, Ge, Ti, B, Be, Sn, Fe, Zr, or a combination thereof.

The aluminosilicate can comprise Si and Al in any desired ratio. In some examples, the aluminosilicate material comprises Si and Al in a ratio of from 99:1 to 1:99. In some examples, the aluminosilicate material comprises Si and Al in a ratio of 1:1 or more (e.g., 2:1 or more, 5:1 or more, 10:1 or more, 20:1 or more, or 50:1 or more). In some examples, the aluminosilicate material comprises Si and Al in a ratio of 14:1 (w/w) or more (e.g., 14.5:1 or more, 15:1 or more, 15.5:1 or more, 16:1 or more, 16.5:1 or more, 17:1 or more, or 17.5:1 or more). In some examples, the aluminosilicate material comprises Si and Al in a ratio of 18:1 (w/w) or less (e.g., 17.5:1 or less, 17:1 or less, 16.5:1 or less, 16:1 or less, 15.5:1 or less, 15:1 or less, or 14.5:1 or less). The ratio of Si and Al in the aluminosilicate material can range from any of the minimum values described above to any of the maximum values described above. For example, the aluminosilicate material can comprise Si and Ai in a ratio of from 14:1 to 18:1 (w/w) (e.g., from 14:1 to 16:1, from 16:1 to 18:1, from 14:1 to 15:1, from 15:1 to 16:1, from 16:1 to 17:1, from 17:1 to 18:1, from 15:1 to 18:1, from 14:1 to 17:1, or from 15:1 to 17:1).

In some examples, the zeolitic wall comprises some structural elements of a beta zeolite structure, an MFI zeolite structure, or a combination thereof.

In some examples, the plurality of zeolite nanotubes can be substantially crystalline.

The plurality of zeolite nanotubes can, for example, have an average length. "Average length" and "mean length" are used interchangeably herein, and generally refer to the statistical mean length of the nanotubes in a population of nanotubes. Mean length can be measured using methods known in the art, such as evaluation by scanning electron microscopy, transmission electron microscopy, and/or dynamic light scattering. As used herein, the average length is determined by transmission electron microscopy.

In some examples, the plurality of zeolite nanotubes have an average length of 20 nanometers (nm) or more (e.g., 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 275 nm or more, 300 nm or more, 325 nm or more, 350 nm or more, 400 nm or more, 450 nm or more, 500 nm or more, 600 nm or more, 700 nm or more, 800 nm or more, 900 nm or more, 1 micrometer (μm, micron) or more, 1.25 μm or more, 1.5 μm or more, 1.75 μm or more, 2 μm or more, 2.25 μm or more, 2.5 μm or more, 3 μm or more, 3.5 μm or more, 4 μm or more, 4.5 μm or more, 5 μm or more, 6 μm or more, 7 μm or more, 8 μm or more, or 9 μm or more). In some examples, the plurality of zeolite nanotubes can have an average length of 10 micrometers (μm, microns) or less (e.g., 9 μm or less, 8 μm or less, 7 μm or less, 6 μm or less, 5 μm or less, 4.5 μm or less, 4 μm or less, 3.5 μm or less, 3 μm or less, 2.5 μm or less, 2.25 μm or less, 2 μm or less, 1.75 μm or less, 1.5 μm or less, 1.25 μm or less, 1 μm or less, 900 nm or less, 800 nm or less, 700 nm or less, 600 nm or less, 500 nm or less, 450 nm or less, 400 nm or less, 350 nm or less, 325 nm or less, 300 nm or less, 275 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, or 25 nm or less). The average length of the plurality of zeolite nanotubes can range from any of the minimum values described above to any of the maximum values described above. For example, the plurality of zeolite nanotubes can have an average length of from 20 nanometers (nm) to 10 micrometers (μm, microns) (e.g., from 25 nm to 1 μm, from 1 μm to 10 μm, from 25 nm to 250 nm, from 250 nm to 500 nm, from 500 nm to 750 nm, from 750 nm to 1 μm, from 1 μm to 5 μm, from 5 μm to 10 μm, from 25 nm to 10 μm, from 20 nm to 9 μm, from 25 nm to 9 μm, from 250 nm to 5 μm, or from 500 nm to 1 μm).

In some examples, the plurality of zeolite nanotubes can be substantially monodisperse in length. "Monodisperse" and "homogeneous length distribution" are used interchangeably herein, and generally describe a population of nanotubes where all of the nanotubes have the same or nearly the same length. As used herein, a monodisperse distribution refers to distributions in which 90% of the distribution lies within 25% of the mean nanotube length (e.g., within 20% of the mean nanotube length, within 15% of the mean nanotube length, within 10% of the mean nanotube length, or within 5% of the mean nanotube length).

The plurality of zeolite nanotubes can, for example, have an average outer diameter (e.g., defined by the outer surface of the zeolitic wall). "Average outer diameter" and "mean outer diameter" are used interchangeably herein, and generally refer to the statistical mean outer diameter of the nanotubes in a population of nanotubes. Mean outer diameter can be measured using methods known in the art, such as evaluation by scanning electron microscopy, transmission electron microscopy, and/or dynamic light scattering.

In some examples, the plurality of zeolite nanotubes have an average outer diameter of 1 nanometer (nm) or more (e.g., 1.5 nm or more, 2 nm or more, 2.5 nm or more, 3 nm or more, 3.5 nm or more, 4 nm or more, 4.5 nm or more, 5 nm or more, 5.5 nm or more, 6 nm or more, 6.5 nm or more, 7 nm or more, 7.5 nm or more, 8 nm or more, 8.5 nm or more, 9 nm or more, or 9.5 nm or more). In some examples, the plurality of zeolite nanotubes have an average outer diameter of 10 nanometers (nm) or less (e.g., 9.5 nm or less, 9 nm or less, 8.5 nm or less, 8 nm or less, 7.5 nm or less, 7 nm or less, 6.5 nm or less, 6 nm or less, 5.5 nm or less, 5 nm or less, 4.5 nm or less, 4 nm or less, 3.5 nm or less, 3 nm or less, 2.5 nm or less, 2 nm or less, or 1.5 nm or less). The average outer diameter can range from any of the minimum values described above to any of the maximum values described above. For example, the plurality of zeolite nanotubes can have an average outer diameter of from 1 nanometer to 10 nanometers (e.g., from 1 nm to 5 nm, from 5 nm to 10 nm, from 1 nm to 4 nm, from 4 nm to 7 nm, from 7 nm to 10 nm, from 2 nm to 10 nm, from nm to 9 nm, from 2 nm to 9 nm, from 3 nm to 8 nm, or from 4 nm to 6 nm).

In some examples, the plurality of zeolite nanotubes can be substantially monodisperse in outer diameter. "Monodisperse" and "homogeneous outer diameter distribution" are used interchangeably herein, and generally describe a population of nanotubes where all of the nanotubes have the same or nearly the same outer diameter. As used herein, a monodisperse distribution refers to distributions in which 90% of the distribution lies within 25% of the mean nanotube outer diameter (e.g., within 20% of the mean nanotube outer diameter, within 15% of the mean nanotube outer diameter, within 10% of the mean nanotube outer diameter, or within 5% of the mean nanotube outer diameter).

In some examples, the plurality of zeolite nanotubes can be described by their aspect ratio, which, as used herein, is the length of a nanotube divided by the outer diameter of a nanotube. For example, the plurality of zeolite nanotubes can have an average aspect ratio of 2 or more (e.g., 3 or more; 4 or more; 5 or more; 10 or more; 15 or more; 20 or more; 25 or more; 30 or more; 35 or more; 40 or more; 45 or more; 50 or more; 60 or more; 70 or more; 80 or more; 90 or more; 100 or more; 125 or more; 150 or more; 175 or more; 200 or more; 225 or more; 250 or more; 300 or more; 350 or more; 400 or more; 450 or more; 500 or more; 600 or more; 700 or more; 800 or more; 900 or more; 1,000 or more; 1,250 or more; 1,500 or more; 1,750 or more; 2,000 or more; 2,250 or more; 2,500 or more; 3,000 or more; 3,500 or, more; 4,000 or more; 4,500 or more; 5,000 or more; 6,000 or more; 7,000 or more; 8,000 or more; or 9,000 or more). In some examples, the plurality of zeolite nanotubes can have an average aspect ratio of 10,000 or less (e.g., 9,000 or less; 8,000 or less; 7,000 or less; 6,000 or less; 5,000 or less; 4,500 or less; 4,000 or less; 3,500 or less; 3,000 or less; 2,500 or less; 2,250 or less; 2,000 or less; 1,750 or less; 1,500 or less; 1,250 or less; 1,000 or less; 900 or less; 800 or less; 700 or less; 600 or less; 500 or less; 450 or less; 400 or less; 350 or less; 300 or less; 250 or less; 225 or less; 200 or less; 175 or less; 150 or less; 125 or less; 100 or less; 90 or less; 80 or less; 70 or less; 60 or less; 50 or less; 45 or less; 40 or less; 35 or less; 30 or less; 25 or less; 20 or less; 15 or less; 10 or less; or 5 or less). The average aspect ratio of the plurality of zeolite nanotubes can range from any of the minimum values described above to any of the maximum values described above. For example, the plurality of zeolite nanotubes can have an average aspect ratio of from 2 to 10,000 (e.g., from 2 to 1,000; from 1,000 to 10,000; from 2 to 20; from 20 to 200; from 200 to 2,000; from 2,000 to 10,000; from 5 to 10,000; from 2 to 9,000; from 5 to 9,000; from 10 to 7,000; from 25 to 5,000; from 40 to 1,000; from 50 to 500; or from 100 to 200).

The plurality of zeolite nanotubes can, for example, have an average inner diameter (e.g., the diameter of the lumen defined by the inner surface of the zeolitic wall). "Average inner diameter" and "mean inner diameter" are used interchangeably herein, and generally refer to the statistical mean inner diameter of the nanotubes in a population of nanotubes. Mean inner diameter can be measured using methods known in the art, such as evaluation by scanning electron microscopy, transmission electron microscopy, dynamic light scattering, and/or $N_2$ physisorption.

In some examples, the plurality of zeolite nanotubes have an average inner diameter of 0.5 nm or more (e.g., 0.75 nm or more, 1 nm or more, 1.25 nm or more, 1.5 nm or more, 1.75 nm or more, 2 nm or more, 2.5 nm or more, 3 nm or more, 3.5 nm or more, 4 nm or more, 4.5 nm or more, 5 nm or more, 5.5 nm or more, 6 nm or more, 6.5 nm or more, 7 nm or more, 7.5 nm or more, 8 nm or more, or 8.5 nm or more). In some examples, the plurality of zeolite nanotubes can have an average inner diameter of 9 nm or less (e.g., 8.5 nm or less, 8 nm or less, 7.5 nm or less, 7 nm or less, 6.5 nm or less, 6 nm or less, 5.5 nm or less, 5 nm or less, 4.5 nm or less, 4 nm or less, 3.5 nm or less, 3 nm or less, 2.5 nm or less, 2 nm or less, 1.75 nm or less, 1.5 nm or less, 1.25 nm or less, 1 nm or less, or 0.75 nm or less). The average inner diameter of the plurality of zeolite nanotubes can range from any of the minimum values described above to any of the maximum values described above. For example, the plurality of zeolite nanotubes can have an average inner diameter of from 0.5 nm to 9 nm (e.g., from 0.5 nm to 4.5 nm, from 4.5 nm to 9 nm, from 0.5 nm to 3 nm, from 3 nm to 6 nm, from 6 nm to 9 nm, from 1 nm to 9 nm, from 0.5 nm to 8 nm, from 1 nm to 8 nm, from 1 nm to 5 nm, or from 2 nm to 4 nm).

In some examples, the plurality of zeolite nanotubes can be substantially monodisperse in inner diameter. "Monodisperse" and "homogeneous inner diameter distribution" are used interchangeably herein, and generally describe a population of nanotubes where all of the nanotubes have the same or nearly the same inner diameter. As used herein, a monodisperse distribution refers to distributions in which 90% of the distribution lies within 25% of the mean nanotube inner diameter (e.g., within 20% of the mean nanotube inner diameter, within 15% of the mean nanotube inner diameter, within 10% of the mean nanotube inner diameter, or within 5% of the mean nanotube inner diameter).

In some examples, the plurality of zeolite nanotubes can be described by their average wall thickness, which, as used herein, is half the difference between the average outer diameter and the average inner diameter of a nanotube (e.g., (average outer diameter—average inner diameter)/2). "Average wall thickness" and "mean wall thickness" are used interchangeably herein, and generally refer to the statistical mean wall thickness of the nanotubes in a population of nanotubes. Mean wall thickness can be measured using methods known in the art, such as evaluation by electron microscopy.

In some examples, the plurality of zeolite nanotubes have an average wall thickness of 0.5 nm or more (e.g., 0.75 nm or more, 1 nm or more, 1.25 nm or more, 1.5 nm or more, 1.75 nm or more, 2 nm or more, 2.5 nm or more, 3 nm or more, 3.5 nm or more, 4 nm or more, or 4.5 nm or more). In some examples, the plurality of zeolite nanotubes can have an average wall thickness of 5 nm or less (e.g., 4.5 nm or less, 4 nm or less, 3.5 nm or less, 3 nm or less, 2.5 nm or less, 2 nm or less, 1.75 nm or less, 1.5 nm or less, 1.25 nm or less, 1 nm or less, or 0.75 nm or less). The average wall thickness of the plurality of zeolite nanotubes can range from any of the minimum values described above to any of the maximum values described above. For example, the plurality of zeolite nanotubes can have an average wall thickness of from 0.5 nm to 5 nm (e.g., from 0.5 nm to 2.5 nm, from 2.5 nm to 5 nm, from 0.5 nm to 1 nm, from 1 nm to 2 nm, from 2 nm to 3 nm, from 3 nm to 4 nm, from 4 nm to 5 nm, from 0.75 nm to 5 nm, from 0.5 nm to 4.5 nm, from 0.75 nm to 4.5 nm, from 0.5 nm to 4 nm, from 0.5 nm to 3 nm, or from 0.5 nm to 2 nm).

In some examples, the plurality of zeolite nanotubes can be substantially monodisperse in wall thickness. "Monodisperse" and "homogeneous wall thickness distribution" are used interchangeably herein, and generally describe a population of nanotubes where all of the nanotubes have the same or nearly the same wall thickness. As used herein, a monodisperse distribution refers to distributions in which 90% of the distribution lies within 25% of the mean nanotube wall thickness (e.g., within 20% of the mean nanotube wall thickness, within 15% of the mean nanotube wall thickness, within 10% of the mean nanotube wall thickness, or within 5% of the mean nanotube wall thickness).

Each zeolite nanotube comprises a zeolitic wall perforated by a plurality of pores, such that the plurality of zeolite nanotubes can be porous.

In some examples the plurality of pores can have an average diameter. "Average diameter" and "mean diameter" are used interchangeably herein, and generally refer to the statistical mean inner diameter of the pores in a population of pores. Mean diameter can be measured using methods known in the art, such as using the Horvath-Kawazoe method.

In some examples, the plurality of pores can have an average diameter of 0.2 nm or more (e.g., 0.3 nm or more, 0.4 nm or more, 0.5 nm or more, 0.6 nm or more, 0.7 nm or more, 0.8 nm or more, 0.9 nm or more, 1 nm or more, 1.1 nm or more, 1.2 nm or more, 1.3 nm or more, 1.4 nm or more, 1.5 nm or more, 1.6 nm or more, 1.7 nm or more, 1.8 nm or more, or 1.9 nm or more). In some examples, the plurality of pores can have an average diameter of 2 nm or less (e.g., 1.9 nm or less, 1.8 nm or less, 1.7 nm or less, 1.6 nm or less, 1.5 nm or less, 1.4 nm or less, 1.3 nm or less, 1.2 nm or less, 1.1 nm or less, 1 nm or less, 0.9 nm or less, 0.8 nm or less, 0.7 nm or less, 0.6 nm or less, 0.5 nm or less, 0.4 nm or less, or 0.3 nm or less). The average diameter of the plurality of pores can range from any of the minimum values described above to any of the maximum values described above. For example, the plurality of pores can have an average diameter of from 0.2 to 2 nm (e.g., from 0.2 nm to 1 nm, from 1 nm to 2 nm, from 0.2 nm to 0.5 nm, from 0.5 nm to 1 nm, from 1 nm to 1.5 nm, from 1.5 nm to 2 nm, from 0.3 nm to 2 nm, from 0.2 nm to 1.9 nm, from 0.3 nm to 1.9 nm, from 0.2 nm to 1.5 nm, from 0.2 nm to 0.9 nm, from 0.3 nm to 0.8 nm, from 0.4 nm to 0.7 nm, or from 0.4 to 0.6 nm).

In some examples, the plurality of pores can be substantially monodisperse in diameter. "Monodisperse" and "homogeneous diameter distribution" are used interchangeably herein, and generally describe a population of pores where all of the pores have the same or nearly the same diameter. As used herein, a monodisperse distribution refers to pore distributions in which 90% of the distribution lies within 25% of the mean diameter (e.g., within 20% of the mean diameter, within 15% of the mean diameter, within 10% of the mean diameter, or within 5% of the mean nanotube inner diameter).

In some examples, the average diameter of the plurality of pores and the average diameter of the lumen (e.g., the average inner diameter of the plurality of zeolite nanotubes) can be hierarchical in size relative to each other. In some examples, the lumen of each of the plurality of zeolite nanotubes can be considered an elongated pore, such that the plurality of pores and the lumen together can comprise hierarchical pores. "Hierarchical pores," as used herein, generally refer to pores that span two or more different length scales. Thus, "hierarchically porous materials" are materials which contain pores that span two or more length scales. In some embodiments, there can be a distribution of pore diameters at each length scale, where often the distributions of pore diameters are sufficiently narrow that there is little or no overlap between the pore size distributions. In some examples, the nanostructured zeolitic materials disclosed herein comprise hierarchically porous materials.

The average length of the plurality of zeolite nanotubes, the average outer diameter of the plurality of zeolite nanotubes, the average inner diameter of the plurality of zeolite nanotubes, the average wall thickness of the plurality of zeolite nanotubes, the composition of the plurality of zeolite nanotubes, the average diameter of the plurality of pores, or a combination thereof can be selected in view of a variety of factors.

In some examples, the plurality of zeolite nanotubes comprise: a first population of nanotubes comprising a first material and having a first average length, a first average outer diameter, a first average inner diameter, a first average wall thickness, a first plurality of pores having a first average diameter, and a first average aspect ratio; and a second population of nanotubes comprising a second material and having a second average length, a second average outer diameter, a second average inner diameter, a second average wall thickness, a second plurality of pores having a second average diameter, and a second average aspect ratio; wherein the first average length and the second average length are different, the first average outer diameter and the second average outer diameter are different, the first average inner diameter and the second average inner diameter are different, the first average wall thickness and the second average wall thickness are different, the first average diameter of the first plurality of pores and the second average diameter of the second plurality of pores are different, the first average aspect ratio and the second average aspect ratio are different, the first material and the second material are different, or a combination thereof. In some examples, the plurality of zeolite nanotubes can comprise a mixture of a plurality of populations of nanotubes, wherein each population of nanotubes within the mixture has a different average length, average outer diameter, average inner diameter, average wall thickness, average aspect ratio, average diameter of the plurality of pores, composition, or combination thereof.

In some examples, the plurality of zeolite nanotubes can have an average surface area of 500 or more meters squared per gram of the plurality of zeolite nanotubes ($m^2/g$) (e.g., 550 $m^2/g$ or more, 600 $m^2/g$ or more, 650 $m^2/g$ or more, 700 $m^2/g$ or more, 750 $m^2/g$ or more, 800 $m^2/g$ or more, 850 $m^2/g$ or more, 900 $m^2/g$ or more, 950 $m^2/g$ or more, 1000 $m^2/g$ or more, 1100 $m^2/g$ or more, 1200 $m^2/g$ or more, 1300 $m^2/g$ or more, 1400 $m^2/g$ or more, 1500 $m^2/g$ or more, 1600 $m^2/g$ or more, 1700 $m^2/g$ or more, 1800 $m^2/g$ or more, 1900 $m^2/g$ or more, 2000 $m^2/g$ or more, 2250 $m^2/g$ or more, 2500 $m^2/g$ or more, 2750 $m^2/g$ or more, 3000 $m^2/g$ or more, 3250 $m^2/g$ or more, 3500 $m^2/g$ or more, 3750 $m^2/g$ or more, 4000 $m^2/g$ or more, 4250 $m^2/g$ or more, 4500 $m^2/g$ or more, or 4750 $m^2/g$ or more). In some examples, the plurality of zeolite nanotubes can have an average surface area of 5000 $m^2/g$ or less (e.g., 4750 $m^2/g$ or less, 4500 $m^2/g$ or less, 4250 $m^2/g$ or less, 4000 $m^2/g$ or less, 3750 $m^2/g$ or less, 3500 $m^2/g$ or less, 3250 $m^2/g$ or less, 3000 $m^2/g$ or less, 2750 $m^2/g$ or less, 2500 $m^2/g$ or less, 2250 $m^2/g$ or less, 2000 $m^2/g$ or less, 1900 $m^2/g$ or less, 1800 $m^2/g$ or less, 1700 $m^2/g$ or less, 1600 $m^2/g$ or less, 1500 $m^2/g$ or less, 1400 $m^2/g$ or less, 1300 $m^2/g$ or less, 1200 $m^2/g$ or less, 1100 $m^2/g$ or less, 1000 $m^2/g$ or less, 950 $m^2/g$ or less, 900 $m^2/g$ or less, 850 $m^2/g$ or less, 800 $m^2/g$ or less, 750 $m^2/g$ or less, 700 $m^2/g$ or less, 650 $m^2/g$ or less, 600 $m^2/g$ or less, or 550 $m^2/g$ or less). The average surface area of the plurality of zeolite nanotubes can range from any of the minimum values described above to any of the maximum values described above. For example, the plurality of zeolite nanotubes can have an average surface area of from 500 to 5000 meters squared per gram of the plurality of zeolite nanotubes ($m^2/g$) (e.g., from 500 $m^2/g$ to 2500 $m^2/g$, from 2500 $m^2/g$ to 5000 $m^2/g$, from 500 $m^2/g$ to 1000 $m^2/g$, from 1000 $m^2/g$ to 1500 $m^2/g$, from 1500 $m^2/g$ to 2000 $m^2/g$, from 2000 $m^2/g$ to 2500 $m^2/g$, from 2500 $m^2/g$ to 3000 $m^2/g$, from 3000 $m^2/g$ to 3500 $m^2/g$, from 3500 $m^2/g$ to 4000 $m^2/g$, from 4000 $m^2/g$ to 4500 $m^2/g$, from 4500 $m^2/g$ to 5000 $m^2/g$, from 550 $m^2/g$ to 5000 $m^2/g$, from 500 $m^2/g$ to 4500 $m^2/g$, from 550 $m^2/g$ to 4500 $m^2/g$, from 600 $m^2/g$ to 500 $m^2/g$, from 700 $m^2/g$ to 5000 $m^2/g$, from 800 $m^2/g$ to 5000 $m^2/g$, from 900 $m^2/g$ to 5000 $m^2/g$, from 1000 $m^2/g$ to 5000 $m^2/g$, or from 950 to 1000 $m^2/g$). The average surface area can, for example, be determined by BET.

In some examples, the plurality of zeolite nanotubes can further comprise a structure directing agent. For example, the structure directing agent can be disposed within at least a portion of the plurality of pores.

In some examples, the structure directing agent comprises a bolaform structure directing agent. In some examples, the bolaform structure directing agent comprises a first hydrophilic end and a second hydrophilic end with a hydrophobic core therebetween.

The hydrophobic core can, for example, comprise one or more aromatic rings, one or more hydrophobic alkyl groups, or a combination thereof. In some examples, the hydrophobic core comprises one or more aromatic rings, and the one or more aromatic rings comprises a substituted or unsubstituted biphenyl group, a substituted or unsubstituted naphthalene group, a substituted or unsubstituted anthracene group, a substituted or unsubstituted pyrene group, or a combination thereof. In some examples, the hydrophobic core comprises one or more aromatic rings, and the one or more aromatic rings comprises a substituted or unsubstituted biphenyl group In some examples, the hydrophobic core comprise one or more hydrophobic alkyl groups, and the one or more hydrophobic alkyl groups each independently comprises a substituted or unsubstituted $C_1$-$C_{20}$ alkyl group (e.g., from $C_4$-$C_{20}$ alkyl, from $C_6$-$C_{20}$ alkyl, from $C_8$-$C_{20}$ alkyl, or from $C_5$-$C_{12}$ alkyl). In some examples, the hydrophobic core comprise one or more hydrophobic alkyl groups, and the one or more hydrophobic alkyl groups each independently comprises a substituted or unsubstituted $C_{10}$ alkyl group. In some examples, the hydrophobic core comprises one or more substituted or unsubstituted biphenyl group and one or more substituted or unsubstituted $C_{10}$ alkyl groups.

The first hydrophilic end and the second hydrophilic end each independently comprises a hydrophilic group. Examples of hydrophilic groups are known in the art. In some examples, The first hydrophilic end and the second hydrophilic end each independently comprises a quinuclidinium group.

In some examples, the structure directing agent comprises a molecule with the following structure.

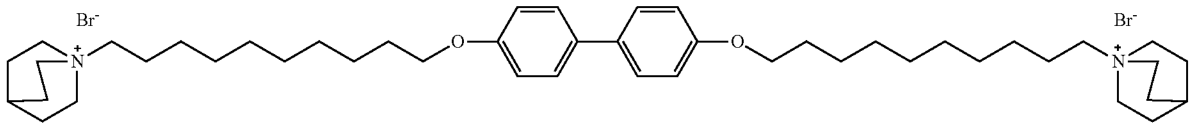 [SMILES: c1cc(-c2ccc(OCCCCCCCCCC[N+]34CCC(CC3)CC4)cc2)ccc1OCCCCCCCCCC[N+]12CCC(CC1)CC2 ; [Br-] ; [Br-]]

Structure Directing Agents

Also disclosed herein are structure directing agents, for example for use in making any of the nanostructured zeolitic materials described herein.

For example, also disclosed herein is a bolaform structure directing agent, comprising: a first hydrophilic end and a second hydrophilic end with a hydrophobic core therebetween; wherein the hydrophobic core comprises one or more aromatic rings and one or more hydrophobic alkyl groups; wherein the one or more aromatic rings comprises a biphenyl group; wherein the one or more hydrophobic alkyl groups each independently comprises a $C_{10}$ alkyl group; wherein the first hydrophilic end and the second hydrophilic end each independently comprises a quinuclidinium group.

In some examples, the bolaform structure directing agent comprises a molecule with the following structure.

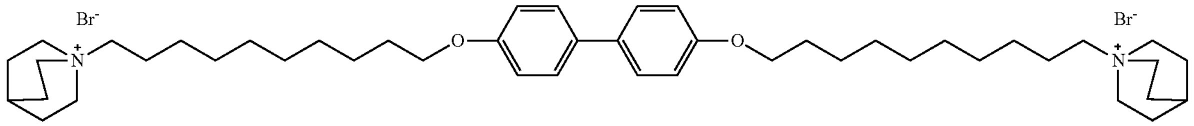 [SMILES: c1cc(-c2ccc(OCCCCCCCCCC[N+]34CCC(CC3)CC4)cc2)ccc1OCCCCCCCCCC[N+]12CCC(CC1)CC2 ; [Br-] ; [Br-]]

Methods of Making

Also disclosed herein are methods of making any of the nanostructured zeolitic materials described herein. In some examples, the methods of making the nanostructured zeolitic material can comprise hydrothermal zeolite growth using a structure directing agent, such as a bolaform structure directing agent.

For example, the methods can comprise dispersing a precursor and the structure directing agent in a solvent for form a mixture. The solvent can, for example, comprise tetrahydrofuran (THF), N-methyl-2-pyrrolidone (NMP), dimethylformamide (DMF), N-methylformamide, formamide, dichloromethane ($CH_2C_{12}$), ethylene glycol, polyethylene glycol, glycerol, alkane diol, ethanol, methanol, propanol, isopropanol, water, acetonitrile, chloroform, toluene, methyl acetate, ethyl acetate, acetone, hexane, heptane, tetraglyme, propylene carbonate, diglyme, dimethyl sulfoxide (DMSO), dimethoxyethane, xylene, dimethylacetamide, methylene chloride, hexafluoro-2-propanol, or combinations thereof. In some examples, solvent comprises water.

The methods can, in some examples, further comprise heating the mixture at a temperature of 90° C. or more (e.g., 100° C. or more, 110° C. or more, 120° C. or more, 130° C. or more, 140° C. or more, 150° C. or more, 160° C. or more, 170° C. or more, 180° C. or more, 190° C. or more, 200° C. or more, 210° C. or more, 220° C. or more, 230° C. or more, 240° C. or more, or 250° C. or more). In some examples, the methods can further comprise heating the mixture at a temperature of 260° C. or less (e.g., 250° C. or less, 240° C. or less, 230° C. or less, 220° C. or less, 210° C. or less, 200° C. or less, 190° C. or less, 180° C. or less, 170° C. or less, 160° C. or less, 150° C. or less, 140° C. or less, 130° C. or less, 120° C. or less, 110° C. or less, or 100° C. or less). The temperature at which the mixture is heated can range from any of the minimum values described above to any of the maximum values described above. For example, the methods can further comprise heating the mixture at a temperature of from 90° C. to 260° C. (e.g., from 90° C. to 175° C., from 175° C. to 260° C., from 90° C. to 120° C., from 120° C. to 150° C., from 150° C. to 180° C., from 180° C. to 210° C., from 210° C. to 260° C., from 95° C. to 260° C., from 90° C. to 255° C., or from 95° C. to 255° C.).

The methods can, in some examples, further comprise heating the mixture at a temperature for an amount of time of 1 hour or more (e.g., 2 hours or more, 3 hours or more, 4 hours or more, 5 hours or more, 6 hours or more, 12 hours or more, 18 hours or more, 1 day or more, 2 days or more, comprise one or more hydrophobic alkyl groups, and the one or more hydrophobic alkyl groups each independently comprises a substituted or unsubstituted $C_1$-$C_{20}$ alkyl group (e.g., from $C_4$-$C_{20}$ alkyl, from $C_6$-$C_{20}$ alkyl, from $C_8$-$C_{20}$ alkyl, or from $C_8$-$C_{12}$ alkyl). In some examples, the hydrophobic core comprise one or more hydrophobic alkyl groups, and the one or more hydrophobic alkyl groups each independently comprises a substituted or unsubstituted $C_{10}$ alkyl group. In some examples, the hydrophobic core comprises one or more substituted or unsubstituted biphenyl group and one or more substituted or unsubstituted $C_{10}$ alkyl groups.

The first hydrophilic end and the second hydrophilic end each independently comprises a hydrophilic group. Examples of hydrophilic groups are known in the art. In some examples, The first hydrophilic end and the second hydrophilic end each independently comprises a quinuclidinium group.

In some examples, the structure directing agent comprises a molecule with the following structure.

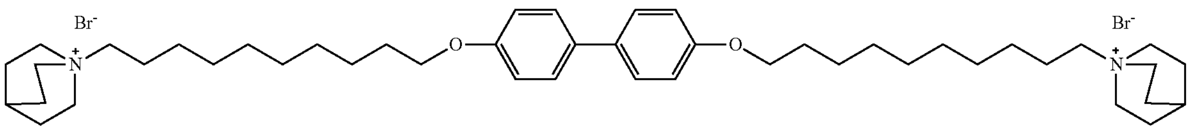 [SMILES: c1cc(-c2ccc(OCCCCCCCCCC[N+]34CCC(CC3)CC4)cc2)ccc1OCCCCCCCCCC[N+]12CCC(CC1)CC2 ; [Br-] ; [Br-]]

3 days or more, 4 days or more, 5 days or more, 6 days or more, 7 days or more, 8 days or more, 9 days or more, 10 days or more, 11 days or more, 12 days or more, or 13 days or more). In some examples, the methods can further comprise heating the mixture at a temperature for an amount of time of 2 weeks or less (e.g., 13 days or less, 12 days or less, 11 days or less, 10 days or less, 9 days or less, 8 days or less, 7 days or less, 6 days or less, 5 days or less, 4 days or less, 3 days or less, 2 days or less, 1 days or less, 18 hours or less, 12 hours or less, 6 hours or less, 5 hours or less, 4 hours or less, 3 hours or less, or 2 hours or less). The amount of time for which the mixture is heated can range from any of the minimum values described above to any of the maximum values described above. For example, the methods can further comprise heating the mixture at a temperature for an amount of time of from 1 hour to 2 weeks (e.g., from 1 hour to 1 day, from 1 day to 1 week, from 1 week to 2 weeks, from 2 hours to 2 weeks, from 1 hour to 13 days, from 2 hours to 13 days, or from 5 days to 2 weeks).

In some examples, the plurality of zeolite nanotubes can be synthesized using a bolaform structure directing agent. In some examples, the structure directing agent comprises a bolaform structure directing agent. In some examples, the bolaform structure directing agent comprises a first hydrophilic end and a second hydrophilic end with a hydrophobic core therebetween.

The hydrophobic core can, for example, comprise one or more aromatic rings, one or more hydrophobic alkyl groups, or a combination thereof. In some examples, the hydrophobic core comprises one or more aromatic rings, and the one or more aromatic rings comprises a substituted or unsubstituted biphenyl group, a substituted or unsubstituted naphthalene group, a substituted or unsubstituted anthracene group, a substituted or unsubstituted pyrene group, or a combination thereof. In some examples, the hydrophobic core comprises one or more aromatic rings, and the one or more aromatic rings comprises a substituted or unsubstituted biphenyl group. In some examples, the hydrophobic core In some examples, the methods can further comprise making the structure directing agent.

In some examples, the methods can further comprise calcination, for example to remove the structure directing agent from the plurality of zeolite nanotubes.

Methods of Use

Also disclosed herein are methods of using any of the nanostructured zeolitic materials described herein. For example, the methods can comprise using the material as a catalyst, as a catalyst support, as an adsorbent, in a chemical separation, or a combination thereof. In some examples, the materials can be used in membranes, nanofluidic devices, or a combination thereof.

Also disclosed herein are catalysts and/or catalyst supports comprising any of the nanostructured zeolitic materials described herein.

Also disclosed herein are methods of use of the plurality of zeolite nanotubes as described herein, for example in catalysis and/or chemical separations.

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1

Abstract: Lamellar 2D (layered) zeolitic materials have shown several advantages over conventional 3D (bulk) zeolites for catalysis as well as separation applications. However, the formation of 1D (nanotubular) zeolite materials has never been observed. Described herein is the synthesis and observation of zeolite nanotubes. In a first example of such materials, described herein is an aluminosilicate material comprising hollow tubes (~5 nm in outer diameter and ~3 nm inner diameter) whose porous wall (~1 nm thick) has a zeolite structure characterized by the presence of well-defined nanopores (~0.5 nm in size) perforating the wall. The nanotubes are synthesized using a bolaform structure-directing agent (SDA) with a biphenyl group in the hydrophobic center and hydrophilic quinuclidinium groups at the ends, separated by a $C_{10}$ carbon chain.

Background and Description. Zeolites have been widely used in the petrochemical industry as catalysts because of the presence of strong acid sites and ordered microporous structure (Cundy C S et al. *Chem. Rev.* 2003, 103, 663-701; Corma A. *J. Catal.,* 2003, 2016 (1-2), 298-312; Davis M E. *Nature* 2002, 417, 813-821). However, their microporous nature imposes mass transfer limitations on bulky molecules, consequently reducing their catalytic activity (Tao Y et al. *Chem. Rev.* 2006, 106, 896-910). Thus, the development of hierarchical zeolites that have mesopores in addition to micropores, has been an important area of research (Tao Y et al. *Chem. Rev.* 2006, 106, 896-910; Čejka J et al. *Catal. Rev.—Sci. Eng.* 2007, 49, 457-509; Möller K et al. *Chem. Soc. Rev.* 2013, 42, 3689-707). These mesopores can help to overcome the diffusion limitations and can allow for faster diffusion of bulky molecules through the zeolite crystal.

Several methods have been explored for the synthesis of hierarchical zeolites and they can be broadly categorized as top-down or bottom-up approaches. In case of the top-down approaches, conventional zeolite crystals are subjected to post-synthetic treatments such as desilication (Verboekend D et al. *Catal. Sci. Technol.* 2011, 1, 879-890) and dealumination (Beyerlein R A et al. *Top. Catal.* 1997, 4, 27-42) that etch away parts of the zeolite crystal in order to create mesopores. While these top-down techniques are economical and scalable, they lead to the loss of framework atoms as well as crystallinity of the zeolite (Feliczak-Guzik A. *Microporous Mesoporous Mater.* 2018, 259, 33-45). In the case of the bottom-up approaches, various hard- and soft-templates are used to tailor the mesoporous architecture of the hierarchical zeolites (Fan W et al. *Nat. Mater.* 2008, 7, 984-991; Choi M et al. *Nature* 2009, 461, 246-249; Xu D et al. *Nat. Commun.* 2014, 5, 4262; Xu D et al. *Chem. Mater.* 2014, 26, 4612-4619; Zhang X et al. *Science* (80-.). 2012, 336, 1684-1687; Na K et al. *Science* (80-.). 2011, 333, 328-332; Margarit V J et al *Angew. Chemie—Int. Ed.* 2015, 54, 13724-13728). In terms of crystallizing a highly ordered mesoporous zeolite, the bottom-up approach far surpasses the top-down approach. However, crystallizing a microporous zeolite having a highly ordered mesopore channel system is quite challenging due to the complex interplay between the energetic self-organization of the templating species and the zeolite precursors (Möller K et al. *Chem. Soc. Rev.* 2013, 42, 3689-707; Serrano D P et al. *Chem. Soc. Rev.* 2013, 42, 4004-4035).

Choi et al. synthesized a multilamellar, mesostructured MFI zeolite nanosheet with a single unit-cell crystal thickness (Choi M et al. *Nature* 2009, 461, 246-249). This was achieved using a diquaternary ammonium surfactant as a structure directing agent (SDA) that could form a micellar assembly in solution due to its amphiphilic nature (Choi M et al. *Nature* 2009, 461, 246-249). The quaternary ammonium groups directed the crystallization of the MFI framework whereas the long alkyl chain disrupt the crystal growth in the third dimension, yielding MFI nanosheets (Choi M et al. *Nature* 2009, 461, 246-249). A rational design of the templating molecule by Luo et al. enabled the crystallization of multilamellar MWW nanosheets in a one-pot, bottom-up manner (Luo H Y et al. *Chem. Sci.* 2015, 6, 6320-6324). The structure-directing agent included the conventional templating molecule used for crystallizing MWW zeolite, N,N,N trimethyladamantylammonium hydroxide, as the hydrophilic headgroup and a long alkyl hydrophobic chain, both of which are connected by a quaternary ammonium linker (Luo H Y et al. *Chem. Sci.* 2015, 6, 6320-6324). The hypothesis was that the hydrophilic headgroup of the structure-directing agent directed the crystallization of the zeolite framework whereas the hydrophobic part retarded the growth of the crystal along the third dimension. On the other hand, Che et al. were able to leverage the π-stacking of several surfactant molecules that contained aromatic groups in their hydrophobic part, to template lamellar MFI zeolite with different hierarchical structures (Xu D et al. *Nat. Commun.* 2014, 5, 4262; Singh B K et al. *Chem. Mater.* 2014, 141203182238007; Shen X et al. *Angew. Chemie—Int. Ed.* 2018, 57, 724-728; Zhang Y et al. *Chem.—A Eur. J.* 2019, 25, 738-742; Zhang Y et al. *Chem. Mater.* 2018, 30, 1839-1843; Zhang Y et al. *Angew. Chemie—Int. Ed.* 2020, 59, 50-60). Then-stacking of the aromatic groups in the structure-directing agent enables the self-assembly of the molecules and also provides a highly stable hydrophobic layer so the crystal growth can be blocked.

While these specially designed structure-directing agents allow the crystallization of ultra-thin zeolite crystals, the structure of the material after calcination can change. In the cases where the zeolite crystallizes as a multilamellar stack of nanosheets, the mesoporous structure collapses and the individual nanosheets undergo partial condensation after calcination (Choi M et al. *Nature* 2009, 461, 246-249; Xu D et al. *Nat. Commun.* 2014, 5, 4262; Zhang Y et al. *Chem. Mater.* 2018, 30, 1839-1843; Seo Y et al. *J. Am. Chem. Soc.* 2013, 135, 8806-8809). Maintaining an ordered mesoporous structure after the calcination of the structure-directing agent molecule is quite challenging and there are only a few instances reported of zeolites with single unit-cell thick crystals that retain a well-defined mesopore structure post calcination (Zhang X et al. *Science* (80-.). 2012, 336, 1684-1687; Na K et al. *Science* (80-.). 2011, 333, 328-332; Shen X et al. *Angew. Chemie—Int. Ed.* 2018, 57, 724-728). Additionally, all the materials reported so far that have a single-unit cell thickness, have a sheet-like structure, where these sheets are either single crystals independently (multilamellar stacks) or connected to each other through pillared structures, forming a highly mesoporous crystal.

Herein, a nanotube with zeolite-like microporous walls is reported. A structure-directing agent, BCPh10Qui, was synthesized that was capable of π-stacking due to presence of biphenyl rings and had hydrophilic quinuclidnium head-groups at either end. The material resulting from the hydro-thermal zeolite growth using this structure-directing agent was characterized in detail using TEM, SEM, XRD, $N_2$ physisorption, FT-IR, solid-state NMR, UV/Vis spectroscopy, and thermogravimetric analysis (TGA). These characterizations provide insights into the structure of the material in terms of its morphology and zeolite framework, as well as the crystallization process.

Detailed Description

Morphology and structural characterization. The nanotubular nature of the material synthesized in this work is apparent from the TEM images shown in FIG. 1-FIG. 4. The TEM images in FIG. 1-FIG. 2 clearly show individual strands of the material and FIG. 3-FIG. 4 show the circular cross-section of what appears to be a nanotube bundle. These images also allow the measurement of the radial dimensions of the nanotube, which indicates that the inner mesopore is ~3 nm in size while the outer diameter of the nanotube is ~5 nm. The wall-thickness of the nanotube is thus calculated to be ~1 nm.

FIG. 5 shows the $N_2$ physisorption isotherm for the nanotubes and the hierarchical nature of the material, i.e., presence of both micropores and mesopores is evident from the shape of the isotherm. The sharp increase in the quantity adsorbed for $P/P_o<0.1$ is indicative of the presence of micropores while the increase in the $0.3<P/P_o<0.6$ is due to the capillary condensation of nitrogen in the mesopores of the nanotubes. This contrasts with the Type I isotherm obtained for a purely microporous MFI zeolite, which is also plotted in FIG. 5 for reference. The nanotubes also possess a very high BET surface area of 980 $m^2/g$ as compared to conventional MFI. The mesopore size of ~3 nm for the nanotube (inner diameter) is also supported by the mesopore size distribution calculated using the BJH method for the adsorption branch of the isotherm as shown in FIG. 6. The mesopore size distribution has a narrow peak at ~2.5 nm, which suggests the presence of mesopores of uniform size as would be expected for a nanotubular material. The slight deviation in this mesopore size from the value measured in the TEM images (~3 nm) can be attributed to the underestimation of mesopore sizes by the BJH method (Ravikovitch P I et al. *Langmuir* 1995, 11, 4765-4772). The micropore size distribution of the nanotubes is calculated using the Horvath-Kawazoe method and compared with that of conventional zeolite MFI, calculated using the same method. Both micropore size distributions are plotted in FIG. 7 and clearly, the nanotubes possess micropores that are of the similar size as that of MFI (~5.1 Å). This suggests that the zeolite framework comprising the nanotubular structure possesses medium sized micropores.

FIG. 8-FIG. 9 shows the low-angle (FIG. 8) and wide-angle (FIG. 9) XRD pattern of the calcined material. The peaks in the low-angle XRD pattern at 2θ=2.08° and 4.1° indicate the presence of mesostructured ordering in the material even after calcination. Kang et al. reported that for single-walled aluminosilicate nanotubes, the XRD pattern at low angles is dominated by the scattering from small bundles of nanotubes instead of Bragg diffraction (Kang D Y et al. *Nat. Commun.* 2014, 5, DOI 10.1038/ncomms4342; Kang D Y et al. *ACS Nano* 2010, 4, 4897-4907); this may explain the mesostructured ordering observed in case of the microporous nanotubes synthesized in this work. The presence of peaks in the wide-angle XRD pattern (FIG. 9) indicates ordering at the atomic scale in the nanotubes and suggests that they are crystalline. However, the thin walls of the nanotube, which are most likely less than a single unit-cell thick, and their curved surface can cause new constructive or destructive interferences that distort their XRD pattern when comparing to that of bulk zeolitic frameworks reported in the IZA database (http://www.iza-structure.org/databases/). This makes it challenging to determine the zeolite framework of the nanotubes using their XRD pattern alone.

The positions of the peaks in the wide-angle pattern for the nanotubes at 2θ=7.75°, 15.22°, 22.79°, and 28.88° match with those obtained by Na et al. for the mesoporous molecular sieves (MMS) (Na K et al. *Science* (80-.). 2011, 333, 328-332) and this suggests that their atomic arrangement would be similar. However, the difference in the low-angle pattern suggests a different mesostructural ordering between the MMS and the microporous nanotubes—something that is also apparent from the morphology observed in the TEM images of these materials.

Further evidence of the nanotubes having a zeolitic framework can be obtained from their FT-IR spectra. The zeolite MFI framework shows distinct peaks at ~1225 $cm^{-1}$ and ~550 $cm^{-1}$ arising from the five-membered pentasil units (Jansen J C et al. *Zeolites* 1984, 4, 369-372; Coudurier G et al. *J. Chem. Soc., Chem. Commun.* 1982, 1413-1415; Jacobs P A et al. *Zeolites* 1981, 1, 161-168; Lesthaeghe D et al. *J. Phys. Chem. C* 2008, 112, 9186-9191). The peak at ~550 $cm^{-1}$ is attributed to the double five-membered rings in MFI, while the peak at ~1225 $cm^{-1}$ is a result of the external asymmetric stretching vibration of five-membered ring chains. The FT-IR spectra of MFI zeolites with different morphologies—2D MFI nanosheets, self-pillared pentasil (SPP) MFI and conventional MFI were collected; peaks at ~1225 $cm^{-1}$ and 550 $cm^{-1}$ were present, irrespective of the morphology of the material. FIG. 10 shows the FT-IR spectra obtained for the as-made as well as calcined nanotubes (middle trace and upper trace, respectively), comparing them with the FT-IR spectrum of the pure structure-directing agent (bottom trace). The peaks from the structure-directing agent are visible in the spectrum of the as-made nanotubes. The peaks at ~1225 $cm^{-1}$ and 550 $cm^{-1}$ are clearly present in the as-made nanotubes, whereas they reduce to broader peaks in case of the calcined sample, but nevertheless, visible in the FT-IR spectrum The nanotubes, both as-made and calcined, were studied using $^{29}Si$ and $^{27}Al$ MAS NMR to get further insights into their structure. The $^{29}Si$ NMR of the as-made and calcined nanotubes is plotted in FIG. 11. The spectrum of the as-made nanotubes shows three peaks at −99 ppm ($Q^3$), −106.6 ppm ($Q^4$—3 Si 1 Al) and −113.3 ppm ($Q^4$—4 Si). Based on the peak areas, the Si/Al ratio calculated using the method proposed by Klinowski et al. is ~16 (Klinowski J et al. *J. Chem. Soc. Faraday Trans.* 2 *Mol. Chem. Phys.* 1982, 78, 1025-1050), and this matches the Si/Al ratio obtained using elemental analysis (Table 1). The $Q^3/(Q^3+Q^4)$ ratio is calculated to be 0.15 and a high value of this ratio indicates a large fraction of surface silanols, as can be expected for a material with near unit-cell thickness dimensions (Zhang H et al. *Angew. Chem. Int. Ed.* 2016, 55(25), 7184-7187; Schmidt J E et al. *Chem. Sci.* 2015, 6, 5955-5963). The $^{29}Si$ NMR of the calcined nanotubes shows peaks at −102 ppm ($Q^3$) and −110 ppm ($Q^4$), which leads to a $Q^3/(Q^3+Q^4)$ of 0.17 based on the peak areas. This value is similar to that obtained for the as-made nanotubes, indicating that there is no significant condensation of silanols after calcination. The bonding environment of aluminum in the nanotubes was studied using $^{27}Al$ NMR. The NMR spectra for both the as-made and calcined nanotubes (FIG. 12) show a single peak 54 ppm that corresponds to tetrahedral aluminum and there was no evidence of octahedral or extra-framework aluminum.

Crystallization Process and Arrangement of Structure-Directing Agent in Nanotubes In order to understand the crystallization process of the nanotubes, the duration of the synthesis was varied and the as-made material in each case was analyzed through XRD for crystallinity and through TEM to visualize the growth process. The same gel composition was used for the synthesis with the hydrothermal growth being carried out at 150° C. with the only difference being that the hydrothermal growth was stopped after 1 day, 3 days, 5 days, and 7 days. FIG. 13-FIG. 14 shows the XRD patterns for the material collected during the period from 1-7 days, whereas FIG. 15-FIG. 18 shows the corresponding TEM images obtained for the same duration. The XRD pattern of the material after 1 day of hydrothermal growth shows a mesostructured arrangement based on the peaks at 2θ=2.08° and 4.1° in the low angle region, whereas the wide angle XRD pattern indicates that the material is still amorphous. This is consistent with the TEM observation (FIG. 15) where the mesoporous nature of the material is clearly visible. This mesostructured arrangement remains throughout the further growth of the nanotubes. The wide angle XRD pattern after 3 days still shows mostly amorphous material, although, low intensity, broad peaks at 2θ=8° start showing up, indicating the start of formation of a crystalline phase. The emergence of a few nanotubes is also visible in the TEM image (FIG. 16) and this explains the mostly amorphous nature of the XRD pattern with broad peaks emerging from the small number of nanotubes that are starting to crystallize. The wide angle XRD pattern starts showing sharper peaks after 5 days with the mesostructure still intact as indicated by the low angle XRD pattern. The corresponding TEM images (FIG. 17) shows a large number of nanotubes in the sample with very little amorphous material. Finally, after 7 days of hydrothermal growth, the nanotubes are fully crystallized as indicated by the XRD pattern as well as TEM image. Thus, the growth of the zeolite nanotubes occurs similar to 2D MFI nanosheets—formation of a mesophase followed by gradual crystallization of the microporous zeolitic phase (Na K et al. *J. Am. Chem. Soc.* 2010, 132, 4169-4177).

However, as opposed to the multilamellar morphology of 2D MFI nanosheets, the unique nanotubular morphology of the material reported here can be attributed to the templating action of the bolaform structure-directing agent used in this work. Several other bolaform molecules with aromatic rings in the hydrophobic core of the molecule are known to π-stack and form a stable cylindrical or rod-like micellar assembly that has been observed in TEM as well as AFM analyses (Wang C et al. *Acc. Chem. Res.* 2012, 45, 608-618). Thus, it can be expected that the bolaform structure-directing agent, BCPh10Qui, used to crystallize the zeolite nanotubes, can form a cylindrical or rod-like assembly in solution as well and this can help explain the unique morphology of the material obtained in this work.

In order to study the structure of the structure-directing agent embedded in the nanotubes after synthesis, the as-made material was studied $^{13}C$ CPMAS NMR and compared to the $^{13}C$ NMR spectrum of the pure structure-directing agent. Comparison of the two spectra clearly shows that the structure-directing agent is intact in the pores of the nanotubes. The intactness of the structure-directing agent is also confirmed from the elemental analysis of the as-made nanotubes (Table 1) given that the C/N ratio obtained is ~25 which is close to the theoretical value of 23. Based on previous reports of hierarchical zeolite synthesis using structure-directing agents with aromatic rings by Che et al., it can be hypothesized that the structure-directing agent self-assembles through a π-π stacking of the aromatic rings (Xu D et al. *Nat. Commun.* 2014, 5, 4262; Xu D et al. *Chem. Mater.* 2014, 26, 4612-4619; Singh B K et al. *Chem. Mater.* 2014, 141203182238007; Shen X et al. *Angew. Chemie—Int. Ed.* 2018, 57, 724-728; Zhang Y et al. *Chem.—A Eur. J.* 2019, 25, 738-742). In order to support this hypothesis, the diffuse reflectance spectra were measured using UV/Vis spectroscopy as shown in FIG. 19. For a dilute solution of the structure-directing agent in water, where it can be expected that the structure-directing agent molecules are isolated from each other, a single absorption peak is observed at 265 nm. In case of the solid structure-directing agent with significant π stacking, the energy for the transition from π-HOMO to π*-LUMO decreases, as evident from the redshift in the absorption band to ~314 nm. A similar situation arises in the as-made nanotubes where the absorption band occurs at ~297 nm, indicating a π-π stacking given the redshift from the dilute structure-directing agent solution absorption band. The lower redshift in the as-made nanotubes (~32 nm) as compared to the solid structure-directing agent (~49 nm) may indicate that the π-π interaction is not as strong in the as-made nanotubes, but definitely present.

The thermogravimetric analysis of the as-made nanotubes shows that the structure-directing agent accounts for ~48% of the mass (FIG. 19) and this can also be confirmed based on the elemental analysis (Table 1) with the organic components, CHN, adding up to ~47%. Typically, for MFI, one quaternary ammonium group is present at the intersection of the straight channels and zig-zag channels (Lewis D W. *Encycl. Mater. Sci. Technol.* 2001, 9097-9100) and this has also been found to be true for several of the hierarchical MFI structures reported in literature (Choi M et al. *Nature* 2009, 461, 246-249; Xu D et al. *Nat. Commun.* 2014, 5, 4262; Shen X et al. *Angew. Chemie—Int. Ed.* 2018, 57, 724-728). This leads to a N/Si ratio of ~0.05 in case of these pure silicate MFI materials, whereas in case of the nanotubes, the N/Si ratio is found to be much higher, ~0.19 (N/(Si+Al) ~0.18). There may be several reasons for a high organic loading obtained in the as-made nanotubes. Firstly, while the quinuclidium ion is also a quaternary ammonium, the exact location of quinuclidinium while templating MFI remains unknown (Grunwald-Lüke A et al. *J. Mater. Chem.* 1999, 9, 2529-2536). Additionally, with the introduction of the aluminum while crystallization of the nanotubes, some of the structure-directing agent molecules would be involved in charge compensation of the overall framework. This hypothesis is also supported by the fact that the Na/Al ratio is ~0.72 and a complete charge compensation by Na would have resulted in a Na/Al ratio of close to 1. Lastly, a stable cylindrical or rod-like micellar structure would require a specific number of BCPh10Qui molecules to stack up and it may not be necessary for all the molecules to also be involved in templating the microporous zeolitic structure.

TABLE 1

Elemental Analysis of the as-made and calcined nanotubes (weight percent)[a].

| Sample | Si | Al | Na | C | H | N |
|---|---|---|---|---|---|---|
| As-made | 19.1 | 1.29 | 0.8 | 39.87 | 6.12 | 1.84 |
| Calcined | 38.8 | 2.63 | 1.4 | — | — | — |

[a]ICP-EOS analysis done at Galbraith Laboratories.

Based on these characterizations, an arrangement of the structure-directing agent molecules while templating the nanotubes is proposed in FIG. 20. The biphenyl rings of the structure-directing agent form a stable hydrophobic core along the axis of the nanotubes in a slightly staggered manner, while the alkyl chains with the quinuclidinium groups stretch out along the radius of the nanotube, reaching out into the microporous walls that are crystallized by these hydrophilic headgroups. However, this proposed arrangement is speculative and obtaining further insights would require rigorous modeling of the stable structure-directing agent conformations in a porous nanotubular structure. In addition to the challenge of incorporating suitable interactions for the structure-directing agent with the zeolite framework and also with other structure-directing agent molecules, proposing an accurate model of the nanotube structure itself would need further insights in terms of visualizing the micropore structure of the nanotubes to determine crystal orientations with respect to MFI, either by HR-TEM or electron diffraction. Determining the position of the structure-directing agent molecules involved in charge compensation would also not be trivial and needs further work.

Conclusion. This work demonstrates the crystallization of aluminosilicate nanotubes with zeolite MFI-like microporous walls. This was achieved using a bolaform structure-directing agent that is capable of π-stacking through the biphenyl groups, thus forming a stable, cylindrical/rod-like micellar structure while the quinuclidinium groups in the structure-directing agent directed the crystallization of a thin, porous, MFI-like tubular wall that is ~1 nm thick. The nanotubes have an inner diameter of ~3 nm as determined from TEM and $N_2$ physisorption while the outer diameter determined from TEM is ~5 nm. The nanotube walls being composed of 10MR, MFI-like material is concluded based on the micropore size distribution as well FT-IR spectra of the material. UV/Vis spectroscopy provides evidence for π-stacking of the structure-directing agent in the nanotube structure, and a structure for the structure-directing agent arrangement was proposed. With the nanotubes possessing micropores and a low Si/Al ratio, they can be useful in catalysis and adsorption related applications. Further studies will be directed at studying the applications of these MFI-nanotubes.

Experimental Methods

Synthesis of structure-directing agent (BCPh10Qui). The structure-directing agent BCPh10Qui was synthesized via a two-step reaction. The first reaction was carried out as reported elsewhere (Xu D et al. *Nat. Commun.* 2014, 5, 4262). Briefly, 1.6 g of 4,4'-biphenol (Sigma-Aldrich), 1 g of potassium hydroxide (Sigma-Aldrich) and 12.5 g of 1,10-dibromodecane (Sigma-Aldrich) was added to 100 mL of ethanol (200 proof, Koptec) and refluxed overnight under a nitrogen atmosphere. The resultant solid after cooling the reaction was filtered and washed with copious hot ethanol and water to obtain the intermediate, BCPh10Br. 0.5 g of this intermediate product and 0.35 g of quinuclidine (Alfa-Aesar) was added to 25 mL of acetonitrile and refluxed overnight. After cooling the reaction mixture, diethyl ether was added to precipitate the product, BCPh10Qui, which was then filtered and washed with diethyl ether to remove the unreacted reactants.

Synthesis of Zeolite nanotubes. 0.113 g of the structure-directing agent BCPh10Qui was added to 4.45 g of DI $H_2O$ in a 30 mL polypropylene bottle with a cap while stirring. After the mixture homogenized, 0.067 g of sodium hydroxide (Sigma-Aldrich) was added and allowed to dissolve. This was followed by sequential addition of 0.027 g of Aluminum sulfate hydrate ($Al_2(SO_4)_3 \cdot 14\text{-}18H_2O$, Sigma-Aldrich) and 0.5 g of Ludox HS-30 colloidal silica (Sigma-Aldrich), dropwise. The resulting gel composition of the mixture was 1.875 $SiO_2$:0.03 $Al_2O_3$:1 structure-directing agent:0.63 $Na_2O$:205 $H_2O$. The gel was aged at room temperature while stirring for 3 h with the cap of the polypropylene bottle closed, followed by a static hydrothermal reaction at 423 K for 7 days in Teflon-lined autoclaves. The resulting solid product was collected and washed with DI $H_2O$ by centrifuging 3 times followed by drying in an oven at 348 K. The material was calcined at 823 K for 6 h in air under static conditions with a ramp rate of 2 K/min.

Characterization. XRD patterns were measured on powder samples using a PANalytical X'Pert Pro MPD diffractometer with CuKα radiation (45 kV, 40 mA). SEM images were obtained using a Hitachi SU8010 electron microscope operating at 3 kV and 10 μA while TEM images were obtained using a FEI Tecnai G2 F30 operating at 300 kV. Nitrogen physisorption isotherms were obtained using ASAP 2020 (Micromeritics) at 77 K. Prior to the isotherm measurement, the material was activated at 423 K under high vacuum for 12 h. The BET surface area was calculated using the adsorption data obtained at P/Po between 0.1 and 0.3. The micropore size distribution was calculated using the Horvath-Kawazoe equations while the mesopore size distribution was calculated using the BJH method. FT-IR spectra were obtained on a Thermo Scientific Nicolet 6700 spectrometer equipped with a diamond Smart Orbit ATR accessory. UV-Vis diffuse reflectance spectra were obtained using a Cary 5000 UV-Vis/NIR spectrophotometer. The diffuse reflectance spectra were converted into absorbance spectra using a Kubelka-Munk transformation. Thermogravimetric analyses were carried out on a Netzsch STA 409 PG. The sample mass loss was recorded while it was heated from room temperature to 1123 K at a ramp rate of 10 K/min. CHN and Si, Al, Na elemental analyses were performed by Galbraith Laboratories Inc. using the combustion method and ICP-OES respectively. Solid state NMR spectra were measured on a Bruker Avance III 400 spectrometer.

Example 2

Described herein is the synthesis of an aluminosilicate material having a single-walled nanotubular morphology and a zeolitic microporous wall structure. This material is synthesized using a bolaform structure directing agent (SDA) with a biphenyl group in the hydrophobic center and hydrophilic quinuclidinium groups at both ends, separated from the biphenyl moiety by C10 alkyl chains. The morphology, textural, and vibrational properties of these nanotubes were elucidated by a range of characterization techniques. The growth mechanism of the nanotubes was also studied through time-resolved crystallization that revealed the formation of a mesostructure very early in the synthesis due to the micellar assembly of the structure-directing agent. High-resolution TEM, structure modeling, and x-ray diffraction analysis are combined to reveal details of the structure of the nanotube material. The nanotube wall is built from an inner and outer layer. Due to the curvature of the tube, the two layers have different topological structures. The outer layer is built from small rings of 4, 5 and 6 T-atoms (T=Si or Al) which forms a microporous structure of pores limited by 12 T-atoms. The inner layer is built from rings of 5 and 6 T-atoms constructing 10 ring micropores. The nanotube wall can hence be considered a fusion of two different zeolite topologies: beta and MFI. The zeolite materials described herein can enable a wide range of advances and new applications in chemical catalysis and chemical separation processes.

This is the first example of a zeolite nanotube. Zeolites are widely used as catalytic and separation materials. Compared with conventional zeolites, nanotubular zeolites offer all the features of conventional zeolites (micropores, catalytic sites) but allow much faster access in and out of the zeolite pores due to the tubular structure. The 1D tubular shape of the material can also allow new types of chemical processes which would not be possible with conventional zeolites. Zeolite-based catalysis and separation processes command a large market in the chemical industry and other sectors. The market for zeolite applications is in the multibillion $ range.

Example 3—Single-Walled Zeolite Nanotubes

Abstract. Described herein is the synthesis of an aluminosilicate material having a single-walled nanotubular morphology and a zeolitic microporous wall structure. This material is synthesized using a bolaform structure directing agent (SDA) with a biphenyl group in the hydrophobic center and hydrophilic quinuclidinium groups at both ends, separated from the biphenyl moiety by $C_{10}$ alkyl chains. The morphology, textural, and vibrational properties of these nanotubes were elucidated by a range of characterization techniques. The growth mechanism of the nanotubes was also studied through time-resolved crystallization that revealed the formation of a mesostructure very early in the synthesis due to the micellar assembly of the structure directing agent. High-resolution TEM, structure modeling, and x-ray diffraction analysis are combined to reveal details of the structure of the nanotube material. The nanotube wall is built from an inner and outer layer. Due to the curvature of the tube, the two layers have different topological structures. The outer layer is built from small rings of 4, 5, and 6 T-atoms (T=Si or Al) which forms a microporous structure of pores limited by 12 T-atoms. The inner layer is built from rings of 5 and 6 T-atoms constructing 10 ring micropores. The nanotube wall can hence be considered a fusion of two different zeolite topologies: beta and MFI.

Introduction. Zeolites have been widely used in the petrochemical industry as size- and shape-selective catalysts and adsorbents, because of their ordered microporous structure (Cundy C S et al. *Chem. Rev.* 2003, 103, 663-701; Corma A. *J. Catal.,* 2003, 2016 (1-2), 298-312; Davis M E. *Nature* 2002, 417, 813-821). In recent years, there has been large interest in the synthesis of hierarchical zeolites that include mesoporosity in addition to the micropores (Tao Y et al. *Chem. Rev.* 2006, 106, 896-910; Čejka J et al. *Catal. Rev.—Sci. Eng.* 2007, 49, 457-509; Möller K et al. *Chem. Soc. Rev.* 2013, 42, 3689-3707). Such materials include either 2D zeolite nanosheets that are pillared to create interlayer mesoporous spaces, or bulk zeolite particles in which mesoporosity is generated by different techniques. The interconnected nature of the micropores and mesopores allows diffusion of bulky molecules to the zeolite interior and creates surface sites with different adsorptive and catalytic environments than in the bulk crystals. In the earliest approaches for hierarchical zeolite synthesis, conventional bulk zeolite crystals were subjected to post-synthetic treatments such as desilication (Verboekend D et al. *Catal. Sci. Technol.* 2011, 1, 879-890) and dealumination (Beyerlein R A et al. *Top. Catal.* 1997, 4, 27-42) that etch away parts of the zeolite crystal and create mesopores, thus creating "hierarchical 3D zeolites". While these top-down techniques are economical and scalable, they lead to the loss of framework atoms and zeolite crystallinity (Feliczak-Guzik A. *Microporous Mesoporous Mater.* 2018, 259, 33-45). In more recent approaches, new structure directing agents (SDAs) are used to create the combined microporous-mesoporous architecture of the hierarchical zeolites (Fan W et al. *Nat. Mater.* 2008, 7, 984-991; Choi M et al. *Nature* 2009, 461, 246-249; Xu D et al. *Nat. Commun.* 2014, 5, 4262; Xu D et al. *Chem. Mater.* 2014, 26, 4612-4619; Zhang X et al. *Science* (80-.). 2012, 336, 1684-1687; Na K et al. *Science* (80-.). 2011, 333, 328-332; Margarit V J et al *Angew. Chemie—Int. Ed.* 2015, 54, 13724-13728). Such strategies result in the formation of "hierarchical 2D zeolites" wherein the microporosity is in the form of 2D zeolite nanosheets.

While the latter approach has shown much potential to create new hierarchical zeolitic materials, synthesizing combined microporous-mesoporous zeolite systems is quite challenging due to the complex interactions between the zeolite precursors and the organic structure directing agents (SDAs) in hydrothermal environments (Möller K et al. *Chem. Soc. Rev.* 2013, 42, 3689-707; Serrano D P et al. *Chem. Soc. Rev.* 2013, 42, 4004-4035). Choi et al. synthesized a multilamellar, mesostructured MFI zeolite nanosheet with single unit-cell crystal thickness (Choi M et al. *Nature* 2009, 461, 246-249). This was achieved using a diquaternary ammonium surfactant as a structure directing agent (SDA) that could form a micellar assembly in solution due to its amphiphilic nature (Choi M et al. *Nature* 2009, 461, 246-249). The quaternary ammonium groups directed the crystallization of the MFI framework whereas the long alkyl chain disrupted the crystal growth in the third dimension, yielding MFI nanosheets (Choi M et al. *Nature* 2009, 461, 246-249). A rational design of a structure directing agent by Luo et al. enabled the crystallization of multilamellar MWW nanosheets in a one-pot, bottom-up manner (Luo H Y et al. *Chem. Sci.* 2015, 6, 6320-6324). The structure directing agent included the conventional templating species for crystallizing MWW zeolite (N,N,N trimethyladamantylammonium hydroxide) and a long alkyl hydrophobic chain, the two being connected by a quaternary ammonium linker (Luo H Y et al. *Chem. Sci.* 2015, 6, 6320-6324). The hypothesis was that the hydrophilic headgroup of the structure directing agent directed the crystallization of the zeolite framework whereas the hydrophobic part retarded the growth of the crystal along the third dimension. On the other hand, Che et al. exploited π-stacking of surfactant molecules containing aromatic groups in their hydrophobic portion to template lamellar MFI zeolites with different hierarchical structures (Xu D et al. *Nat. Commun.* 2014, 5, 4262; Singh B K et al. *Chem. Mater.* 2014, 141203182238007; Shen X et al. *Angew. Chemie—Int. Ed.* 2018, 57, 724-728; Zhang Y et al. *Chem.—A Eur. J.* 2019, 25, 738-742; Zhang Y et al. *Chem. Mater.* 2018, 30, 1839-1843; Zhang Y et al. *Angew. Chemie—Int. Ed.* 2020, 59, 50-60). The π-stacking of the aromatic groups enables the self-assembly of the structure directing agent molecules into stable hydrophobic lamellae that allow 2D zeolite formation on their surfaces but block crystal growth in the perpendicular direction. While these specially designed structure directing agents allow the crystallization of ultra-thin zeolite sheets, the morphology of the material can change after calcination to remove the structure directing agent. In cases where the zeolite crystallizes as a multilamellar stack of nanosheets, the mesoporous structure often collapses and the individual nanosheets undergo partial condensation after calcination (Choi M et al. *Nature* 2009, 461, 246-249; Xu D et al. *Nat. Commun.* 2014, 5, 4262; Zhang Y et al. *Chem. Mater.* 2018, 30, 1839-1843; Seo Y et al. *J. Am. Chem. Soc.* 2013, 135, 8806-8809). Maintaining the mesoporous structure after the calcination of the structure directing agent is quite challenging and there are only a few successful cases known (Zhang X et al. *Science* (80-.). 2012, 336, 1684-1687; Na K et al. *Science* (80-.). 2011, 333, 328-332; Shen X et al. *Angew. Chemie—Int. Ed.* 2018, 57, 724-728).

In this work, the synthesis and structural characterization of a "one-dimensional (1D) hierarchical zeolite", in particular, the synthesis of single-walled nanotubes that have a microporous zeolitic wall enclosing a single central mesoporous channel is reported. Although the synthesis of zeolitic materials is notoriously unpredictable, it was speculated that long-chain structure directing agents containing aromatic (π-stacking) groups at their centers might also be capable of templating a central mesoporous channel, with the analogy that many conventional surfactants are capable of stacking into lamellar as well as rod-like micelles under different conditions. Furthermore, it was speculated that the attachment of structure directing agent head-groups to the central groups using sufficiently long and flexible alkyl chain connectors would allow formation of a cylindrical zeolitic wall enclosing the central channel. Accordingly, a new bolaform structure directing agent, BCPh10Qui (Scheme 1), was synthesized, which is capable of π-stacking due to the presence of central biphenyl rings and has hydrophilic quinuclidinium headgroups at either end linked to the biphenyl groups by $C_{10}$ alkyl chains. This structure directing agent was used for hydrothermal synthesis in an aluminosilicate precursor medium. The material resulting from the hydrothermal zeolite growth using this structure directing agent was characterized in detail by TEM, SEM, XRD, $N_2$ physisorption, FT-IR, solid-state NMR, UV/Vis spectroscopy, and thermogravimetric analysis (TGA). These characterizations, along with structure modeling, provided insights into the unique nanotubular morphology and zeolitic character of the material, as well as the crystallization process.

Figure 1:
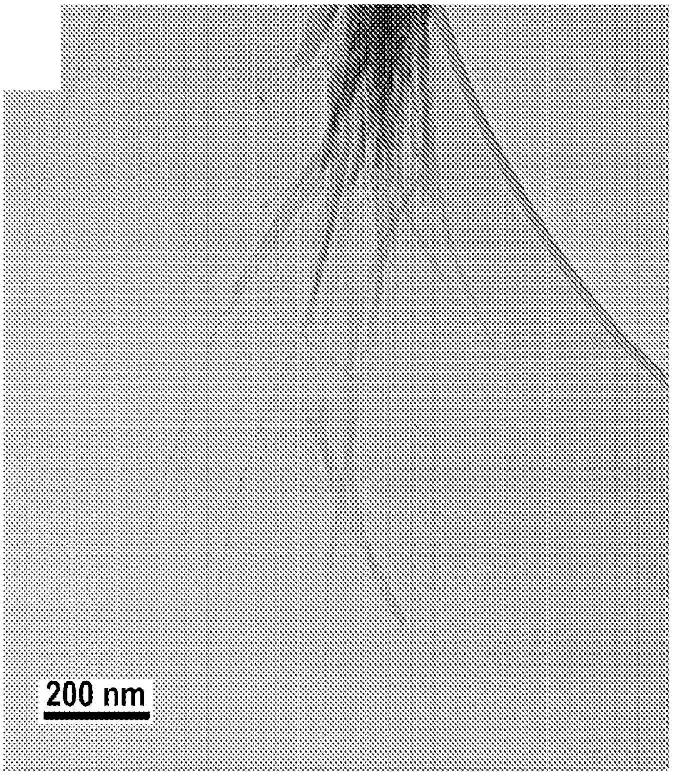
FIG. 1. TEM image of the as-made nanotube strands at low magnification.
Figure 2:
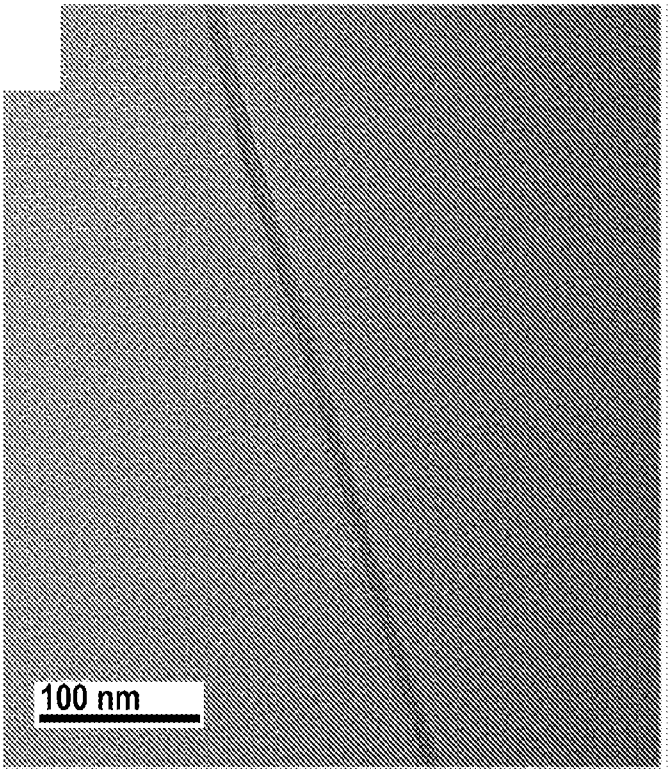
FIG. 2. TEM image of the as-made nanotube strands at low magnification.

Results and Discussion. The formation of nanotubes is apparent from the TEM images shown in FIG. 1-FIG. 4. While FIG. 1-FIG. 2 show individual strands of the as-made 1D material at low magnifications, FIG. 3-FIG. 4 clearly show cross-sections of the calcined nanotube bundles at higher magnifications. The latter images also indicate that the central channel is mesoporous with a ~3 nm pore size while the outer diameter of the nanotube is ~5 nm (i.e., the wall of the nanotube is ~1 nm thick). The presence of other crystalline materials such as 3D or 2D zeolites was not observed in the samples. FIG. 21-FIG. 23 summarizes the textural properties of the calcined nanotubes as studied by high-resolution $N_2$ physisorption at 77 K, with the properties of a conventional medium pore-size MFI zeolite also shown for comparison. The isotherm (FIG. 21) of the nanotube material clearly shows the presence of both micropores and mesopores, indicating the nanotube walls are microporous. The sharp increase in the quantity adsorbed for $P/P_o<0.1$ is characteristic of micropore adsorption while the increase in the $0.3<P/P_o<0.6$ is due to the condensation of $N_2$ in the mesopores of the nanotubes. This contrasts with the Type I isotherm obtained for a purely microporous MFI zeolite. The nanotubes also possess a very high BET surface area of 980 $m^2/g$ as compared to only 410 $m^2/g$ for conventional MFI. The pore size of the nanotube channel is estimated by the mesopore size distribution, calculated using the BJH method from the adsorption branch of the isotherm (FIG. 22). The mesopore size distribution has a narrow peak at 2.5 nm, which suggests the presence of channels of uniform pore size in the nanotube material. The slight deviation from the value measured in the TEM images (~3 nm) can be attributed to the underestimation of mesopore sizes by the BJH method (Ravikovitch P I et al. *Langmuir* 1995, 11, 4765-4772). The micropore size distribution of the nanotubes is calculated using the Horvath-Kawazoe method, and compared with that of conventional MFI calculated using the same method (FIG. 23). Both micropore size distributions show a peak at 0.51 nm, indicating that the nanotube walls have medium-size pores.

FIG. 24 and FIG. 25 show the low-angle and wide-angle XRD patterns of the calcined nanotube material, respectively. As shown by Kang et al. for imogolite nanotubes, the low-angle XRD patterns of nanotube powder samples are usually dominated by the scattering form factors of individual nanotubes and small bundles of nanotubes (Kang D Y et al. *Nat. Commun.* 2014, 5, DOI 10.1038/ncomms4342; Kang D Y et al. *ACS Nano* 2010, 4, 4897-4907). The first peak position is approximately equal to the outer diameter of the individual nanotubes, and there are subsequent scattering peaks. The first peak position of 4.2 nm observed in FIG. 24 is quite consistent with the TEM observations. The peaks in the wide-angle XRD pattern (FIG. 25) indicate atomic-scale ordering in the nanotube walls and show that they are crystalline. However, the thin (~1 nm) nanotube walls, and their surface curvature into a cylinder, will lead to XRD patterns that cannot be reliably compared to those of 3D bulk (and 2D nanosheet) zeolites even if the nanotube wall structure matches a known zeolite topology (http://www.iza-structure.org/databases/; Pophale R et al. *Phys. Chem. Chem. Phys.* 2011, 13, 12407-12412; Knio O et al. *Zeolites* 1984, 4, 369-372). This makes it challenging to determine the structure of nanotubes from powder X-ray crystallography alone.

FIG. 26 shows the FT-IR spectra obtained for the as-made as well as calcined nanotubes and the pure structure directing agent, while FIG. 27 shows the comparison of the FT-IR spectra of several other 3D and 2D zeolites with different pore sizes (BEA, 3D conventional MFI, 2D MFI and CHA). In FIG. 26, the peaks from the structure directing agent are visible in the spectrum of the as-made nanotubes, and disappear upon calcination. Peaks at ~1225 $cm^{-1}$ and ~550 $cm^{-1}$ are clearly present in the as-made nanotubes. These peaks somewhat broaden in the calcined sample, but are nevertheless clearly visible. On comparing the FT-IR spectrum of the calcined nanotubes with other frameworks (FIG.

Scheme 1. Molecular structure of the structure directing agent BCPh10Qui

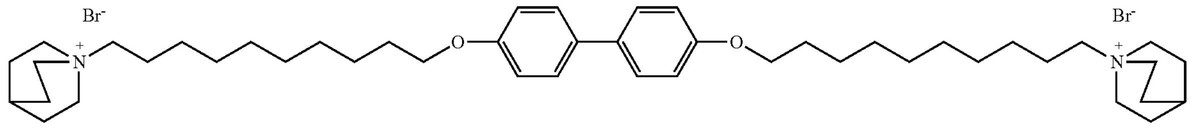

27), it can be seen that these peaks are present in zeolites containing five-membered rings (5 MR). The MFI framework (conventional 3D MFI as well as 2D MFI nanosheets) shows distinct peaks at ~1225 $cm^{-1}$ and ~550 $cm^{-1}$ arising from the five-membered pentasil units (Jansen J C et al. *Zeolites* 1984, 4, 369-372; Coudurier G et al. *J. Chem. Soc., Chem. Commun.* 1982, 1413-1415; Jacobs P A et al. *Zeolites* 1981, 1, 161-168; Lesthaeghe D et al. *J. Phys. Chem. C* 2008, 112, 9186-9191). Similarly, the BEA framework has FT-IR stretches at ~1225 $cm^{-1}$ and 524 $cm^{-1}$ as well as 577 $cm^{-1}$. The peak around 550 $cm^{-1}$ (550 $cm^{-1}$ for MFI, 524 $cm^{-1}$ and 577 $cm^{-1}$ for BEA) is attributed to the double five-membered rings, while the peak at ~1225 $cm^{-1}$ is a result of the external asymmetric stretching vibration of five-membered ring chains (Jansen J C et al. *Zeolites* 1984, 4, 369-372; Coudurier G et al. *J. Chem. Soc., Chem. Commun.* 1982, 1413-1415; Jacobs P A et al. *Zeolites* 1981, 1, 161-168; Lesthaeghe D et al. *J. Phys. Chem. C* 2008, 112, 9186-9191; Tomlinson S R et al. *Int. J. Spectrosc.* 2013, 2013, 1-7). FIG. 27 also shows that the zeolite framework of the nanotubes is very distinct from that of CHA, and consequently, the building units of CHA, since the FT-IR peaks are quite distinct. Thus, it can be concluded with reasonable certainty that the framework of the zeolite nanotubes is constructed, at least in part, from 5 MR units.

The $^{29}Si$ NMR spectra of the as-made and calcined nanotubes are shown in FIG. 28 and FIG. 29, respectively. The spectrum of the as-made nanotubes shows three peaks at −99 ppm ($Q^3$), −106.6 ppm ($Q^4$ 3Si, 1Al) and −113.3 ppm ($Q^4$ 4Si). The $Q^3$ signals are from the Si atoms on the wall surfaces that are presumably terminated by Si—OH groups, and the $Q^4$ signals are from Si atoms in the interior of the wall. Based on the peak areas, the Si/Al ratio calculated using the method proposed by Klinowski et al. is about 16 (Klinowski J et al. *J. Chem. Soc. Faraday Trans.* 2 *Mol. Chem. Phys.* 1982, 78, 1025-1050). The fraction of $Q^3$ Si atoms is calculated to be 0.15, which is similar to that of 2D zeolite sheets with nearly single-unit-cell thicknesses (Zhang H et al. *Angew. Chem. Int. Ed.* 2016, 55(25), 7184-7187; Schmidt J E et al. *Chem. Sci.* 2015, 6, 5955-5963). The calcined nanotubes show peaks at −102 ppm ($Q^3$) and −110 ppm ($Q^4$), which leads to a $Q^3$ fraction of 0.17 based on the peak areas. This value is similar to that of the as-made nanotubes, indicating that there is no significant condensation of surface silanols after calcination. The bonding environment of aluminum in the nanotubes was studied using $^{27}Al$ NMR (FIG. 30). Both the as-made and calcined nanotubes show a single peak at 54 ppm that corresponds to tetrahedral aluminum. There was no evidence of octahedral or extra-framework aluminum.

To better understand the formation process of the nanotubes, the duration of the synthesis was varied and the as-made material in each case was analyzed via XRD for crystallinity and TEM to visualize the products of the growth process at different stages. The same gel composition was used for the synthesis, with the hydrothermal growth being carried out at 150° C. and with the hydrothermal growth stopped after 1 day, 3 days, 5 days, and 7 days. FIG. 13-FIG. 14 show the XRD patterns for the material collected at these times, whereas FIG. 15-FIG. 18 shows corresponding TEM images. The low-angle XRD patterns show early development of mesopore domains which does not change significantly with time (FIG. 13). The wide-angle XRD patterns show the evolution of the nanotube wall structure from amorphous to an ordered zeolitic structure (FIG. 14). These observations are consistent with the TEM images (FIG. 15-FIG. 18), where the mesoporosity of the material is clearly visible at an early stage. The emergence of a few proto-nanotubes is also visible at 3 days (FIG. 16), and the nanotubes are fully crystallized by 7 days (FIG. 18). Thus, the overall mechanism of growth of the zeolite nanotubes appears to occur in a manner similar to 2D zeolite nanosheets, i.e., initial formation of a mesophase followed by transformation to an ordered zeolitic material (Na K et al. *J. Am. Chem. Soc.* 2010, 132, 4169-4177). However, a key difference is in the morphology-directing effect of the structure directing agent, which creates a unique 1D nanotubular material in the present case rather than a 2D nanosheet material.

The unique nanotubular morphology of the material reported here can be attributed to the templating action of the bolaform structure directing agent used in this work. Several other bolaform molecules with aromatic rings in the hydrophobic core of the molecule are known to π-stack and form stable cylindrical or rod-like micellar assemblies, as observed in TEM and AFM studies (Wang C et al. *Acc. Chem. Res.* 2012, 45, 608-618). Thus, it was hypothesized that the bolaform structure directing agent (BCPh10Qui) used to crystallize the zeolite nanotubes can form a cylindrical or rod-like assembly in solution as well. The results shown above strongly support this hypothesis and explain the unique nanotube morphology of the material. To study the structure of the structure directing agent embedded in the nanotubes after synthesis, the as-made material was studied by $^{13}C$ CPMAS NMR and compared to the $^{13}C$ NMR spectrum of the pure structure directing agent (FIG. 31). Comparison of the two spectra clearly shows that the structure directing agent is intact in the pores of the nanotubes. This is also confirmed from the elemental analysis of the as-made nanotubes (Table 2). The C/N ratio of the as-made nanotubes is ~25, which is close to the C/N ratio of 23 in the structure directing agent. Furthermore, the Si/Al ratio of 15 obtained from Table 2 is in agreement that the Si/Al ratio of 16 from NMR spectroscopy as discussed earlier. Based on previous reports of hierarchical zeolite synthesis using structure directing agents with aromatic rings (Xu D et al. *Nat. Commun.* 2014, 5, 4262; Xu D et al. *Chem. Mater.* 2014, 26, 4612-4619; Singh B K et al. *Chem. Mater.* 2014, 141203182238007; Shen X et al. *Angew. Chemie—Int. Ed.* 2018, 57, 724-728; Zhang Y et al. Chem.—A Eur. J. 2019, 25, 738-742), it can be hypothesized that the structure directing agent self-assembles through a π-π stacking of the aromatic rings. FIG. 19 shows UV-Vis diffuse reflectance absorption spectra of the as-made nanotubes, the solid structure directing agent, and aqueous structure directing agent solution. In a dilute solution of the structure directing agent in water, where it can be expected that the structure directing agent molecules are isolated from each other, a single absorption peak is observed at 265 nm. In the case of the solid structure directing agent with significant it stacking, the energy for the transition from π-HOMO to π*-LUMO decreases, as evident from the red shift in the absorption band to ~314 nm. A similar situation arises in the as-made nanotubes where the absorption band occurs at ~297 nm, indicating significant π-π stacking.

TABLE 2

| Elemental Analysis of the as-made and calcined nanotubes (weight percent).[a] | | | | | | | | |
|---|---|---|---|---|---|---|---|---|
| Sample | Si | Al | Na | C | H | N | O[b] | Si/Al (atomic) |
| As-made | 19.1 | 1.29 | 0.8 | 39.87 | 6.12 | 1.84 | 30.98 | 14.3 |
| Calcined | 38.8 | 2.63 | 1.44 | — | — | — | 57.13 | 14.2 |

[a]ICP-OES analysis done at Galbraith Laboratories

[b]Determined by attributing the remaining mass to oxygen

Thermogravimetric analysis of the as-made nanotubes shows that the structure directing agent accounts for 51% of the mass (FIG. 32), in agreement with elemental analysis (Table 2) wherein (C, H, N) make up 48% of the mass of as-made nanotubes. This high organic loading is very typical for several of hierarchical zeolite structures reported in the literature (Choi M et al. *Nature* 2009, 461, 246-249; Xu D et al. *Nat. Commun.* 2014, 5, 4262; Shen X et al. *Angew. Chemie—Int. Ed.* 2018, 57, 724-728; Zhang Y et al. *Chem. Mater.* 2018, 30, 1839-1843). The hydrophobic core of the structure directing agent, which constitutes a significant fraction of its molecular weight, is the main contributor to this high organic loading. This is because the hydrophobic part of the structure directing agent does not really participate in the zeolite framework crystallization and is merely a space-filling portion that helps in the formation of the hierarchical mesopore system. The precise reason for the high organic loading, in terms of the exact arrangement of the structure directing agent molecules in the as-made nanotubes, is not currently understood. However, the formation of a stable cylindrical or rod-like micellar structure would require a specific number of BCPh10Qui molecules to stack, and it may not be necessary for all the molecules to also be involved in templating the microporous zeolitic structure.

Based on these considerations, a preliminary model for arrangement of the structure directing agent molecules in the nanotube is proposed in FIG. 20. The biphenyl rings of the structure directing agent form a stable hydrophobic core along the axis of the nanotubes, while the flexible alkyl chains with the quinuclidinium groups stretch out along the radius of the nanotube in different directions, reaching out into the microporous walls that are crystallized by the hydrophilic headgroups. However, this proposed arrangement is chemically intuitive hypothesis at this stage, and further confirming insights will require rigorous study of the stable structure directing agent conformations in a porous nanotubular structure as well in micellar solutions of the structure directing agent. In addition to the challenge of incorporating suitable interactions for the structure directing agent with the zeolite framework and also with other structure directing agent molecules, proposing an accurate model of the nanotube structure itself requires further high-resolution structure determination by HR-TEM and electron diffraction.

Structure determination of zeolitic nano tubes. Transmission electron microscopy (TEM) images show that the material has an anisotropic needle-like morphology with a width of ~5 nm and length of 0.5 to 1 μm. Selected area electron diffraction (SAED) as well as continuous rotation electron diffraction (cRED) reveal that the particles have a distinct periodicity of 12.5 Å along the needle direction whereas no apparent periodicity is observed perpendicular to the tubes, see FIG. 33-FIG. 36. The electron diffraction patterns show characteristic features similar to the electron diffraction patterns from materials with tubular structures such as carbon nanotubes.

High-resolution scanning transmission electron microscopy (HR-STEM) images were obtained both from the directions perpendicular to the tubes as well as along the tube after properly sectioning the nanotubes by ultramicrotomy. Images acquired along the tubes clearly reveal a tubular structure with ~5 nm in the outer diameter and ~3 nm the inner diameter, see FIG. 37 and FIG. 38. Ten (10) repeating units are frequently observed around the circumference of the nanotube, and the distance between the adjacent units is ca. 12-13 Å. Images acquired perpendicular to the nanotube also reveals the tubular behavior. The Fourier Transform of the image confirms the periodicity of ~12.5 Å along the tubes and a lack of periodicity perpendicular to the tube, see FIG. 39 and FIG. 40. These are consistent with the observations by electron diffraction. In the center of the tubes, where the tube is observed perpendicular to its wall, a fine structure can be observed. The contrast reveals a structure consisting of micropores penetrating the tube walls and arranged at an oblique angle of ~113° with respect to the tube direction at a distance of 12 Å. In between the micropores the arrangement of tetrahedral Si/Al atoms can be observed.

Based on the electron diffraction and TEM imaging, the tubes walls are built from a structure with a 2D periodicity of ~12.5 Å both along the extended dimension of the as well as along its circumference and an angle of ~113°. The projected wall structure contains micropores surrounded by small rings defined by 5 and 6-tetrahedral atoms. Both the 2D periodicity as well as the projected structure shows similarities to the structure of the well-studied 3D periodic zeolite Beta. In the perpendicular view each of the 10 building-units observed along the circumference of the tubes also shows similarities to the building unit of the same structure. Using this unit present in the structure of zeolite Beta repeated 10 times, a tubular structure was constructed, see FIG. 41-FIG. 42. The connectivity between the given unit is different as compared to the structure of 3D periodic Beta which defines the curvature of the tube. The structure was geometrically optimized using the CASTEPII force field and converged to a feasible bonding geometry with average Si—O distance of 1.613 Å (max/min 1.605 Å/1.627 Å) and O—Si—O angle of 109.46° (max/min 107.28°/112.59°). The geometry optimized structure has a periodicity of 12.53 Å along the tube direction, which agrees well with the observations of ADF and iDPC imaging. In an ADF image acquired along the tube, regions where the walls of the tubes grow into a periodic arrangement can be observed. This region is several unit cells large and closely resembles the projected structure of zeolite Beta.

The structure of the tube wall allows for structural disorder of polytypic behavior, in a similar manner as has been studied extensively in 3D periodic zeolite Beta. The polytypic stacking disorder is based on allowed translations of ±⅓ of the 12.53 Å periodicity along the extended c-axis. In order to close the tube, the sum of all translation vectors needs to be an integer (±n). This restriction might be a reason to why some tubes are not fully completed as observed in (S)TEM images.

The nanotube is built from an inner and outer layer, see FIG. 44. Due to the curvature of the tube, the two layers have different topological structures. The outer layer is built from small rings of 4, 5, and 6 T-atoms which forms a microporous structure of pores limited by 12 T-atoms, see FIG. 45. The inner layer is built from rings of 5 and 6 T-atoms constructing 10 ring micropores, see FIG. 46. The outer layer is topologically identical to a layer of zeolite beta. For the case of strictly consecutive stacking (+⅓, +⅓ . . . or −⅓, −⅓ . . . ), the inner layer is topologically identical to a layer of the MFI zeolite. The nanotube can hence be considered a fused structure of two of the most widely applied zeolites; beta and MFI.

TEM images show that completed circular tubes frequently contain 10 repeating units. Furthermore incomplete tubes also often shows a curvature similar to that of a 10 unit tube, and even the occasional event of two adjacent building units connect at an angle of ~36°. In order to study this behavior, hypothetical tubes built from 6, 8, 10, 12, and 14 repeating units were constructed and geometrically optimized. Evaluation of the bond geometries show that the tube built from 10 units has the most favorable geometry in terms of spread of Si—O distances as well as O—Si—O and Si—O—Si angles. It is evident that curvature of the tube is an inherent property of its structure.

The 5 different nanotubes were further studied computationally (Zang J et al. *The Journal of Physical Chemistry Letters* 2010, 1(8), 1235-1240; Senftle T P et al. *npj Computational Materials* 2016, 2, 15011; Fogarty J C et al. *The Journal of chemical physics* 2010, 132(17), 174704; Knio O et al. *Chemistry of Materials* 2018, 31(2), 353-364; Gren W et al. *The Journal of Physical Chemistry C* 2010, 114(21), 9739-9747; Roth W J et al. *Nature chemistry* 2013, 5(7), 628; Plimpton S et al. *Sandia National Laboratories* 2007, 18; Dubbeldam D et al. *Mol. Simul.* 2016, 42(2), 81-101; Brown W M et al. *Comput. Phys. Commun.* 2011, 182(4), 898-911; Kresse G et al. *Phys. Rev. B* 1996, 54(16), 11169) by comparing bond energies, surface energies, and adsorption isotherms as shown in FIG. 47-FIG. 48. The results showed that the zeolite nanotube with 10 units (ZNT-10) had the most favorable structure. The bond strain energies were calculated using the formula:

$$S_{bond}=K(r-r_0)^2 \quad (1)$$

where $S_{bond}$ is the bond strain averaged over all Si—O bonds, K is the bond energy constant ($3.55\times10^4$ kJ $mol^{-1}$ $nm^{-2}$), r is an Si—O bond distance, $r_0$ is the equilibrium Si—O bond distance of 1.613 Å. It was found that the bond strain is minimized with ZNT-10. It increases sharply when the units are reduced from 8 to 6 but increases slowly as more units are added and the nanotube radius is increased.

The heat of reaction inherent in the surface energy calculation requires a force field that can accurately describe water and zeolite structures. Therefore, the Fogarty version of the ReaxFF force field was used since it can account for bond breaking and formation events. The nanotube surface energy was then calculated by relaxing the nanotubes and comparing them to relaxed bulk BEA and a relaxed single water molecule suspended in vacuum using the following equation:

$$E_{surface}=\frac{\left(E_{nanotube}-E_{bulk}\left(\frac{Si_{nanotube}}{Si_{bulk}}\right)-\delta_{water}\left(\frac{H_{nanotube}}{H_{water}}\right)\right)}{2\pi h(r_{inner}+r_{outer})}$$

where $E_{surface}$ is the surface energy, $E_{nanotube}$ is the ReaxFF energy of the relaxed nanotube, $E_{bulk}$ is the ReaxFF energy of relaxed bulk BEA, $Si_{nanotube}$ is the number of Si atoms in the nanotube, $Si_{bulk}$ is the number of Si atoms in bulk BEA, water is $\delta_{water}$ is the chemical potential of water (ReaxFF energy of relaxed gas molecule with the heat of condensation subtracted out), $H_{nanotube}$ is the number of H atoms in the nanotube, $H_{water}$ is 2 (the number of H atoms in water), h is the height of the nanotube unit cell, $r_{inner}$ is the length of the inner radius measured from one interior silanol H to an opposing interior H, and $r_{outer}$ is the length of the outer radius measured from an exterior silanol H to an opposing exterior silanol H. It was again found that ZNT-10 has the lowest surface energy. The other nanotubes follow the bond strain trend, with larger nanotubes showing a slight increase in surface energy and smaller nanotubes showing larger increases in surface energy.

In FIG. 22, the experimental bulk MFI and nanotube isotherms are compared with the simulated bulk MFI and nanotube isotherms using nanotube models with five different sizes. The bulk experimental isotherm largely resembles the simulated isotherm except at 1 atm, where the experimental loading of 163 $cm^3/g$ is higher than the simulated loading of 93.4 $cm^3/g$. The larger experimental bulk loading is likely due to mesoporosity in the crystal since large pores can hold adsorbates at near liquid density. The experimental nanotube isotherm resembles the simulated ZNT-10 structure isotherm, especially at 1 atm, where the experimental loading of 738 $cm^3/g$ is within the margin of error of the ZNT-10 loading, 769±31 $cm^3/g$. At 1 atm and 77 K, the loading concentrates in the large internal pore of the nanotube at a density close to that in a liquid state, so a similar simulated loading indicates a similar nanotube internal area to the experimental structure.

Conclusion. This work is the first demonstration of the crystallization of nanotubes with zeolitic microporous walls. This was achieved using a bolaform structure directing agent that is capable of π-stacking through the biphenyl groups, thus forming a stable, cylindrical/rod-like micellar structure while the quinuclidinium groups in the structure directing agent direct the crystallization of a thin, porous, zeolitic tubular wall that is ~1 nm thick. The nanotubes have an inner diameter of ~3 nm as determined from TEM and $N_2$ physisorption while the outer diameter determined from TEM is ~5 nm. The nanotube walls appear to be composed of a medium-pore size zeolite structure and likely possesses 5-membered rings based on the FT-IR results. UV-Vis spectroscopy provides evidence for π-stacking of the structure directing agent in the nanotube structure, and a preliminary model for the structure directing agent arrangement was proposed. With the nanotubes possessing micropores and a relatively low Si/Al ratio, they can be useful in catalysis and adsorption related applications. Further studies are being directed at obtaining the detailed structure of the nanotubes and studying the applications of the nanotubes.

Methods

Synthesis of structure directing agent (BCPh10Qui). The structure directing agent BCPh10Qui was synthesized via a two-step reaction. The first reaction was carried out as reported elsewhere (Xu D et al. *Nat. Commun.* 2014, 5, 4262). Briefly, 1.6 g of 4,4'-biphenol (Sigma-Aldrich), 1 g of potassium hydroxide (Sigma-Aldrich), and 12.5 g of 1,10-dibromodecane (Sigma-Aldrich) was added to 100 mL of ethanol (200 proof, Koptec) and refluxed overnight under a nitrogen atmosphere. The resultant solid after cooling the reaction was filtered and washed with copious hot ethanol and water to obtain the intermediate, BCPh10Br. 0.5 g of this intermediate product and 0.35 g of quinuclidine (Alfa-Aesar) was added to 25 mL of acetonitrile and refluxed overnight. After cooling the reaction mixture, diethyl ether was added to precipitate the product, BCPh10Qui, which was then filtered and washed with diethyl ether to remove the unreacted reactants.

Synthesis of Zeolite nanotubes. 0.113 g of the structure directing agent BCPh10Qui was added to 4.45 g of DI $H_2O$ in a 30 mL polypropylene bottle with a cap while stirring. After the mixture homogenized, 0.067 g of sodium hydroxide (Sigma-Aldrich) was added and allowed to dissolve. This was followed by sequential addition of 0.027 g of Aluminum sulfate hydrate ($Al_2(SO_4)_3 \cdot 14\text{-}18H_2O$, Sigma-Aldrich) and 0.5 g of Ludox HS-30 colloidal silica (Sigma-Aldrich), dropwise. The resulting gel composition of the mixture was 1.875 $SiO_2$:0.03 $Al_2O_3$:1 structure directing agent:0.63 $Na_2O$:205 $H_2O$. The gel was aged at room temperature while stirring for 3 h with the cap of the polypropylene bottle closed, followed by a static hydrothermal reaction at 423 K for 7 days in Teflon-lined autoclaves. The resulting solid product was collected and washed with DI $H_2O$ by centrifuging 3 times followed by drying in an oven at 348 K. The material was calcined at 823 K for 6 h in air under static conditions with a ramp rate of 2 K/min.

Characterization. XRD patterns were measured on powder samples using a PANalytical X'Pert Pro MPD diffractometer with CuKα radiation (45 kV, 40 mA). SEM images were obtained using a Hitachi SU8010 electron microscope operating at 3 kV and 10 μA while TEM images were obtained using a FEI Tecnai G2 F30 operating at 300 kV. Nitrogen physisorption isotherms were obtained using ASAP 2020 (Micromeritics) at 77 K. Prior to the isotherm measurement, the material was activated at 423 K under high vacuum for 12 h. The BET surface area was calculated using the adsorption data obtained at $P/P_o$ between 0.1 and 0.3. The micropore size distribution was calculated using the Horvath-Kawazoe equations while the mesopore size distribution was calculated using the BJH method. FT-IR spectra were obtained on a Thermo Scientific Nicolet 6700 spectrometer equipped with a diamond Smart Orbit ATR accessory. UV-Vis diffuse reflectance spectra were obtained using a Cary 5000 UV-Vis/NIR spectrophotometer. The diffuse reflectance spectra were converted into absorbance spectra using a Kubelka-Munk transformation. Thermogravimetric analyses were carried out on a Netzsch STA 409 PG. The sample mass loss was recorded while it was heated from room temperature to 1123 K at a ramp rate of 10 K/min. CHN and Si, Al, Na elemental analyses were performed by Galbraith Laboratories Inc. using the combustion method and ICP-OES respectively. $^{29}Si$ and $^{27}Al$ solid state NMR spectra were measured on a Bruker Avance III 400 spectrometer, while $^{13}C$ CP MAS NMR spectra were measured on a Bruker Avance IIIHD spectrometer.

(S)TEM Imaging. Images of the zeolitic nanotubes were acquired using a ThermoFisher ThemisZ double corrected transmission electron microscope. The microscope was operated at 300 kV. Scanning transmission electron microscopy images were acquired using a beam dose of 20 μA, a convergence angle of 16 mrad and a dwell time of 8 μs. Integrated differential phase contrast (iDPC) images were obtained using a segmented annular dark-field detector. A high-pass filter was applied to the iDPC images in order to reduce low frequency contrast. Annular dark-field images were acquired using an inner collection angle of 31 mrad. The sample was dried in vacuum at 180° C. for at least 3 hours prior to data acquisition in order to remove adsorbed water and increase stability in the electron beam. In order to access the cross-section of the zeolitic nanotubes the specimen was sectioned using ultramicrotomy, after embedding into an epoxy resin, to sections of a thickness of ~50 nm.

Electron Diffraction. For acquisition of electron diffraction data the sample was dispersed on a copper grid covered by a holey carbon film. The grid was mounted to a single-tilt cryo-transfer tomography holder, Gatan Type 914. Electron diffraction data were collected using a JEOL JEM-2100 transmission electron microscope (TEM) operated at an accelerating voltage of 200 kV. The 3D electron diffraction data were collected by continuously tilting the goniometer with a tilt speed of 0.230072°/s. During tilt, the crystal was tracked by sequential defocusing of the intermediate lens using the software Instamatic. The diffraction patterns were collected using the high-speed hybrid detection camera Timepix Quad (ASI) and reconstructed using the software REDp. Selected area electron diffraction patterns were obtained using the Timepix camera.

Structure Relaxation. The unit cells used for structure determination, bond strain, and adsorption isotherms were relaxed with the Castep II force field. The bulk zeolite, nanotubes, and water molecule cell used for surface energy determination were relaxed with 40 loops of conjugate gradient descent energy minimization with an energy tolerance of $10^{-8}$ and a force tolerance of $10^{-19}$ kcal/mol-Å using the LAMMPS software package.

Adsorption Isotherms. The isotherms were obtained using Grand Canonical Monte Carlo with the RASPA simulation software at 77 K and pressures ranging from 1E-6 to 1 atm. The TraPPE-Zeo and TraPPE $N_2$ parameters were used to simulated framework-adsorbate interactions with the Lennard Jones and Coulombic potentials. Each point was generated using 5000 initialization cycles and 10000 main cycles using an ewald sphere to calculate charges with a precision of E-6 and a cutoff of 12 Å.

Software. The structure model was created using BIOVIA Materials Studio 2019. Simulations of electron diffraction data was performed using the kinematical approximation in the software CrystDiff and X-ray diffraction data using the Powder diffraction toolbox in BIOVIA Materials Studio 2019. The PXRD simulation was performed by placing a single tube in a unit cell of 100×100×12.5 Å to mimic diffraction from isolated nanotubes. The PXRD simulations were performed using U, V, W pseudo Voigt parameters of 3, −0.3 and 0.6 respectively. We used RASPA 2014 version 2.0 for Monte Carlo simulations and LAMMPS version Aug. 22, 2018 for structure relaxation with ReaxFF.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A nanostructured hierarchical zeolitic material comprising: a plurality of zeolite nanotubes, wherein each zeolite nanotube comprises a zeolitic wall perforated by a plurality of pores, the zeolitic wall defining a single longitudinal lumen, and wherein the plurality of zeolite nanotubes further comprise a bolaform structure directing agent comprising a first hydrophilic end and a second hydrophilic end with a hydrophobic core therebetween.

2. The material of claim 1, wherein the zeolitic wall comprises a zeolitic material, the zeolitic material comprising an aluminosilicate material.

3. The material of claim 2, wherein the aluminosilicate material comprises Si and Al in a ratio of from 14:1 to 18:1 (w/w).

4. The material of claim 1, wherein the zeolitic wall comprises some structural elements of a beta zeolite structure, an MFI zeolite structure, or a combination thereof.

5. The material of claim 1, wherein:

the plurality of zeolite nanotubes have an average length of from 20 nanometers (nm) to 10 micrometers (μm, microns);

the plurality of zeolite nanotubes have an average outer diameter of from 1 nanometer to 10 nanometers;

the plurality of zeolite nanotubes have an average aspect ratio of from 2 to 10,000;

the plurality of zeolite nanotubes have an average inner diameter of 0.5 nm to 9 nm;

or a combination thereof.

6. The material of claim 1, wherein the plurality of zeolite nanotubes have an average wall thickness of from 0.5 nm to 5 nm.

7. The material of claim 1, wherein the plurality of pores have an average diameter of from 0.2 to 2 nm.

8. The material of claim 1, wherein the plurality of zeolite nanotubes are substantially crystalline.

9. The material of claim 1, wherein the plurality of zeolite nanotubes have an average surface area of from 500 to 5000 meters squared per gram of the plurality of zeolite nanotubes ($m^2/g$).

10. The material of claim 1, wherein the hydrophobic core comprises one or more aromatic rings, one or more hydrophobic alkyl groups, or a combination thereof; wherein the first hydrophilic end and the second hydrophilic end each independently comprises a quinuclidinium group; or a combination thereof.

11. The material of claim 1, wherein the bolaform structure directing agent comprises a molecule with the following structure

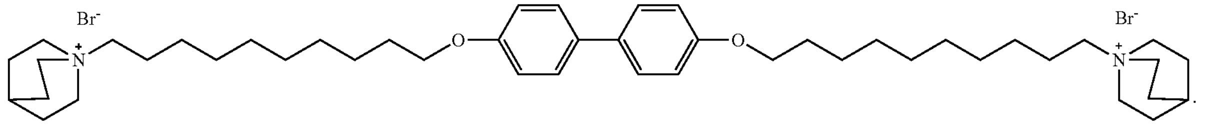 [SMILES: c1cc(-c2ccc(OCCCCCCCCCC[N+]34CCC(CC3)CC4)cc2)ccc1OCCCCCCCCCC[N+]12CCC(CC1)CC2 ; [Br-] ; [Br-]]

12. A method of making the material of claim 1, wherein the method comprises hydrothermal zeolite growth using the bolaform structure directing agent.

13. The method of claim 12, wherein the hydrophobic core comprises one or more aromatic rings, one or more hydrophobic alkyl groups, or a combination thereof; wherein the first hydrophilic end and the second hydrophilic end each independently comprises a quinuclidinium group; or a combination thereof.

14. The method of claim 12, wherein the bolaform structure directing agent comprises a molecule with the following structure.

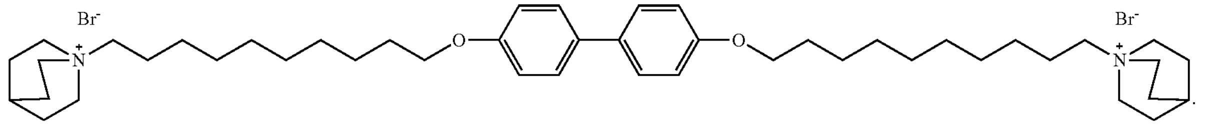

15. The method of claim 12, wherein the method further comprises calcination.

16. A bolaform structure directing agent, comprising:

a first hydrophilic end and a second hydrophilic end with a hydrophobic core therebetween;

wherein the hydrophobic core comprises one or more aromatic rings and one or more hydrophobic alkyl groups;

wherein the one or more aromatic rings comprises a biphenyl group;

wherein the one or more hydrophobic alkyl groups each independently comprises a $C_{10}$ alkyl group;

wherein the first hydrophilic end and the second hydrophilic end each independently comprises a quinuclidinium group.

17. The bolaform structure directing agent of any one of claim 16, wherein the bolaform structure directing agent comprises a molecule with the following structure.

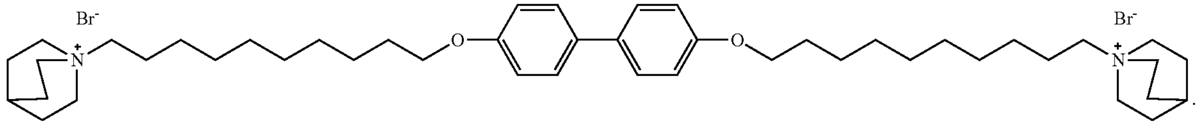 [SMILES: c1cc(-c2ccc(OCCCCCCCCCC[N+]34CCC(CC3)CC4)cc2)ccc1OCCCCCCCCCC[N+]12CCC(CC1)CC2 ; [Br-] ; [Br-]]
18. A method of use of the material of claim 1, the method comprising using the material as a catalyst, as a catalyst support, as an adsorbent, in a chemical separation, or a combination thereof.
19. A catalyst and/or catalyst support comprising the material of claim 1.
* * * * *